United States Patent Office 3,567,695
Patented Mar. 2, 1971

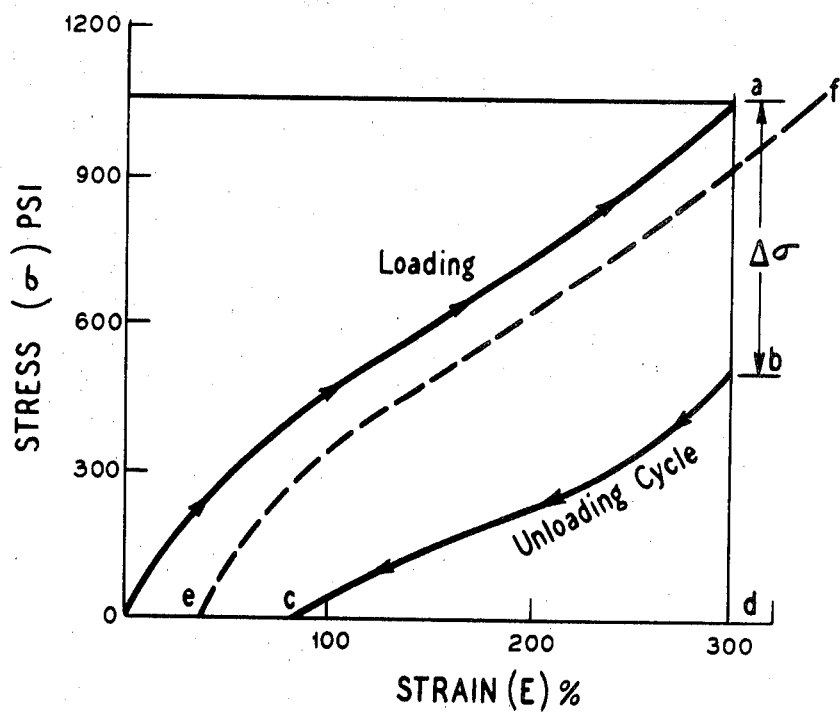

3,567,695
BLOCKED ISOCYANATE POLYMER (IV)
Thomas K. Brotherton and John W. Lynn, Charleston, W. Va., assignors to Union Carbide Corporation
Application Nov. 9, 1964, Ser. No. 409,921, which is a continuation-in-part of application Ser. No. 212,480, July 25, 1962. Divided and this application Apr. 2, 1968, Ser. No. 718,094
Int. Cl. C08g 22/18
U.S. Cl. 260—77.5
8 Claims

ABSTRACT OF THE DISCLOSURE

"Blocked" polyisocyanato-containing polymers which may be obtained via the vinyl polymerization of unsaturated diester diisocyanates as exemplified by bis(2-isocyanatoethyl) fumarate with/without ethylenically unsaturated compounds, e.g., styrene, vinyl acetate, etc., followed by reacting the polyisocyanato groups of the resulting polymers with a monofunctional active hydrogen compound. The above reactions may also be reversed to thus obtain the "blocked" polymers.

---

This application is a division of application Ser. No. 409,921, now U.S. 3,427,346 entitled "Novel Olefinically Unsaturated Diisocyanates and Products Therefrom" by T. K. Brotherton and J. W. Lynn, filed Nov. 9, 1964 which, in turn, is a continuation-in-part of application Ser. No. 212,480 abandoned entitled "Novel Olefinically Unsaturated Diisocyanates and Process for Preparation," by T. K. Brotherton and J. W. Lynn, filed July 25, 1962, all of the aforesaid applications being assigned to the same assignee as the instant application.

This invention relates to novel diisocyanate compositions and to processes for preparing the same. In one aspect, the invention relates to novel polymers of the above-said diisocyanate compositions which polymers contain a plurality of ethylenic bonds, i.e., $>C=C<$. In other aspect, the invention relates to novel polymers of the above-said diisocyanate compositions, said polymers containing a plurality of pendant isocyanato groups, i.e., —NCO. In a further aspect, the invention relates to novel compositions which result from the reaction of novel polyisocyanates with active hydrogen compounds. In various other aspects, the invention relates to the preparation of novel cast resins thermoplastic resins, millable gum stocks and the cured products therefrom, prepolymers, elastomers, elastic and relatively non-elastic fibers, urethane foams, adhesives, coatings, and the like.

The novel ester diisocyanate compounds which are contemplated can be represented by Formula I infra:

I       $$OCN-R-O-\overset{O}{\underset{\|}{C}}-R_1-\overset{O}{\underset{\|}{C}}-O-R-NCO$$

wherein R represents a member selected from the group consisting of divalent, substituted and unsubstituted aliphatic, alicyclic, and aromatic groups, and wherein $R_1$ represents a divalent olefinically unsaturated aliphatic group; with the provisos that (1) when both R variables are alkylene groups, e.g., ethylene, $R_1$ is not a cis-vinylene group, i.e.,

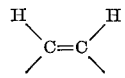

and (2) each isocyanato moiety, individually is at least two carbon atoms removed from the

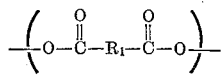

moiety of the above formula. Preferred compounds are those wherein R represents a divalent hydrocarbon group containing from 2 to 12 carbon atoms and $R_1$ represents a divalent olefinically unsaturated hydrocarbon group containing from 2 to 24 carbon atoms. Particularly preferred compounds represented by Formula I are those wherein R represents a member selected from the group consisting of alkylene, alkenylene, alkynylene, arylene, arylenealkylene, alkylenearylene, alkarylene, arylenealkenylene, alkenylenearylene, arylenealkynylene, alkynylenearylene, cycloalkylene, cycloalkenylene, alkylcycloalkylene, alkylcycloalkenylene, cycloalkylenealkylene and cycloalkenylalkylene groups containing from 2 to 12 carbon atoms; and $R_1$ represents an alkenylene group containing from 2 to 18 carbon atoms and more preferably from 2 to 10 carbon atoms.

Illustrative novel diisocyanate compounds encompassed within Formula I supra include, among others, bis(2-isocyanatoethyl) fumarate, bis(2-isocyanato-2-methylethyl) fumarate, bis(2-isocyanato-1-methylethyl) fumarate, bis (9-isocyanatononyl) fumarate, bis(12-isocyanatododecyl) glutaconate, bis(2-isocyanato-n-propyl) fumarate, bis(4-isocyanatophenyl) alpha hydromuconate, bis(2 - isocyanatonaphthyl) itaconate, bis(4-isocyanatophenyl) fumarate, bis(3-isocyanatocyclohexyl) glutaconate, bis(4-isocyanato-2-butenyl) fumarate, and the like.

The term "substituted" as used throughout the specification and appended claims is meant to further define the novel diisocyanates, the derivatives thereof, and the polymeric products thereof, to include those wherein the aforementioned R groups (of Formula I) can be aliphatic with alicyclic or aromatic substituents; alicyclic with aliphatic or aromatic substituents; or aromatic with aliphatic or alicyclic substituents in addition to other groups hereinafter indicated.

Broadly, the generic inventions are directed to novel diisocyanates (of Formula I supra) and to novel processes for preparing the same. Within the limits of the aforesaid generic inventions there are included several highly desirable embodiments which are described hereinafter in detail.

In one embodiment, highly useful and attractive subclasses of novel ester diisocyanates which fall within the metes and bounds of Formula I supra are those wherein each R represents a substituted or unsubstituted divalent aliphatic group and $R_1$ represents a divalent olefinically unsaturated aliphatic group containing from 2 to 24 carbon atoms. Preferred compounds within this embodiment are those represented by Formula II infra:

II      $$OCN-R_2-O-\overset{O}{\underset{\|}{C}}-R_1-\overset{O}{\underset{\|}{C}}-O-R_2-NCO$$

wherein $R_2$ represents a divalent substituted or unsubstituted aliphatic group containing from 2 to 12 carbon atoms and $R_1$ represents an alkenylene group containing from 2 to 24 carbon atoms. Particularly preferred compounds within this embodiment are those wherein $R_2$ is a member selected from the group consisting of alkylene, alkenylene, alkynylene, cycloalkylalkylene, cycloalkenylalkylene, and arylalkylene groups containing from 2 to 10 carbon atoms and $R_1$ has the same value as previously indicated. The divalent $R_2$ groups can be either straight or branched chain and need not be the same throughout the molecule.

Illustrative of the novel diisocyanates which fall within this embodiment include bis(2-isocyanatoethyl) fumarate, bis(3-isocyanatopropyl) glutaconate, bis(4-isocyanatobutyl) alpha - hydromuconate, bis(5-isocyanatopentyl) beta-hydromuconate, bis(7-isocyanatoheptyl) itaconate, bis(2,2 - dimethyl-3-isocyanatopropyl) fumarate, bis(3-ethyl-5-isocyanatopentyl) glutaconate, bis(3,4-diethyl-5-isocyanatopentyl) alpha-hydromuconate, bis(4,4- dimethyl-6-isocyanatohexyl) beta-hydromuconate, bis(2-methyl-4-ethyl-6-isocyanatohexyl) itaconate, bis(9-isocyanatononyl) fumarate, bis(5,6,7-triethyl-9-isocyanatononyl) fumarate, 2-isocyanatoethyl 3-isocyanatopropyl glutaconate, 4-isocyanatobutyl 6-isocyanatohexyl alpha-hydromuconate, 3-isocyanatopropyl 8-isocyanatooctyl beta-hydromuconate, 5-isocyanatopentyl 6-isocyanatohexyl itaconate, 2 - methyl-3-isocyanatopropyl 2-isocyanatoethyl fumarate, 4-ethyl-7-isocyanatoheptyl 6-isocyanatohexyl fumarate, bis(4-isocyanato - 2 - butenyl) glutaconate, bis(4-isocyanato-2-butenyl) itaconate, bis(2-isocyanatoethyl) citraconate, bis(7 - isocyanato-4-heptenyl) fumarate, bis(8-isocyanato-4-octenyl) glutaconate, bis(9-isocyanato-5-nonenyl) itaconate, bis(10-isocyanato-6-decenyl) fumarate, bis(3 - ethyl-5-isocyanato-3-pentenyl) fumarate, bis(3,4-dimethyl-5-isocyanato-3-pentenyl) glutaconate, bis(2-methyl-4-ethyl-6-isocyanato-2-hexenyl) itaconate, bis(5,6,7 - triethyl-9-isocyanato-4-nonenyl) glutaconate, 4-isocyanato-2-butenyl 3-isocyanatopropyl fumarate, 4-isocyanato-2-butenyl 5-isocyanato-3-pentenyl glutaconate, 4-ethyl-7-isocyanato-5-heptenyl 6-isocyanato-3-hexenyl itaconate, bis(5 - isocyanato-2-butynyl) glutaconate, bis(7-isocyanato-4-heptynyl) fumarate, bis(10-isocyanato-4-decynyl) glutaconate, bis(9-isocyanato-5-nonylyl) itaconate, bis(2-phenyl-3-isocyanatopropyl) fumarate, bis(3-naphthyl-5-isocyanatopentyl) fumarate, bis(3-styryl-5-isocyanatopentyl) glutaconate, bis(4-tolyl-6-isocyanatohexyl) itaconate, bis(6-cumenyl-7-isocyanatoheptyl) glutaconate, bis(5-xylyl - 8 - isocyanatooctyl) fumarate, bis(7-mesityl-9-isocyanatononyl) glutaconate, bis(2-cyclohexyl-3-isocyanatopropyl) itaconate, bis(3-cyclohexyl-5-isocyanatopentyl) fumarate, bis(4-cyclohexyl-6-isocyanatohexyl) fumarate, bis(5-cyclohexylmethyl-7-isocyanatoheptyl) glutaconate, bis(3-cycloheptyl-5-isocyanatopentyl) itaconate, bis(3-cyclohexenyl-5-isocyanatopentyl) glutaconate, bis(5 - cycloheptenyl-methyl-8-isocyanatooctyl) fumarate, and the like.

In a second embodiment, attractive subclasses of novel ester diisocyanates encompassed within Formula I supra are those wherein each R represents a divalent cycloaliphatic group and which need not be the same throughout the molecule and $R_1$ has the same value as previously indicated. Preferred compounds within this embodiment are those represented by Formula III below:

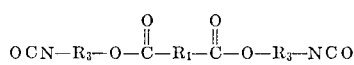

III $\quad OCN-R_3-O-\overset{O}{\underset{\|}{C}}-R_1-\overset{O}{\underset{\|}{C}}-O-R_3-NCO$ wherein $R_3$ represents a divalent substituted or unsubstituted cycloaliphatic group containing from 4 to 12 carbon atoms and $R_1$ has the same value as previously indicated. Particularly preferred compounds within this embodiment are those wherein $R_3$ is a member selected from the group consisting of cycloalkylene, cycloalkenylene, cycloalkynylene, alkylcycloalkylene, alkylcycloalkenylene, alkylcycloalkynylene, alkylenecycloalkylene and cycloalkylenealkylene groups containing from 4 to 10 carbon atoms and $R_1$ is an alkenylene group containing from 2 to 24 carbon atoms. The divalent cycloaliphatic group need not be the same throughout the molecule.

Illustrative novel ester diisocyanates which are included in the second embodiment are bis(2-isocyanatocyclobutyl) fumarate, bis(3-isocyanatocyclopentyl) fumarate, bis(4-isocyanatocyclohexyl) glutaconate, bis(5-isocyanatocycloheptyl) itaconate, bis(7 - isocyanatocyclononyl) alpha-hydromuconate, bis(3-isocyanato-4-cyclopentenyl) beta-hydromuconate, bis(5-isocyanato-6-cycloheptenyl) fumarate, bis(6 - isocyanato-7-cyclooctenyl) fumarate, bis(2-isocyanatocyclobutylmethyl) glutaconate, bis(2-isocyanato-2-ethylcyclobutyl) itaconate, bis[2(2'-isocyanatoethyl)cyclobutyl] fumarate, bis(3-isocyanatocyclopentylmethyl) fumarate, bis(3-isocyanato-2-ethylcyclopentyl) glutaconate, bis[3-(2'-isocyanatoethyl)cyclopentyl] itaconate, bis(5-isocyanatocycloheptylmethyl) fumarate, bis(3-isocyanato-5-methylcyclohexyl) fumarate, bis(3-isocyanato-5,6-dimethylcyclohexyl) glutaconate, bis(3-isocyanato-4-ethylcyclopentyl) itaconate, bis(3-isocyanato-4,5-diethylcyclopentyl) fumarate, and the like.

In a third embodiment, highly desirable subclasses of novel ester diisocyanates include those wherein each R (of Formula I) represents a divalent aromatic group which need not be the same throughout the molecule. Preferred compounds within this embodiment are represented by Formula IV infra:

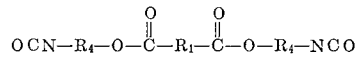

IV $\quad OCN-R_4-O-\overset{O}{\underset{\|}{C}}-R_1-\overset{O}{\underset{\|}{C}}-O-R_4-NCO$ wherein $R_4$ represents a divalent substituted or unsubstituted aromatic group containing from 6 to 12 carbon atoms and $R_1$ has the same value as previously indicated. Particularly preferred compounds within this embodiment are those wherein $R_4$ is a member selected from the group consisting of arylene, arylenealkylene, alkylenearylene, alkylarylene, arylenealkenylene and alkenylenearylene groups containing from 6 to 10 carbon atoms and $R_1$ is an alkylene group containing from 2 to 24 carbon atoms. The divalent aromatic groups need not be the same throughout the molecule.

Typical ester diisocyanates encompassed by the third embodiment include bis(4-isocyanatophenyl) fumarate, bis(2 - isocyanatophenyl) fumarate, bis(3 - isocyanatophenyl) glutaconate, bis(7-isocyanato-2-naphthyl) alpha-hydromuconate, bis(7-isocyanato-1-naphthyl) beta-hydromuconate, bis(4'-isocyanato-4-biphenylyl) itaconate, bis (5-isocyanato-2-indenyl) fumarate, bis(4 - isocyanatobenzyl) fumarate, bis(4-isocyanatophenylethyl) glutaconate, bis(7-isocyanato - 2 - naphthylmethyl) itaconate, bis[4(3'-isocyanatopropyl)phenyl] fumarate, bis(4-isocyanatomethylphenyl) fumarate, bis[2(3'-isocyanatopropyl)naphthyl] glutaconate, bis(4-isocyanato - 2 - methylphenyl) alphahydromuconate, bis(6-isocyanato-2,4-xylyl) fumarate, bis(4-isocyanato-3-cumenyl) fumarate, bis(4-isocyanato - 2 - methoxyphenyl) glutaconate, bis(4-isocyanatostyryl) itaconate, bis(4-isocyanatocinnamyl) fumarate, bis[4(4'-isocyanato - 2' - butenyl)phenyl] glutaconate, and the like.

The preferred novel ester diisocyanates are composed of carbon, hydrogen, oxygen, and nitrogen atoms. However, the novel diisocyanates can also contain groups such as oxy, thio, polythio, sulfonyl, sulfinyl, carbonyloxy, nitro, cyano, halo, carbonate, and the like.

The novel ester diisocyanates can be produced in relatively high yields by novel processes which involve the reaction of the corresponding ester diamine dihydrohalide starting material, contained in an inert, normally-liquid reaction medium, with a carbonyl dihalide, and thereafter recovering the ester diisocyanate product.

The starting materials for the production of the novel ester diisocyanates of the present invention, as hereinbefore indicated, are the corresponding olefinically unsaturated ester diamines or ester diamine salts. The ester diamine salts can be conveniently represented by the following general formula:

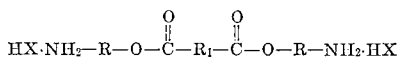

V $\quad HX \cdot NH_2-R-O-\overset{O}{\underset{\|}{C}}-R_1-\overset{O}{\underset{\|}{C}}-O-R-NH_2 \cdot HX$ wherein R and $R_1$ have the same values as shown in Formula I above and HX represents hydrogen chloride, hydrogen bromide, or mineral acids such as sulfuric, phosphoric, and the like. Other acid salts can also be utilized but inasmuch as hydrogen chloride has a common anion with phosgene it is the preferred salt, both from this, as well as economic considerations.

The preparation of the olefinically unsaturated ester diamines, and their hydrohalides, such as bis(2-aminoethyl) fumarate, bis(2-aminoethyl) fumarate dihydrohalide, bis(4-aminophenyl) fumarate dihydrohalide and the like is the subject matter of an application entitled "Novel Amino Esters of Olefinically Unsaturated Polycarboxylic Acids and Process For Preparation" by T. K.

Brotherton and J. W. Lynn, Ser. No. 212,481, abandoned, filed July 25, 1962, and assigned to the same assignee as the instant invention.

These diamino starting materials are prepared, as indicated in the examples, and in the aforementioned co-pending application, by the reaction of an olefinically unsaturated polycarboxylic acid halide, such as fumaroyl chloride, and a hydroxy amine hydrohalide, such as monoethanolamine hydrohalide, at a temperature of from about 65° to about 95° C. for several hours. The ester diamine dihydrohalide is then isolated, as for example, by filtration and then washed and dried. By the aforementioned process the ester diamine dihydrohalides can be obtained in yields of about 95 percent and higher. For further information regarding the production of the ester diamines and their hydrohalides reference is hereby made to the disclosure of the aforementioned application.

Eminently suitable starting materials which are useful in the preparation of the novel diisocyanates illustrated by Formula II supra are shown in Formula VI below:

VI

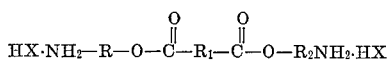

wherein $R_1$, $R_2$, and HX are as previously defined. Illustrative starting compounds include the hydrohalide salts of the following olefinically unsaturated ester diamines: bis(2-aminoethyl) fumarate, bis(3-aminopropyl) glutaconate, bis(4-aminobutyl) alpha-hydromuconate, bis(5-aminopentyl) beta-hydromuconate, bis(7-aminoheptyl) itaconate, bis(2 - methyl - 3 - aminopropyl) fumarate, bis (2,2-dimethyl-3-aminopropyl) fumarate, bis(3 - ethyl-5-aminopentyl) glutaconate, bis(3,4-diethyl-5-aminopentyl) alpha-hydromuconate, bis(4,4 - dimethyl-6 - aminohexyl) beta-hydromuconate, bis(2-methyl-4-ethyl-6-aminohexyl) itaconate, bis(9-aminononyl) fumarate, bis(5,6,7-triethyl-9-aminononyl) fumarate, 2-aminoethyl 3-aminopropyl glutaconate, 3 - aminopropyl 8 - aminooctyl beta-hydromuconate, 5 - aminopentyl 6 - aminohexyl itaconate, 2-methyl-3-aminopropyl 3-aminoethyl fumarate, 4-ethyl-7-aminoheptyl 6 - aminohexyl fumarate, bis(4 - amino - 2-butenyl) glutaconate, bis(4-amino-2-butenyl) itaconate, bis(5-amino-3-pentenyl) fumarate, bis(7 - amino-4-heptenyl) fumarate, bis(8 - amino - 4 - octenyl) glutaconate, bis(9-amino-5-nonenyl) itaconate, bis(10-amino-6-decenyl) fumarate, bis(3-ethyl-5-amino-3-pentenyl) fumarate, bis(3,4-dimethyl-5-amino-3-pentenyl) glutaconate, bis(2-methyl-4-ethyl-6-amino-2-hexenyl) itaconate, bis(5,6,7-triethyl-9-amino-4-nonenyl) fumarate, 4-amino-2-butenyl 3-aminopropyl fumarate, 4-amino-2-butenyl 5-amino-3-pentenyl glutaconate, 4-ethyl-7-amino-5-heptenyl 6-amino-3-hexenyl itaconate, bis(5-amino-2-butynyl) fumarate, bis(7-amino-4-heptynyl) fumarate, bis(9-amino-5-nonynyl) itaconate, bis(2-phenyl - 3 - aminopropyl) fumarate, bis(3-naphthyl-5-aminopentyl) fumarate, bis(3-styryl-5-aminopentyl) glutaconate, bis(4 - tolyl - 6 - aminohexyl) itaconate, bis(6-cumenyl-7-aminoheptyl) fumarate, bis(5-xylyl-8-aminooctyl) fumarate, bis(7-mesityl - 9 - aminononyl) glutaconate, bis(2 - cyclohexyl - 3 - aminopropyl) itaconate, bis(3-cyclohexyl-5-aminopentyl) fumarate, bis (4-cyclohexyl-6-aminohexyl) fumarate, bis(5-cyclohexylmethyl-7-aminoheptyl) glutaconate, bis(3-cycloheptyl-5-aminopentyl) itaconate, bis(3 - cyclohexenyl - 5 - aminopentyl) alpha-hydromuconate, bis(5-cycloheptenylmethyl-8-aminooctyl) fumarate, and the like.

Highly desirable ester diamine salts which can be used for the preparation of the novel ester diisocyanates illustrated by Formula III supra can be represented by Formula VII below:

VII

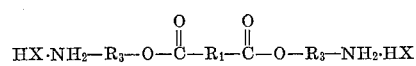

wherein $R_3$, $R_1$, and HX are as previously defined. Illustrative diamino starting materials include the dihydrohalide salts of the following: bis(2 - aminocyclobutyl) fumarate, bis(3 - aminocyclopentyl) fumarate, bis(4- aminocyclohexyl) glutaconate, bis(5-aminocycloheptyl) itaconate, bis(7-aminocyclononyl) alpha-hydromuconate, bis(3-amino-4-cyclopentenyl) beta-hydromuconate, bis(5-amino-6-cycloheptenyl) fumarate, bis(6-amino-7-cyclooctenyl) fumarate, bis(2-aminocyclobutylmethyl) glutaconate, bis(2-amino-2-ethylcyclobutyl) itaconate, bis[2 (2'-aminoethyl)cyclobutyl] fumarate, bis(3-aminocyclopentylmethyl) fumarate, bis(3-amino-2-ethylcyclopentyl) glutaconate, bis[3(2'-aminoethyl)cyclopentyl] itaconate, bis(5-aminocycloheptylmethyl) fumarate, bis(3-amino-5-methylcyclohexyl) fumarate, bis(3-amino-5,6-dimethylcyclohexyl) glutaconate, bis(3-amino-4-ethylcyclopentyl) itaconate, bis(3-amino-4,5-diethylcyclopentyl) fumarate, and the like.

The novel ester diisocyanates exemplified by Formula IV supra can be prepared from the corresponding ester diamine salts having the formula:

VIII

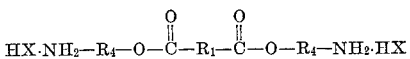

wherein $R_1$, $R_4$, and HX have the same values as previously indicated. Examples of such diamine compounds include the dihydrohalide salts of: bis(4-aminophenyl fumarate, bis(2-aminophenyl) fumarate, bis(3-aminophenyl) glutaconate, bis(7-amino-2-naphthyl) alphahydromuconate, bis(7 - amino - 1 - naphthyl) beta-hydromuconate, bis(4' - amino - 4 - biphenylyl) itaconate, bis(5-amino-2-indenyl) fumarate, bis(4-aminobenzyl) fumarate, bis(4-aminophenylethyl) glutaconate, bis(7-amino-2-naphthylmethyl) itaconate, bis[4(3'-aminopropyl)-phenyl] fumarate, bis(4-aminomethylphenyl) fumarate, bis[2(3'-aminopropyl)naphthyl]glutaconate, bis(4-amino-2-methylphenyl) alpha-hydromuconate, bis(6-amino-2,4-xylyl) fumarate, bis(4-amino-3-cumenyl) fumarate, bis(4-amino-2-methoxyphenyl) glutaconate, bis(4-aminostyryl) itaconate, bis(4-aminocinnamyl) fumarate, bis[4(4'-amino-2'-butenyl)phenyl] glutaconate, and the like.

In general, the conversion of the ester diamine or ester diamine salt reactants to the novel ester diisocyanate is accomplished by contacting a carbonyl dihalide, more preferably, by sparging phosgene, through a slurry of the ester diamine or the ester diamine dihydrohalide contained in an inert, normally liquid organic medium at a temperature within the range of from about 100° C., and lower to about 225° C., more preferably from about 125° C. to about 170° C., and thereafter recovering the novel ester diisocyanate. In either instance, it is believed that the intermediate carbamoyl chloride is first formed from the free amine and subsequently thermally degraded to the diisocyanate at the reaction temperature employed. The process can be conducted in either a batch type or continuous reactor.

In general, the liquid reaction medium employed in the conversion of the ester diamine or ester diamine salt to the corresponding novel ester diisocyanate should be inert to the reactants and stable under the conditions employed. Moreover, it should be easily separable from the resulting ester diisocyanate. Typical inert, liquid media which have been found suitable for utilization in the process of the present invention include, among others, the aromatic hydrocarbons such as toluene, xylene, naphthalene, tetrahydronaphthalene, benzene, biphenyl, cumene, amylbenzene; the cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methyl isobutyl ketone, methyl hexyl ketone, diisopropyl ketone; and other organic media such as tetramethylene sulfone, and the like.

Although reaction temperatures within the aforementioned range of from about 100° C. to about 225° C., have been found desirable, temperatures above and below this range can also be employed. However, from economic consideration the optimum yield and rate of reaction are attained within the aforesaid range. The particular temperature employed will be dependent, in part, upon the ester diamine or ester diamine salt starting material. Moreover, the optimum temperature for the conversion of the diamino reactant to the novel ester diisocyanate is influenced, to a degree, by other reaction variables. For instance, in a batch type reactor with ortho-dichlorobenzene as the inert reaction medium, an amine hydrohalide concentration of 5–25 weight percent, based on the weight of the medium, and a phosgene feed rate of 0.5 to 10 mols per mol of amine hydrohalide per hour, the optimum temperature range is from about 125° C. to about 170° C. At temperatures below 125° C., the reaction times were too long to be practical, while at temperatures above 170° C. the diisocyanato product was, in part, converted to resinous materials.

The pressure is not critical and the novel processes can be conducted at atmospheric, subatmospheric, and superatmospheric pressures.

Although the novel processes preferably are conducted with phosgene, in its broadest concept the process includes the utilization of any carbonyl dihalide such as carbonyl difluoride, or carbonyl dibromide. However, for economic consideration phosgene is the preferred carbonyl dihalide. In the preparation of the novel diisocyanates, phosgene can be used in either the gaseous or liquid form.

Inasmuch as the yield and rate of information of the novel ester diisocyanate product are dependent upon several variables, for example, concentration of the ester diamino reactant, solubility of the ester diamino reactant and phosgene in the reaction medium, reaction temperature, pressure, and rate of addition of the phosgene, no hard and fast rule can be devised regarding the optimum conditions to be employed in practicing the novel processes.

In a preferred embodiment of the present process the ester diamine dihydrohalide is slurried in 1,2,4-trichlorobenzene. Thereafter, gaseous phosgene is then sparged through the reaction mixture at a temperature within the aforesaid range and for a period of time to essentially complete the reaction. After removal of the hydrogen chloride by-product and the chlorinated benzene a crude diisocyanate product is obtained which is refined by known purification techniques such as distillation, recrystallization, washing, and the like.

In practice, it has been found that the mol ratio of phosgene to ester diamine dihydrohalide in the initial reaction medium preferably should be in excess of 3:1, although satisfactory results have been obtained at a lower ratio. When the phosgene subsequently is sparged into the reaction medium feed rates of up to about 10 mols of phosgene per mol of amine per hour are preferred, although higher rates can equally as well be employed.

The novel diisocyanates are an extremely useful class of compounds which possess exceptionally attractive and outstanding properties. The reaction products of the novel aliphatic diisocyanates are highly resistant to sunlight or ultra-violet light degradation. For example, the use of the novel diisocyanates as the isocyanate source in the preparation of, for example, polyurethane films, elastic, and relatively non-elastic fibers, coatings, cast elastomers, etc., results in non-yellowing products which have strong commercial appeal as well as performance characteristics. It should be noted that non-yellowing elastomeric and non-elastomeric thread or fiber are in great demand within the industry since the commercial products based on aromatic isocyanates rapidly turn yellow in sunlight. The novel diisocyanates such as bis(2-isocyanatoethyl) fumarate, bis[(2-isocyanato-1-methyl)ethyl] fumarate, and others, are non-lachrymators which possess relatively little or no odor at ordinary working temperatures and thus allows for their use without the need for special venting systems and/or face masks. On the other hand, both tolylene diisocyanate, the largest volume commercial diisocyanate, and hexamethylene diisocyanate, the only aliphatic diisocyanate currently available in commercial quantities, are extremely strong lachrymators.

Isocyanates, as a class, should be considered to be toxic materials with relative orders of toxicity. Using tolylene diisocyanate and hexamethylene diisocyanate as the yardsticks, the following has been observed. Toxicity by skin absorption: (a) hexamethylene diisocyanate—high toxicity; (b) tolylene diisocyanate—moderate toxicity; (c) bis(2 - isocyanatoethyl) fumarate and bis[(2 - isocyanato-1-methyl)ethyl] fumarate—extremely low toxicity. Skin sensitization tests: (a) hexamethylene diisocyanate and tolylene diisocyanate—severe sensitizers; (b) bis(2-isocyanatoethyl) fumarate and bis[(2-isocyanato-1-methyl)ethyl] fumarate—extremely mild sensitizers. It should be noted that the practical utility of hexamethylene diisocyanate has been severely limited because of its extremely high toxicity.

With the exception of the highly expensive vinylene diisocyanate (which is an extremely potent lachrymator and undoubtedly highly toxic), the novel diester diisocyanates such as bis(2-isocyanatoethyl) fumarate, bis[(2-isocyanato-1-methyl)ethyl] fumarate, and other diisocyanates encompassed within Formula I supra, appear to be the only known and/or available aliphatic diisocyanates which can undergo polymer forming reactions by both true vinyl polymerization and isocyanate condensation polymerization routes.

Many of the novel diisocyanates such as bis(2-isocyanatoethyl) fumarate and bis[(2-isocyanato-1-methyl)-ethyl] fumarate are relatively inexpensive compounds which can readily compete with tolylene diisocyanate on a commercial scale. Based on presently known processes for preparing vinylene diisocyanate, this latter diisocyanate is definitely not competitive (on an economic basis) with the afore-illustrated novel diisocyanates. Moreover, as indicated previously, vinylene diisocyanate is a potent lachrymator and undoubtedly highly toxic which characteristics place severe limitations on its acceptance and applicability.

Of outstanding importance and utility with regard to the novel diisocyanates is their ability to undergo true vinyl polymerization and isocyanate condensation polymerization. For example, the novel diisocyanates can be homopolymerized or copolymerized with a host of ethylenically unsaturated compounds, e.g., styrene, vinyl chloride, butadiene, isoprene, chloroprene, ethyl acrylate, methyl acrylate, etc., through the ethylenic bond of the reactant(s), under conventional vinyl polymerization conditions, to give polymers of varying molecular weight which contain a plurality of pendant or free isocyanato groups. The following specific equation which is not to be construed as limiting in scope illustrates the overall reaction:

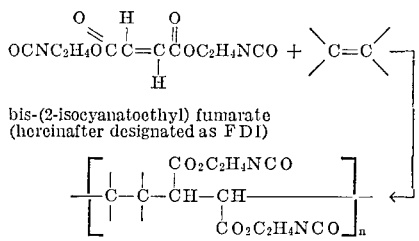

bis-(2-isocyanatoethyl) fumarate
(hereinafter designated as FDI)

wherein $n$ is a number having a value greater than one and upwards to several hundred, e.g., from two to 200, and higher and wherein $>C=C<$ represents an ethylenically unsaturated organic compound which contains at least one polymerizable ethylenic bond, e.g., vinyl chloride, butadiene, etc. The resulting polyisocyanato-containing polymers then can be subjected to isocyanate condensation polymerization reactions with an active polyhydrogen compound, e.g., polyol, polyamine, etc., as explained hereinafter to give useful three dimensional, crosslinked solid products which can be termed poly(vinyl urethanes).

poly(vinyl ureas), etc., depending on the active hydrogen compound employed.

The reaction of the novel diisocyanates of Formula I supra, on the other hand, with an active monohydrogen compound, e.g., monoamine, alkanol, etc., results in novel ethylenically unsaturated compounds which in turn can be polymerized with an ethylenically unsaturated organic compound which contains at least one polymerizable ethylenic bond, e.g., the so-called "vinyl monomers," through the polymerizable carbon to carbon double bond, to yield a myriad of polymeric products. The following equations are illustrative of typical reactions:

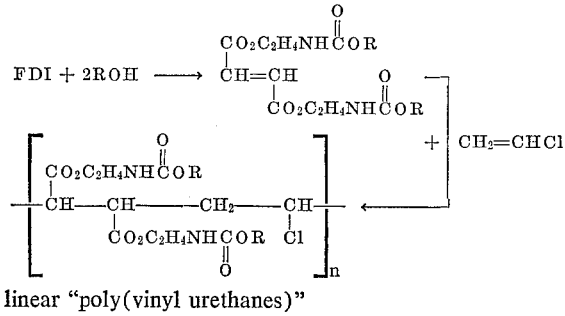

linear "poly(vinyl urethanes)"

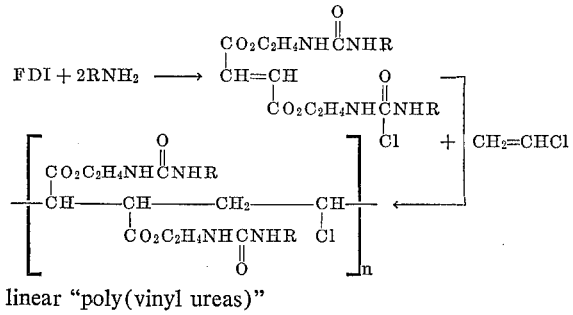

linear "poly(vinyl ureas)"

The variable $n$ has the aforesaid values.

Isocyanate condensation polymerization reactions involving a difunctional compound such as a diol, diamine, etc., with the novel diisocyanates of Formula I can yield linear polyethylenically unsaturated polymeric products, e.g., polyurethanes, polyureas, etc., which products can be crosslinked to useful solids by reaction with diolefins, e.g., divinylbenzene, butadiene, and the like. The overall reactions can be illustrated as follows:

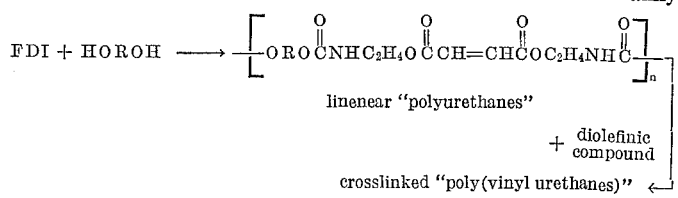

linenear "polyurethanes"

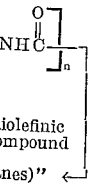 + diolefinic compound crosslinked "poly(vinyl urethanes)"

Crosslinked poly(vinyl urethanes) can also be prepared via a "one-shot" process which involves concurrent vinyl and condensation polymerization reactions, for example:

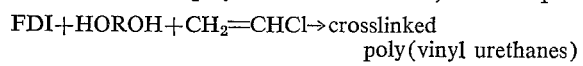
poly(vinyl urethanes)

Thus, it is apparent that the novel polyisocyanates permit the wedding of low cost vinyl monomers, i.e., ethylenically unsaturated organic monomers which contain at least one polymerizable ethylenic bond, with high performance polyurethanes, polyureas, and the like. This advantage has outstanding significance in the development of a myriad of products (based on the novel diisocyanates) which have exceptionally strong commercial and economic attractiveness.

Of the novel diisocyanates, the bis(omega-isocyanatoalkyl) fumarates deserve special mention. Of these, bis-(2-isocyanatoethyl) fumarate (FDI) and bis(2-isocyanato-1-methylethyl) fumarate (LIFDI) are of high significance since products made therefrom, e.g., elastic films and fibers, thermoplastic resins, cast resins, etc., possess, among other things, outstanding and exceptional characteristics. Bis(2-isocyanatoethyl) fumarate (hereinafter designated as FDI) possesses the following properties: molecular weight—254; $n_D^{30}$—1.4623; melting point—52° C.±1° C.; boiling point—about 152° C./0.2 mm. of Hg; appearance—crystalline solid; solubility—soluble in most of the common organic solvents, e.g., hexane, heptane, benzene, chlorobenzene, toluene, etc. Bis(2 - isocyanato-1-methylethyl) fumarate (hereinafter designated as LIFDI), on the other hand, is a very mobile, water-white liquid, a characteristic which cannot be overemphasized in isocyanate and urethane chemistry as witnessed by the huge success of tolylene diisocyanate (TDI). Further properties of LIFDI include the following: molecular weight—282; $n_D^{30}$—1.4719; boiling point—144°–145° C./0.15 mm. of Hg; and solubility characteristics similar to that of FDI.

Of the several mono- and polyisocyanates (excluding the aforesaid vinylene diisocyanate) published in Annalen, 562, pages 122–135 (1949), the only aliphatic diisocyanate which contained a carbon to carbon double bond was 2-butenylene diisocyanate, $$OCNCH_2CH=CHCH_2NCO$$

As is well documented in the literature, olefinic compounds which contain allylic hydrogen are not considered to be true vinyl monomers in a practical sense. The aforesaid diisocyanate falls into this category.

U.S. Pat. No. 2,797,232, issued June 25, 1957, is directed to the preparation of so-called "hidden polyisocyanates" which are obtained via the reaction of "hydroxyalkyl-carbamic acid-aryl esters" with polycarboxylic acids. These "hidden polyisocyanates" upon heating to temperatures above 150° C., are purported to yield free polyisocyanates. In accordance with the patentee's disclosure, various attempts were made to prepare free polyisocyanate from the "hidden polyisocyanate" in the applicants' laboratory. Firstly, the decomposition or thermal degradation of the reaction product of phenyl N-(2-hydroxyethyl) carbamate (termed by the patentee as "hydroxyethyl-carbamic acid-phenyl ester") and maleic acid anhydride (the sole ethylenically unsaturated acid, anhydride, or acyl halide disclosed by the patentee), i.e., the purported "hidden polyisocyanate," failed to result in any recoverably free diisocyanate. In lieu of maleic acid anhydride, the applicants then employed maleic acid, fumaroyl chloride, succinic acid, and adipic acid in the above experiments. Failure to produce any recoverable free diisocyanate was encountered in each instance. These experiments were effected with meticulous care, using sophisticated chemical techniques. Applicants operative Examples 23 through 26 in this specification emphatically and unequivocally establish that by following the teachings of U.S. Pat. 2,797,232, using the most optimum conditions and sophisticated chemical techniques, no recoverable free diisocyanate is obtained from the thermal degradation or decomposition of the "hidden polyisocyanate," i.e., the reaction product of phenyl N-(2-hydroxyethyl) carbamate with maleic acid anhydride, maleic acid, fumaroyl chloride, succinic acid, or adipic acid. It should be noted, in passing, that maleate compounds are, in general, sluggish vinyl monomers when compared with fumarate monomers.

In one aspect, the invention is directed to the preparation of novel multifunctional polymers of the novel diisocyanates of Formula I supra. In general, the novel polymers of this aspect, i.e., the homopolymers of the novel diisocyanates, the copolymers of a mixture containing the novel diisocyanates, and the copolymers of a mixture containing the novel diisocyanate(s) and an ethylenically unsaturated organic compound(s) possessing at least one polymerizable ethylenic group, are characterized by the presence of a plurality of pendant isocyanatohydrocarbyloxycarbonyl-containing groups, i.e.,

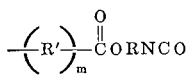

wherein R has the values set out in Formula I supra, wherein R' is a divalent saturated aliphatic radical which preferably contains up to 22 carbon atoms, and wherein $m$ is an integer which has a value of zero or one. More particularly, the novel polymers are characterized by Unit IX below:

IX
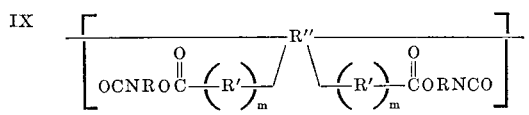

wherein R" is a tetravalent saturated aliphatic which possesses two (and only two) carbon atoms in the polymeric chain, wherein each R' is a divalent saturated aliphatic radical, wherein each $m$ is an integer having a value of zero or one, wherein the moiety

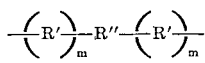

preferably contains up to 24 carbon atoms and preferably still, up to 10 carbon atoms, wherein each R has the values enumerated in Formula I supra; with the provisos that (1) each isocyanato moiety (—NCO) of the above unit is at least two carbon atoms removed from the oxycarbonyl moiety

and (2) each isocyanatohydrocarbyloxycarbonyl moiety, i.e.,

is monovalently bonded to separate carbon atoms, and preferably vicinal carbon atoms which form part of the polymeric chain. Unit IX supra occurs at least once in novel polymers. However, for use in many applications as will become apparent from a consideration of this specification, the novel polymers preferably are characterized by a plurality of the structures identified as Unit IX above, i.e., greater than one and upwards to several hundred, for example, from two to 200, and higher.

A particular eminent class of novel polyisocyanato-containing polymers which should be highlighted in generic manner are characterized by Unit IXA below:

IXA
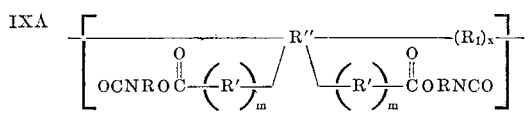

wherein the variables R", R', R, and $m$ have the meanings set out in Unit IX supra (including the general and preferred values as well as the provisos), wherein $R_1$ is a substituted or unsubstituted divalent radical which contains two carbon atoms in the polymeric chain ($R_1$, in effect, is the polymerizable comonomer which enters into chemical union with the other monomer(s) through the polymerizable ethylenic bond), and wherein $x$ has a value of zero or one.

A highly desirable subarea of novel polyisocyanato-containing polymers which deserve special mention are characterized by Unit IXB below:

IXB
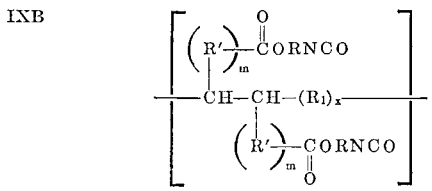

wherein the variables R', $R_1$, R, $m$, and $x$ have the values noted in Unit IXA supra.

Those novel polyisocyanato-containing polymers which contain at least one of, preferably a plurality of, the structure defined as Unit IXC below, represent a significant contribution to the art, to wit:

IXC
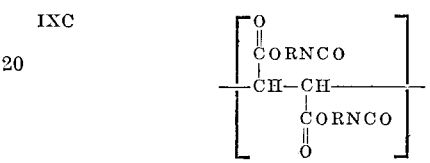

wherein R is an alkylene radical which preferably contains from 2 to 12 carbon atoms. It is preferred that the structure defined as Unit IXC represent a repeating unit such that the novel polymer is characterized by at least two and upwards to 200, and higher, of Unit IXC therein. It is further preferred that the R radical be ethylene, trimethylene, tetramethylene, methyl substituted ethylene, or methyl substituted trimethylene.

Novel polymers characterized by one or more (and upwards to 200, and higher) of Unit IXD below represent a highly important embodiment of the invention, that is:

IXD
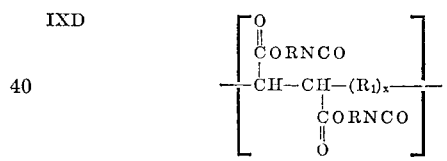

wherein R has the broad and preferred values set out in Unit IXC supra, and wherein $R_1$ and $x$ have the values noted in Unit IXA supra.

Illustrative polymers characterized by the presence of the aforesaid recurring unit include the homopolymers of the bis(isocyanatohydrocarbyl) fumarates as exemplified by the poly[bis(omega-isocyanatoalkyl) fumarates] such as poly[bis(2-isocyanatoethyl) fumarate] poly[bis(2-isocyanato-1-methylethyl) fumarate], poly[bis(3-isocyanato-n - propyl) fumarate], poly[bis(3 - isocyanato-methylpropyl) fumarate], poly[bis(4-isocyanato-n-butyl) fumarate], and the like; the copolymers of the bis(isocyanatohydrocarbyl) fumarate with other ethylenically unsaturated organic compounds as illustrated by the copolymers of (1) the bis(omega-isocyanatoalkyl) fumarates such as bis(2 - isocyanatoethyl) fumarate, bis(2-isocyanato-1-methylethyl) fumarate, bis(3-isocyanato-n-propyl) fumarate, bis(3-isocyanato-methylpropyl) fumarate, bis-(4-isocyanato-n-butyl) fumarate, and the like; and (2) other ethylenically unsaturated organic compounds such as styrene, vinyl chloride, vinylidene chloride, methyl acrylate, vinyl methyl ether, methyl methacrylate, 2-ethylhexyl acrylate, vinyl acetate, and/or the diisocyanates of Formula I supra, and the like.

As hereinbefore indicated, the novel polymers of the instant invention are obtained by effecting polymerization of the novel diisocyanate through an ethylenic group. As a result, each of the polymers obtained is characterized by pendant isocyanato-terminated ester groups along the polymer chain. Depending upon the amount of polymerizable novel diisocyanate employed with other vinyl monomers, the copolymers obtained in accordance with the teachings of this aspect have a wide variety of useful properties and applications. For example, copolymerization of a mixture of styrene, 2-ethylhexylacrylate, and bis(2-isocyanatoethyl) fumarate, in a weight ratio of 45:50:5, furnished a soft, flexible film. In contrast, when the copolymerization was conducted in the same manner with the respective monomers in a ratio of 70:25:5 the resulting polymeric film was hard and exhibited little tendency to bend. In addition, by virtue of the highly reactive pendant isocyanato groups, the polymers can be further reacted with active hydrogen-containing compounds to form other novel products useful as coatings, adhesives, castings, foams, and the like.

It is pointed out at this time that the term "polymer(s)" is used in its generic sense, i.e., this term encompasses within its scope polymers prepared from a sole novel diisocyanate as well as a mixture containing two, three, four, etc., polymerizable monomers, at least one of which is a novl diisocyanate. Thus, homopolymers and copolymers are encompassed within the term "polymer." Each of the polymerizable monomers entering into the copolymerization reaction do so in significant quantities. As such, the resulting copolymeric products can be chemically distinguishable from the homopolymeric products which would result from the homopolymerization of the monomers separately.

A distinguishing feature of the copolymeric materials is that at least one of the monomers from which the copolymers are made has both an isocyanate portion and an olefinically unsaturated portion. In addition, the polymers can contain one or more vinyl monomers chemically combined therein. In general, the concentration of the polymerizable monomers chemically combined in the novel polymers can vary over the entire range, e.g., from about 0.5, and lower, to about 99.5 weight percent and higher of the polymerizable reactants chemically combined therein, based on the total weight of said reactants. Those copolymers which contain at least 50 weight percent of vinyl monomer, based on the weight of said polymer, are highly preferred. Those copolymers which contain at least about 50 to about 97 weight percent vinyl monomer, and from about 50 to about 3 weight percent ester diisocyanate are eminently preferred.

The novel polymers can be prepared by reacting an admixture comprising novel diisocyanate(s) with/without a vinyl momoner(s) plus a catalytically significant quantity of a vinyl polymerization catalyst, particularly the free radical producing catalysts, under conventional vinyl polymerization conditions.

The free radical producing catalysts are voluminously documented in the art and well known to those skilled in the vinyl polymerization art. Illustrative thereof are those compounds which contain the divalent —O—O— unit as exemplified by (1) R—O—O—R wherein R is alkyl, aryl, haloaryl, acyl, etc.; (2) R'—O—O—H wherein R' is a nonacyl radical such as hydrogen, alkyl, etc.; (3) R"—O—O—H wherein R" is acyl; (4) the azo-compounds; and the like. Specific illustrations include, among others, hydrogen peroxide, dibenzoyl peroxide, acetyl peroxide, benzoyl hydroperoxide, t-butyl hydroperoxide, di-t-butyl peroxide, lauroyl peroxide, butyryl peroxide, dicumyl peroxide, azo-bis-isobutyronitrile, the persulfates, percarbonates, perborates, peracids, etc., such as persuccinic acid, diisopropyl peroxydicarbonate, t-butyl perbenzoate, di-t-butyl diperphthalate, peracetic acid, and the like. Ionic catalysts such as boron trifluoride and anionic catalysts such as sodium phenyl may also be employed in certain cases.

The catalysts are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. For optimum results, the particular catalyst employed, the nature of the monomeric reagent(s), the operative conditions, under which the polymerization reaction is conducted, and other factors will largely determine the desired catalyst concentration.

The vinyl polymerization reaction can be conducted at a temperature in the range of from about 0°, and lower, to about 200° C., and higher, preferably from about 20° C. to about 150° C. As a practical matter, the choice of the particular temperature at which to effect the polymerization reaction depends, to an extent, on the variables illustrated above. The reaction time can vary from several seconds to several days. A feasible reaction period is from about a couple of hours, and lower, to about 100 hours, and longer. Preferably, the reaction takes place in the liquid phase.

The vinyl polymerization can, if desired, be carried out in an inert normally liquid organic vehicle. The suitable inert vehicles are preferably those which do not react with either the polymerizable monomer or the ester diisocyanate. In view of the reactivity of isocyanato groups with labile hydrogen-containing materials, the preferred vehicles for the polymerization are those which do not possess active hydrogens or contain impurities which possess active hydrogens. Illustrative vehicles which may be satisfactorily used are the aromatic hydrocarbons such as toluene, xylene, naphthalene, tetrahydronaphthalene, benzene, biphenyl, cymene, amylbenzene; the cycloaliphatic hydrocarbons such as cyclohexane, cyclopentane, decahydronaphthalene; the dialkyl ketones such as acetone, diisobutyl ketone, methyl isobutyl ketone, diisopropyl ketone; the organic esters such as ethyl acetate, and other inert, normal-liquid, organic vehicles.

The molar ratio of polymerizable reactants to vehicle is not particularly critical, and it can vary, for example, from about 1:1, and lower, to about 1:1000, and higher. In general, it is desirable to employ a molar excess of organic vehicle.

The polymerizable monomers used in the copolymerization reaction with the novel ester diisocyanates are preferably the ethylenically unsaturated organic compounds which are free of reactive hydrogen atoms as determined according to the Zerewitinoff test and which will not react with the isocyanato group. These compounds can be used singly or in combinations of two or more and are characterized by the presence therein of at least one polymerizable ethylenic group of the type $>C=C<$. These compounds are well known in the art and include, for example, the alkenes, alkadienes, and the styrenes such as ethylene, propylene, 1-butylene, 2-butylene, isobutylene, 1-octene, butadiene, isoprene, 1,4-pentadiene, 1,6-hexadiene, 1,7-octadiene, styrene, alphamethylstyrene, vinyltoluene, vinylxylene, ethylvinylbenzene, vinylcumene, 1,5-cyclooctadiene, cyclohexene, cyclooctene, benzylstyrene, chlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinylphenyl ethyl ether, and the like; the acrylic and substituted acrylic monomers such as methyl acrylate, ethyl acrylate, methyl methacrylate, methacrylic anhydride, acrylic anhydride, cyclohexyl, methacrylate, benzyl methacrylate, isopropyl methacrylate, octyl, methacrylate, acrylonitrile methacrylonitrile, methyl alpha-chloroacrylate, ethyl alpha-ethoxyacrylate, methyl alpha-acetamidoacrylate, butyl acrylate, ethyl alpha-cyanoacrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene cyanide, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-vinyloxazolidinone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinylisocyanate, tetrafluoroethylene, chlorotrifluoroethylene, nitroethylene, and the like.

As indicated previously, the novel polyisocyanato-containing polymers can contain as many as 200, or more, of the units designated as Units IX through IXD supra. In general, these polymers are in the solid range, and they are substantially linear and non-crosslinked. In an exceedingly important embodiment there can be prepared relatively low molecular weight polymeric aliphatic multi-isocyanates, many of which are pourable, i.e., liquid. In particular, the relatively low molecular weight polymers of bis[omega-isocyanato($C_2$–$C_{12}$ alkyl)] fumarates and substituted fumarates deserve special mention in view of their commercial attractiveness in preparing non-yellowing rigid urethane foams, cast resins, thermoplastic resins, coatings, etc., which have high performance characteristics. Polymers of bis(2-isocyanatoethyl) fumarate and bis(2-isocyanato-1-methylethyl) fumarate are preferred. These relatively low molecular polyisocyanato-containing polymers are characterized by the recurring unit identified as Unit IXC supra, or a mixture of recurring units which fall within the scope of Unit IXC supra. Other vinyl monomers such as styrene, vinyl chloride, vinylidene chloride, vinyl acetate, ethylene, methyl acrylate, etc., may also be copolymerized with the bis[omega-isocyanato($C_2$–$C_{12}$ alkyl)] fumarates to yield relatively low molecular weight polyisocyanato-containing polymers.

The aforesaid relatively low molecular weight polymers can be prepared via the vinyl polymerization routes discussed previously, using a free radical producing catalyst as illustrated supra, e.g., a compound which contains the unit —O—O—, under the operative conditions set out above. It will be necessary, however, in the preparation of these telomers or low molecular weight polymers to employ a normally-liquid organic solvent which possesses a relatively high transfer agent constant as illustrated by the polyhalogenated lower alkanes, e.g., chloroform, carbon tetrachloride, iodiform, bromoform, pentachloroethane, and the like; the various allylic compounds of the type $CH_2$=$CHCH_2X$ (the variable X being, for instance, halogen), and the like. The aforesaid exemplified solvents do not contain functional groups which are reactive with isocyanato groups under the conditions employed. Carbon tetrachloride is the preferred transfer agent. The concentration of the organic solvent is of the order described previously for the inert organic vehicles.

The aforesaid relatively low molecular weight polyisocyanato-containing polymers may more properly be termed telomers since examination thereof has shown the presence of the telogen (the normally liquid organic solvent) therein. In general, as the preferred telogens are the halogenated aliphatic hydrocarbons, the resulting telomers may be characterized by fragments of the telogen at the terminal sites of the polymeric molecule. For example, with carbon tetrachloride as the organic solvent of choice, the carbon tetrachloride acts in a manner somewhat similar to a chain stopper. Thus, the resulting telomer can be characterized with a chloride fragment and a trichloromethyl fragment at the terminal sites of the polymeric chain thereof. As a rule of thumb, if the telogen is represented by RX wherein X is halo such as chloro, bromo, etc., and R is a monovalent aliphatic hydrocarbon radical or a monovalent mono- or polyhalogenated hydrocarbon radical such as alkyl, the chlorinated alkyls, etc., the resulting telomer may be considered to possess the R and X fragments (of the telogen) at the terminal sites of the polymeric molecule.

To a significant degree, the diisocyanate(s) of choice, the organic solvent or telomer of choice, the concentration of the diisocyanate(s) and organic solvent, the purity of the diisocyanate(s), etc., will largely influence the resulting molecular weight of the polymer. Consequently, it will be necessary to one having ordinary skill in the art to correlate, in a routine fashion, the various variables illustrated above as well as the vinyl polymerization operative conditions in order to obtain the desired polyisocyanato-containing polymeric products.

The novel relatively low molecular polymers which result from this embodiment have average molecular weights ranging up to about 5000, and preferably up to about 2500. These polymers are characterized in that they contain from 2 to about 20, preferably from 3 to about 10, of the units designated as Unit IXC supra.

Of particular importance are the telomers of bis[omega-isocyanato($C_2$–$C_{12}$ alkyl)] fumarates, citraconates, and itaconates, and especially those which have the recurring units, respectively:

IXE and

IXF

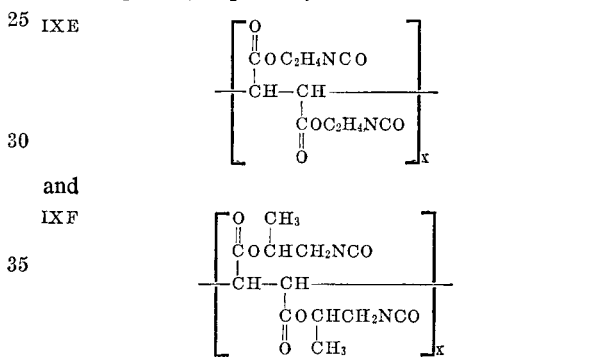

wherein $x$ equals 2 to about 20, preferably from 3 to about 10.

In one aspect, the invention is directed to the preparation of novel products which result from the reaction of the novel polyisocyanates such as those exemplified by Formula I and Units IX through IXF supra and other novel polyisocyanates exemplified hereinafter with compounds which contain at least one reactive hydrogen as determined according to the Zerewitinoff test described by Wohler in the Journal of the American Chemical Society, volume 48, page 3181 (1927). Illustrative classes of compounds which contain at least one active hydrogen include, for instance, alcohols, amines, carboxylic acids, phenols, ureas, urethanes, hydrazines, water, ammonia, hydrogen sulfide, imines, thioureas, sulfimides, amides, thiols, amino alcohols, sulfonamides, hydrazones, semicarbazones, oximes, hydroxycarboxylic acids, aminocarboxylic acids, vinyl polymers which contain a plurality of pendant active hydrogen substituents such as hydroxyl or amino, and the like. In addition, the hydrogen substituent may be activated by proximity to a carbonyl group. The active hydrogen organic compounds represent a preferred class.

Illustrative of the aforesaid active hydrogen compounds are the hydroxyl-containing compounds, especially those which possess at least one alcoholic hydroxyl group and preferably at least two alcoholic hydroxyl groups. Typical compounds include, for instance, the monohydric alcohols such as methanol, ethanol, propanol, isopropanol, 1-butanol, allyl alcohol, 2-butanol, tert-butanol, 3-butenol, 1-pentanol, 3-pentanol, 1-hexanol, hex-5-en-1-ol, 3-heptanol, 2-ethyl-1-hexanol, 4-nonanol, propargyl alcohol, benzyl alcohol, cyclohexanol, cyclopentanol, cycloheptanol, and trimethylcyclohexanol. Further alcohols contemplated include glycidol, 4-oxatetracyclo[6.2.1.0$^{2,7}$.0$^{3,5}$] undecan-9-ol, and the monoesterified diols such as those prepared by the reaction of equimolar amounts of an organic monocarboxylic acid, its ester, or its halide, with a diol such as alkylene glycols, mono- and polyether diols, mono- and polyester diols, etc., e.g.,

wherein

is acyl and R' is a divalent organic radical containing at least two carbon atoms in the divalent chain; the monoetherified diols such as those represented by the formula $R_1OR'OH$ wherein $R_1$ represents a monovalent organic radical such as a hydrocarbyl or oxahydrocarbyl radical and R' has the aforesaid value; the mono-ols produced by the partial esterification reaction of a polyol containing at least three hydroxyl groups, e.g., glycerine, with a stoichiometric deficiency of an organic monocarboxylic acid, its ester, or acyl halide; and the like. The aforesaid reactions are well documented in the literature.

Polyhydric alcohols can be exemplified by polyols of the formula HO—R—OH wherein R is a divalent hydrocarbyl radical and preferably a substituted or unsubstituted alkylene radical, the aforesaid formula hereinafter being referred to as "alkylene glycols"; or by the formula HO—R'—OH wherein R' is a substituted or unsubstituted (alkyleneoxy)$_n$ alkylene radical with $n$ being at least one, this latter formula hereinafter being referred to as "polyether glycols." The variables R and R' have at least two carbon atoms in the linear chain, and the substituents or pendant groups on these variables can be, for example, lower alkyl, halo, lower alkoxy, etc., such as methyl, ethyl, n-propyl, isopropyl, chloro, methoxy, ethoxy, and the like. Illustrative alkylene glycols and polyether glycols include ethylene glycol, propylene glycol; butylene glycol; 2,2-dimethyl-1,3-propanediol; 2,2-diethyl-1,3-propanediol; 3-methyl-1,5-pentanediol; 2-butene-1,4-diol; the polyoxyalkylene glycols such as diethylene glycol, dipropylene glycol, dibutylene glycol, polyoxytetramethylene glycol, and the like; the mixed mono- and polyoxyalkylene glycols such as the mono- and polyoxyethyleneoxypropylene glycols, the mono- and polyoxyethyleneoxybutylene glycols, and the like; polydioxolane and polyformals prepared by reacting formaldehyde with other glycols or mixtures of glycols, such as tetramethylene glycol and pentamethylene glycol; and the like. Other polyols include the N-methyl- and N-ethyl-diethanolamines; 4,4'-methylenebiscyclohexanol; 4,4'-isopropylidenebiscyclohexanol; butyne-1,4-diol; the ortho-, meta-, and para-xylene glycols; the hydroxymethyl substituted phenethyl alcohols; the ortho-, meta-, and para-hydroxymethylphenylpropanols; the various phenylenediethanols, the various phenylenedipropanols, the various heterocyclic diols such as 1,4-piperazine diethanol; and the like. The polyhydroxyl-containing esterification products which range from liquid to non-crosslinked solids, i.e., solids which are soluble in many of the more common inert normally liquid organic media, and which are prepared by the reaction of monocarboxylic acids and/or polycarboxylic acids, their anhydrides, their esters, or their halides, with a stoichiometric excess of a polyol such as the various diols, triols, etc.; illustrated previously, are highly preferred. The aforesaid polyhydroxyl-containing esterification products will hereinafter be referred to as "polyester polyols." Those polyester polyols which contain two alcoholic hydroxyl groups will hereinafter be termed "polyester diols." Illustrative of the polycarboxylic acids which can be employed to prepare the polyester polyols preferably include the dicarboxylic acids, tricarboxylic acids, etc., such as maleic acid, succinic acid, glutaric acid, adipic acid, pimelic acid, suberic acid, azelaic acid, sebacic acid, chlorendic acid, 1,2,4-butanetricarboxylic acid, phthalic acid, etc. This esterification reaction is well documented in the literature.

Higher functional alcohols suitable for reaction with the novel polyisocyanates, e.g., the novel diisocyanates and the novel polyisocyanato-containing polymers, include the triols such as glycerol, 1,1,1-trimethylolpropane, 1,2,4-butanetriol, 1,2,6-hexanetriol, triethanolamine, triisopropanolamine, and the like; the tetrols such as erythritol, pentaerythritol, N,N,N',N'-tetrakis(2-hydroxyethyl) ethylenediamine, N,N,N',N' - tetrakis(2 - hydroxypropyl) ethylenediamine, and the like; the pentols; the hexols such as dipentaerythritol, sorbitol, and the like; the alkyl glycosides such as the methyl glucosides; the carbohydrates such as glucose, sucrose, starch, cellulose, and the like.

Other suitable hydroxyl-containing compounds include the mono- and the polyoxyalkylated derivatives of mono- and polyfunctional compounds having at least one reactive hydrogen atom. These functional compounds may contain primary or secondary hydroxyls, phenolic hydroxyls, primary or secondary amino groups, amide, hydrazino, guanido, ureido, mercapto, sulfino, sulfonamido, or carboxyl groups. They can be obtained by reacting, (1) monohydric compounds such as aliphatic and cycloaliphatic alcohols, e.g., alkanol, alkenol, methanol, ethanol, allyl alcohol, 3-buten-1-ol, 2-ethylhexanol, etc.; diols of the class HO(R)$_n$OH and HO(RORO)$_n$H wherein R is alkylene of 2 to 4 carbon atoms and wherein $n$ equals 1 to 10 such as ethylene glycol, propylene glycol, diethylene glycol, dipropylene glycol, and the like; thiodiethanol; the xylenediols, 4,4'-methylenediphenol, 4,4'-isopropylidenediphenol, resorcinol; and the like; the mercapto alcohols such as mercaptoethanol; the dibasic acids such as maleic, succinic, glutaric, adipic, pimelic, sebacic, phthalic, tetrahydrophthalic, and hexahydrophthalic acids; phosphorous acids; phosphoric acids; the aliphatic, aromatic, and cycloaliphatic primary monoamines, like methylamine, ethylamine, propylamine, butylamine, aniline, and cyclohexylamine; the secondary diamines like N,N'-dimethylethylenediamine; and the amino alcohols containing a secondary amino group such as N-methylethanolamine; with (2) vicinal monoepoxides as exemplified by ethylene oxide, 1,2-epoxypropane, 1,2-epoxybutane, 2,3-epoxybutane, isobutylene oxide, butadiene monoxide, allyl glycidyl ether, 1,2-epoxyoctene-7, styrene oxide, and mixtures thereof.

Further examples of polyols are the polyoxyalkylated derivatives of polyfunctional compounds having three or more reactive hydrogen atoms such as, for example, the reaction products (adducts) of 1,1,1-trimethylolpropane with a lower vicinal-epoxyalkane, e.g., ethylene oxide, propylene oxide, butylene oxide, and mixtures thereof, in accordance with the reaction:

$$CH_3CH_2-\underset{\underset{CH_2OH}{|}}{\overset{\overset{CH_2OH}{|}}{C}}-CH_2OH + CH_2-CH_2 \longrightarrow$$

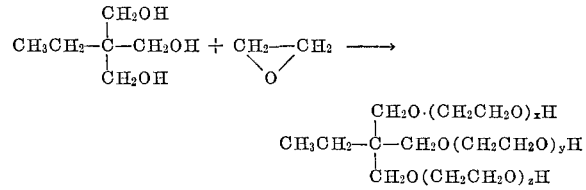

wherein $x+y+z$ equals 3 to 45, and more.

In addition to the polyoxyalkylated derivatives of 1,1,1-trimethylolpropane, the following illustrative compounds are likewise suitable: 1,1,1-trimethylolethane; glycerol; 1,2,4-butanetriol; 1,2,6-hexanetriol; erythritol; pentaerythritol; sorbitol; the alkyl glycosides such as the methyl glucosides; glucose; sucrose; the diamines of the general formula $H_2N(CH_2)_nNH_2$, where $n$ equals 2 to 12; 2-(methylamino)ethylamine; the various phenylene- and toluenediamines; benzidine; 3,3'-dimethyl-4,4'-biphenyldiamine; 4,4'-methylenedianiline; 4,4',4''-methylidynetrianiline, the cycloaliphatic diamines such as 2,4-cyclohexanediamine, and the like; the amino alcohols of the general formula $HO(CH_2)_nNH_2$, where $n$ equals 2 to 10; the polyalkylenepolyamines such as diethylenetriamine, triethylenetetramine, tetraethylenepentamine, and the like; the polycarboxylic acids such as citric acid, aconitic acid, mellitic acid, pyromellitic acid, and the like; and polyfunctional inorganic acids like phosphoric acid. The aforesaid polyfunctional polyoxyalkylated compounds will be referred to hereinafter as "polyoxyalkylated polyols." The polyoxyalkylated polyols which contain two alcoholic hydroxyl groups will be termed "polyoxyalkylated diols" whereas those which contain a sole alcoholic hydroxyl group will be referred to as "polyoxyalkylated mono-ols."

Illustrative amino- containing compounds which are contemplated are those which contain at least one primary amino group (—NH$_2$), or secondary amino group (—NHR wherein R is hydrocarbyl such as alkyl, aryl, cycloalkyl, alkaryl, aralkyl, etc.), or mixtures of such groups. Preferred amino-containing compounds are those which contain at least two of the above groups. Illustrative of the amino-containing compounds include the aliphatic amines such as the alkylamines, e.g., the methyl-, ethyl-, n-propyl-, isopropyl-, n-butyl-, sec-butyl-, isobutyl-, tert-butyl-, n-amyl-, n-hexyl-, and 2-ethylhexylamines, as well as the corresponding dialkylamines; the aromatic amines such as aniline, ortho-toluidine, meta-toluidine, and the like; the cycloaliphatic amines such as cyclohexylamine, dicyclohexylamine, and the like; the heterocyclic amines such as pyrrolidine, piperidine, morpholine, and the like; the various aliphatic diamines of the general formula H$_2$N(CH$_2$)$_n$NH$_2$, monosecondary diamines of the general formula R''NH(CR$_2$)$_n$NH$_2$, and disecondary diamines of the general formula R''NH(CH$_2$)$_n$NHR''', where $n$ equals 2 to 10, and more, and where R'' is hydrocarbyl such as alkyl, aryl, aralkyl, alkaryl, or cycloalkyl; the etheric diamines of the formula NH$_2$—(CH$_2$)$_n$OR'O—(CH$_2$)$_n$NH$_2$ wherein $n$ is an integer of 2 to 10, and wherein R' is alkylene or oxaalkylene of 2 to 10 carbon atoms; the aromatic diamines such as meta-phenylenediamine, para-phenylenediamine, toluene-2,4-diamine, toluene - 2,6 - diamine, 1,5-naphthalenediamine, 1,8-naphthalenediamine, meta-xylylenediamine, para-xylylenediamine, benzidine, 3,3'-dimethyl-4,4'-biphenyldiamine, 3,3' - dimethoxy-4,4'-biphenyldiamine, 3,3'-dichloro - 4,4' - biphenyldiamine, 4,4'-methylenedianiline, 4,4'-methylene-bis(ortho-chloroaniline), 4,4'-ethylenedianiline, 2,3,5,6-tetramethyl - paraphenylenediamine, 2,5-fluorenediamine, and 2,7-fluorenediamine; the cycloaliphatic diamines such as 1,4 - cyclohexanediamine, 4,4' - methylenebiscyclohexylamine, and 4,4'-isopropylidenebiscyclohexylamine; and the heterocyclic amines such as piperazine, 2,5-dimethylpiperazine, 1,4-bis(3-aminopropyl)piperazine, and the like.

Illustrative of the higher functional amino-containing compounds which can be employed include, for example, higher polyalkylenepolyamines such as diethylenetriamine, triethylenetetramine, tetraethylenepentamine, dipropylenetriamine, tripropylenetetramine, tetrapropylenepentamine, and the like; 1,2,5-benzenetriamine; toluene-2,4,6-triamine; 4,4',4''-methylidynetrianiline; and the like; the polyamines obtained by interaction of aromatic monoamines with formaldehyde or other aldehydes, for example:

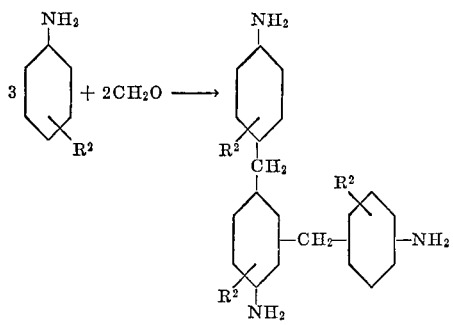

and other reaction products of the above general type, where R$^2$ is, for example, hydrogen or alkyl.

Illustrative of the carboxyl-containing compounds include those organic compounds which contain at least one carboxyl group (—COOH) as exemplified by the monocarboxyl-containing compounds such as alkanoic acids; the cycloalkanecarboxylic acids; the monoesterified dicarboxylic acids, e.g.,

wherein R' is an organic radical such as oxahydrocarbyl, hydrocarbyl, etc., and R is the divalent residue of a dicarboxylic acid after removal of the two dicarboxylic groups; the polycarboxylic acids, e.g., the aliphatic, cycloaliphatic, and aromatic dicarboxylic acids; and the like. Specific examples include propionic acid, butyric acid, valeric acid, dodecanoic acid, acrylic acid, cyclohexanecarboxylic acid, the mono-2-ethylhexyl ester of adipic acid, succinic acid, maleic acid, glutaric acid, adipic acid, pimelic acid, suberic acid, azelaic acid, sebacic acid, chlorendic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, the tetrachlorophthalic acids, 1,5-naphthoic acid, 2,7-naphthoic acid, 2,6-naphthoic acid, 3,3'-methylenedibenzoic acid, 4,4'-(ethylenedioxy)dibenzoic acid, 4,4'-biphenyldicarboxylic acid, 4,4'-sulfonyldibenzoic acid, 4,4'-oxydibenzoic acid, the various tetrahydrophthalic acids, the various hexahydrophthalic acids, tricarballylic acid, aconitic acid, citric acid, hemimellitic acid, trimellitic acid, trimesic acid, pyromellitic acid, 1,2,3,4-butanetetracarboxylic acid, and the like. The polycarboxyl-containing esterification products which range from liquid to non-crosslinked solids and which are prepared by the reaction of polycarboxylic acids, their anhydride, their esters, or their halides, with a stoichiometric deficiency of a polyol such as diols, triols, etc., can also be employed. These polycarboxyl-containing esterification products will hereinafter be referred to as "polycarboxy polyesters."

Compounds which contain at leats two different groups of the class of amino (primary or secondary), carboxyl, and hydroxyl, and preferably those which contain at least one amino group and at least one hydroxyl group, can be exemplified by the hydroxy-carboxylic acids, the aminocarboxylic acids, the amino alcohols, and the like. Illustrative examples include 2-hydroxypropionic acid, 6-hydroxycaproic acid, 11-hydroxyundecanoic acid, salicylic acid, para-hydroxybenzoic acid, beta - alanine, 6-aminocaproic acid, 7-aminoheptanoic acid, 11-aminoundecanoic acid, para-aminobenzoic acid, and the like; the amino alcohols of the general formula HO(CH$_2$)$_n$NH$_2$ where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like; the higher functional amino alcohols having a total of at least three hydroxy and primary or secondary amino groups such as the dihydroxyalkylamines, e.g., diethanolamine, diisopropanol amine, and the like; 2-(2-amino ethylamino)ethanol; 2-amino-2-(hydroxymethyl)-1,3-propanediol; and the like.

The initiated lactone polyesters which contain free hydroxyl group(s) and/or carboxyl group(s) represent extremely preferred active hydrogen containing compounds. These initiated lactone polyesters are formed by reacting, at an elevated temperature, for example, at a temperature of from about 50° C. to about 250° C., an admixture containing a lactone and an organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least one reactive hydrogen substituent preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. The aforesaid polyesters will hereinafter be referred to, in the generic sense, as "initiated lactone polyesters" which term will also include the various "copolymers" such as lactone copolyesters, lactone polyester/polycarbonates, lactone polyester/ polyethers, lactone polyester/polyester/polycarbonates, lactone polyester/polyester, etc. These initiated lactone polyesters will contain at least one hydroxy group and/or at least one carboxyl group depending, of course, on the initiator and reactants employed. Those initiated lactone polyesters which contain at least three alcoholic hydroxyl groups will be referred to as "initiated lactone polyester polyols"; those with two alcoholic hydroxyl groups will be termed "initiated lactone polyester diols." On the other hand, the initiated lactone polyesters which contain at least two carboxyl groups will be referred to as "initiated polycarboxy lactone polyesters."

The preparation of the aforesaid hydroxyl-containing and/or carboxyl-containing initiated lactone polyesters can be effected in the absence or presence of an ester interchange catalyst to give initiated lactone polyesters of widely varying and readily controllable molecular weights without forming water of condensation. These lactone polyesters so obtained are characterized by the presence of recurring linear lactone units, that is, carbonylalkyleneoxy

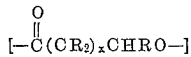

wherein $x$ is from 4 to 6, and wherein the R variables have the values set out in the next paragraph.

The lactone used in the preparation of the initiated lactone polyesters may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

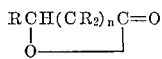

in which $n$ is at least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater number of substituents other than hydrogen on the ring, and lactones having four carbon atoms in the ring, are considered unsuitable because of the tendency that polymers thereof have to revert to the monomer, particularly at elevated temperature.

The lactones which are preferred in the preparation of the hydroxyl-containing and/or carboxyl-containing initiated lactone polyesters are the epsilon-caprolactones having the general formula:

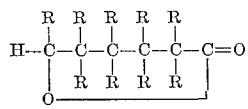

wherein at least six of the R variables are hydrogen and the remainder are hydrogen, alkyl, cycloalkyl, alkoxy, or single ring aromatic hydrocarbon radicals, none of the substituents contain more than about twelve carbon atoms, and the total number of carbon atoms in the substituents on the lactone ring does not exceed about twelve.

Among the substituted epsilon-caprolactones considered most suitable are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone can be employed as starting material. Mixtures comprising the $C_6$ to $C_8$ lactones illustrated previously, with/without, for instance, the alpha, alpha-disubstituted-beta-propiolactone, e.g., alpha, alpha-dimethyl-beta-propiolactone, alpha, alpha-dichloromethyl-beta-propiolactone, etc.; with/ without, for instance, oxirane compounds, e.g., ethylene oxide, propylene oxide, etc.; with/without, for instance, a cyclic carbonate, e.g., 4,4-dimethyl-2,6-dioxacyclohexanone, etc.; are also contemplated.

Among the organic initiators that can be employed to prepare the initiated lactone polyesters include the carboxyl-containing, hydroxyl-containing, and/or amino-containing compounds illustrated previously, e.g., those compounds which have at least one reactive hydrogen substituent as determined according to the Zerewitinoff method.

The initiator is belived to open the lactone ring to produce an ester or amide having one or more terminal groups that are capable of opening further lactone rings and thereby adding more and more lactone units to the growing molecule. Thus, for example, the polymerization of epsilon-caprolactone initiated with an amino alcohol is believed to take place primarily as follows:

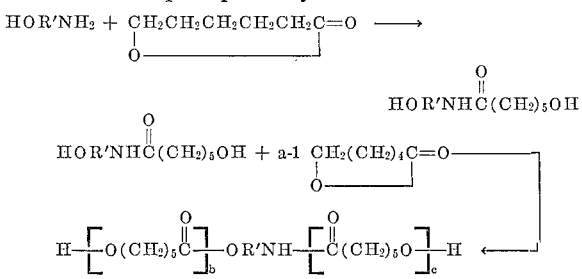

wherein R' (of the initiator and the resulting initiated lactone polyester product) is an organic radical such as an aliphatic, cycloaliphatic, aromatic, or heterocyclic radical, and wherein $a=b+c$.

The reaction of a carboxyl-containing initiator with epsilon-caprolactone is believed to proceed as follows:

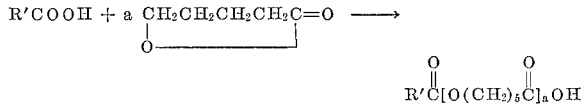

It will be appreciated from the preceding illustrative equations that where a plurality of lactone units are linked together, such linkage is effected by monovalently bonding the oxy (—O—) moiety of one unit to the carbonyl

moiety of an adjacent unit. The terminal lactone unit will have a terminal hydroxyl or carboxyl end group depending, of course, on the initiator employed.

The preparation of the initiated lactone polyester can be carried out in the absence of a catalyst though it is preferred to effect the reaction in the presence of an ester exchange catalyst. The organic titanium compounds that are especially suitable as catalysts include the tetraalkyl titanates such as tetraisopropyl titanate and tetrabutyl titanate. Additional preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates and metal acylates disclosed in U.S. 2,878,236 also represent further desirable catalysts which can be employed. The disclosures of the aforesaid patents are incorporated by reference into this specification.

The catalysts are employed in catalytically significant concentration. In general, a catalyst concentration in the range of from about 0.0001 and lower, to about 3, and higher, weight percent, based on the weight of total monomeric feed, is suitable. The lactone polymerization reaction is conducted at an elevated temperature. In general, a temperature in the range of from about 50° C., and lower, to about 250° C. is suitable; a range from about 100° C. to about 200° C. is preferred. The reaction time can vary from several minutes to several days depending upon the variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The preparation of the lactone polyesters via the preceding illustrative methods has the advantage of permitting accurate control over the average molecular weight of the lactone polyester products and further of promoting the formation of a substantially homogeneous lactone polyester in which the molecular weights of the individual molecules are reasonably close to the average molecular weight, that is, a narrow molecular weight distribution is obtained. This control is accomplished by preselecting the molar proportions of lactone and initiator in a manner that will readily be appreciated by those skilled in the art. Thus, for example, if it is desired to form a lactone polyester in which the average molecular weight is approximately fifteen times the molecular weight of the initial lactone, the molar proportions of lactone and initiators utilized in the polymerization reaction are fixed at approximately 15:1 inasmuch as it is to be expected that on the average there will be added to each molecule of initiator approximately fifteen lactone molecules.

The initiated lactone polyesters which are contemplated have average molecular weights as low as 300 to as high as about 7000, and even higher still to about 9000. With vinyl polymers containing a plurality of active hydrogen substituents, e.g., hydroxyl, amino, etc., as initiators, the average molecular weight of the initiated lactone polyesters can easily go as high as 14,000, and higher. Generally, however, the average molecular weight of the initiated lactone polyester is from about 300 to about 9000, preferably from 600 to about 5000.

As intimated previously, also within the term and the scope of the initiated lactone polyesters are those in which the linear lactone units need not necessarily be connected directly to one another. This is readily accomplished, for example, by reacting lactone(s) with combinations of initiators such as dibasic acid(s) plus glycols(s), diamine(s), or amino alcohol(s) such as those exemplified previously. This reaction can be effected at an elevated temperature, e.g., about 100° C. to about 200° C., with all the reactants present, or the reaction of the dibasic acid with the glycol, diamine, or amino alcohol can be accomplished first, and then the resulting amino-, hydroxyl-, or carboxyl-containing products (depending on the reactants and the concentration of same) can be reacted with the lactone to yield hydroxyl-terminated and/or carboxyl-terminated initiated lactone polyesters. Moreover, as also indicated previously, the term and the scope of the hydroxyl- and/or carboxyl-containing initiated lactone polyesters include the "oxyalkylene-carboxy-alkylenes" such as described in U.S. Pat. No. 2,962,524 which are incorporated by reference into this disclosure. In addition the term and scope of the hydroxyl-containing initiated lactone polyesters also includes the reaction of an admixture comprising a $C_6$–$C_8$ lactone(s), a cyclic carbonate(s), and an initiator having at least one group, preferably at least two groups, of the class of hydroxyl, primary amino, or secondary amino, or mixtures thereof, under the operative conditions discussed above. Exemplary cyclic carbonates include 4,4-dimethyl-2,6-dioxacyclohexanone, 4,4-dichloromethyl - 2,6 - dioxacyclohexanone, 4,4 - dicyanomethyl-2,6-dioxacyclohexanone, 4,4 - diethyl - 2,6 - dioxacyclohexanone, 4,4 - dimethoxymethyl - 2,6 - dioxacyclohexanone; and the like. Consequently, where a mixture of linear lactone units, i.e.,

units which are properly termed carbonylalkyleneoxy) and linear carbonate units (i.e.,

units which can be termed carbonyloxyalkyleneoxy) are contained in the polymer chain or backbone, the carbonyl moiety of one linear unit will be monovalently bonded to the oxy moiety of a second linear unit. The oxy moiety of a terminal linear unit will be bonded to a hydrogen substituent to thus form a hydroxyl end group. Moreover, the point of attachment of the initiator and a linear unit (lactone or carbonate) will be between the carbonyl moiety of said unit and the functional group (hydroxyl or amino) of said initiator sans the active hydrogen substituent of said group.

The preferred initiated lactone polyesters include those which contain at least about 50 mol percent of carbonylpentamethyleneoxy units therein

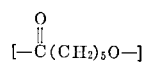

and which possess an average molecular weight of from about 500 to about 5000, particularly from about 600 to about 4000. The remaining portion of the molecule can be comprised of in addition to the initiator, essentially linear units derived from a cyclic carbonate especially those illustrated previously; an oxirane compound especially ethylene oxide, propylene oxide, and/or butylene oxide; a mono- and/or polyalkyl-substituted epsilon-caprolactone especially the mono- and/or polymethyl and/or ethyl-substituted epsilon-caprolactones; and/or an alpha, alpha - disubstituted-beta-propiolactone especially those exemplified previously. The so-called initiated lactone homopolyesters derived from reacting epsilon-caprolactone with an initiator are likewise included within the preferred lactone polyesters. The initiated lactone polyester polyols, and in particular, the substantially linear initiated lactone polyester diols, are exceptionally preferred.

If desired, various compounds can be employed as catalysts in the isocyanato/active hydrogen reactions. Compounds which are oftentimes useful in catalyzing said isocyanato-active hydrogen reactions include the tertiary amines, phosphines, and various organic metallic compounds in which the metal can be bonded to carbon and/or other atoms such as oxygen, sulfur, nitrogen, halo, hydrogen, and phosphorus. The metal moiety of the organic metallic compounds can be, among others, tin, titanium, lead, potassium, sodium, arsenic, antimony, bismuth, manganese, iron, cobalt, nickel, and zinc. Of those which deserve special mention are the organic metallic compounds which contain at least one oxygen to metal bond and/or at least one carbon to metal bond, especially wherein the metal moiety is tin, lead, bismuth, arsenic, or antimony. The tertiary amines, the organic tin compounds (which includes the organotin compounds), and the organic lead compounds are eminently preferred. Preferred subclasses of organic metallic compounds include the acylate, particularly the alkanoates, and alkoxides of Sn(II), Sn(IV), Pb(II), Ti(IV), Zn(IV), Co(II), Mn(II), Fe(III), Ni(II), K, and Na. An additional subclass which is extremely useful is the dialkyltin, dialkanoates.

Inorganic metallic compounds such as the hydroxides, oxides, halides, and carbonates of metals such as the alkali metals, the alkaline earth metals, iron, zinc, and tin are also suitable.

Specific catalysts include, by way of illustrations, 1,4-diazabicyclo[2.2.2]octane, N,N,N',N' - tetramethyl-1,3-butanediamine, bis[2 - (N,N-dimethylamino)ethyl] ether, bis[2 - N,N - dimethylamino - 1 - methylethyl] ether, N-methylmorpholine, sodium acetate, potassium laurate, stannous octanoate, stannous oleoate, lead octanoate, tetrabutyl titanate, ferric acetylacetonate, cobalt naphthenate, tetramethyltin, tributyltin chloride, tributyltin hydride, trimethyltin hydroxide, dibutyltin oxide, dibutyltin dioctanoate, dibutyltin dilaurate, butyltin trichloride, triethylstibine oxide, potassium hydroxide, sodium carbonate, magnesium oxide, stannous chloride, stannic chloride, bismuth nitrate. Other catalysts include those set forth in "Part IV Kinetics and Catalysis of Reactions" of Saunders et al. "Polyurethanes: Chemistry and Technology—Part I. Chemistry," Interscience Publishers, which is incorporated by reference into this disclosure. In many instances, it is particularly preferred to employ combinations of catalysts such as, for example, a tertiary amine plus an organic tin compound.

The isocyanato-reactive hydrogen reactions can be conducted over a wide temperature range. In general, a temperature range of from about 0° to about 250° C. can be employed. To a significant degree, the choice of the reactants and catalyst, if any, influences the reaction temperature. Of course, sterically hindered novel diisocyanates or active hydrogen compounds will retard or inhibit the reaction. Thus, for example, the reaction involving isocyanato with primary amino or secondary amino can be effected from about 0° C. to about 250° C. whereas the isocyanato-phenolic hydroxyl reaction is more suitable conducted from about 30° C. to about 150° C. Reactions involving primary alcoholic hydroxyl, secondary alcoholic hydroxyl, or carboxyl with isocyanato are effectively conducted from about 20° C. to about 250° C. The upper limit of the reaction temperature is selected on the basis of the thermal stability of the reaction products and of the reactants whereas the lower limit is influenced, to a significant degree, by the rate of reaction.

The time of reaction may vary from a few minutes to several days, and longer, depending upon the reaction temperature, the identity of the particular active hydrogen compound and diisocyanate as well as upon the absence or presence of an accelerator or retarder and the identity thereof, and other factors. In general the reaction is conducted for a period of time which is at least sufficient to provide the addition or attachment of the "active hydrogen" from the active hydrogen compound to the isocyanato nitrogen of the novel diisocyanate. The remainder of the active hydrogen compound becomes bonded to the carbonyl carbon unless decarboxylation or further reaction occurs. The following equation illustrates the reaction involved.

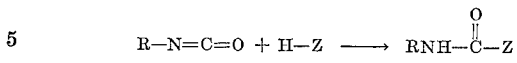

wherein H—Z represents the active hydrogen compound. Thus, by way of illustrations the reaction of isocyanato (—NCO) with (a) hydroxyl (—OH) results in the

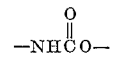

group; (b) primary amino (—NH$_2$) results in the

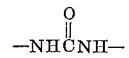

group; (c) secondary amino (—NHR) results in the

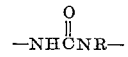

group; (d) thiol (—SH) results in the

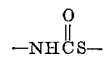

group; (e) carboxyl (—COOH) can be considered to result in the intermediate

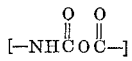

which decarboxylates to the

group; (f) ureylene

results in the

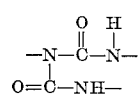

group (biuret); (g) amido

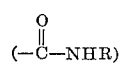

results in the

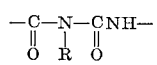

group (carbonylurea); (h) urethane

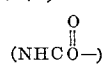

results in the

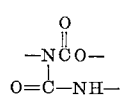

group (allophanate); (i) water (HOH) can be considered to result in the intermediate

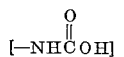

which decarboxylates to the —NH$_2$ group; and the like. Most desirably, conditions are adjusted so as to achieve a practical and commercially acceptable reaction rate depending, to a significant degree, on the end use application which is contemplated. In many instances, a reaction period of less than a few hours is oftentimes sufficient for the intended use.

The isocyanato-reactive hydrogen reactions, in many instances, are preferably accomplished in the presence of a catalytically significant quantity of one or more of the catalysts illustrated previously. In general, a catalyst concentration in the range of from about 0.001 weight percent, and lower, to about 2 weight percent, and higher, based on the total weight of the reactants, has been observed to be useful.

The concentration of the reactants can be varied over a wide range. Thus, for example, one can employ the active hydrogen compound in such relative amounts that there is provided as low as about 0.1 equivalent (group) of active hydrogen, and lower, per equivalent (group) of isocyanato. In general, about 0.2 and oftentimes about 0.25 equivalent of active hydrogen represent more suitable lower limits. The upper limit can be as high as about 7 equivalents of active hydrogen, and higher, per equivalent of isocyanato. However, for many applications, a desirable upper limit is about 3.5 equivalents of active hydrogen per equivalent of isocyanato. When employing bifunctional compounds (those which contain two active hydrogen substituents such as hydroxyl, carboxyl, primary amino, secondary amino, etc.), a suitable concentration would be from about 0.25 to about 3 equivalents of active hydrogen substituent from the bifunctional compound per-equivalent of isocyanato from the isocyanate. It is readily apparent that depending upon the choice and functionality of the active hydrogen compound(s), the choice of the polyisocyanate(s), the proportions of the reactants, etc., there can be obtained a myriad of novel compounds and products which range from the liquid state to solids which can be fusible solids, thermoplastic solids, partially cured to essentially completely cured, thermoset solids, etc. The novel liquid to non-crosslinked solid compositions contain a plurality of polymerizable ethylenic bonds which serve as vinyl polymerization sites with vinyl monomers such as those illustrated previously, e.g., styrene, butadiene, vinyl chloride, etc., under the operative conditions noted supra.

A class of novel compounds which deserve special mention are those which contain the

grouping therein. These compounds are characterized as follows:

XI

wherein $R_1$ and R have the values set out in Formula I supra, and wherein Z is an abbreviated form for the monofunctional active organic compound sans the active hydrogen atoms. Illustrative Z radicals include those which result from the reaction of, for example, stoichiometric quantities of the novel diisocyanates of Formula I supra with monofunctional active organic compounds as illustrated by primary amines, secondary amines, primary alcohols, secondary alcohols, phenols, primary thiols, secondary thiols, imines, amides, ureas, etc. The scope of Z is readily apparent from the description re the active hydrogen compounds as well as from a consideration of Equation X supra. Moreover, by reacting equimolar amounts of the diisocyanates of Formula I with the afore-illustrated monofunctional active organic compounds, there can be obtained monoisocyanates of the formula:

XIA

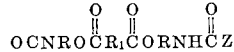

A further class of polymeric products which deserve to be highlighted are those novel polymers which are characterized by Unit XII below:

XII

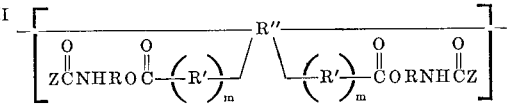

wherein R", R', R, and $m$ have the values (including the provisos) set out in Unit IX supra, and wherein Z is adequately described in the discussion re Formula XI supra.

A still further class of polymeric products which should be exemplified by illustration include the novel polymers which are characterized by Unit XIIA below:

XIIA

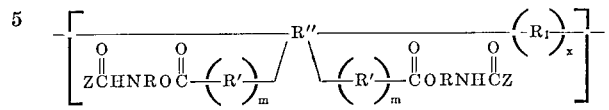

wherein R", R', R, $R_1$, $m$ and $x$ have the meanings set out in Unit IXA and wherein Z has the value set out in Unit XI supra.

Highly desirable subclasses of novel polymeric products are those which are characterized by the following Units (XIIB, XIIC, XIID) below:

XIIB

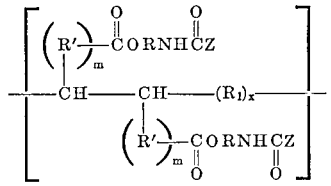

wherein the variables R', $R_1$, R, $m$, and $x$ have the values noted in Unit IXA supra;

XIIC

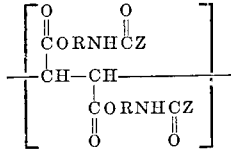

wherein R is an alkylene radical which preferably contains from 2 to 12 carbon atoms;

XIID

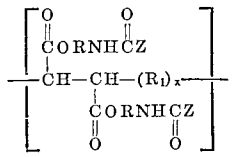

wherein R has the broad and preferred values set out in Unit IXC supra, and wherein $R_1$ and $x$ have the values noted in Unit IXA supra. The variable Z in the aforesaid Units is described in Unit XI supra.

The novel polymeric products contain at least one of the units designated as Units XII through XIID, and in general, these products contain a plurality of said units, e.g., upwards to 200, and more.

A useful subarea of polymeric products result from the reaction of the novel telomers of the bis[omega-isocyanato-($C_2$–$C_{12}$ alkyl)] fumarates, the citraconates, and the itaconates, with a monofunctional active organic compound such as those illustrated previously. Those relative low molecular weight polymeric products characterized by at least two and upwards to about 20, preferably 3 to about 10, of the units set forth below are suitable for many useful applications:

XIIE

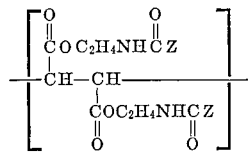

XIIF

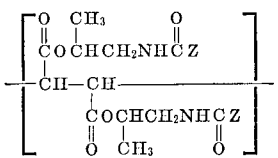

It is pointed out that the proviso noted in Formula I applies to Units IX through IXF, Formulas XI and XIA, and Units XII through XIIF. It is also pointed out that the novel polymeric products which are characterized by one or more of Units XII through XIIF therein can also contain one or more of the units designated as Units IX through IXF therein. Both types of units can occur, e.g. Unit IX and XII, in the novel polymeric products via the vinyl polymerization of an admixture comprising a diisocyanate of Formula I, a "blocked" isocyanate of Formula XI with/without an ethylenically unsaturated organic compound. In addition, useful and interesting polymeric products are obtained by the vinyl polymerization of an admixture comprising the "partially blocked" isocyanate of Formula XIA with/without the diisocyanate of Formula I, with/without the "blocked" isocyanate of Formula XI, and with/without an ethylenically unsaturated organic compound.

A particular desirable class of novel polyurethane diols which are contemplated within the scope of the teachings of this specification are those which result from the reaction of a dihydroxy compound such as those illustrated previously, with a molar deficiency, i.e., a stoichiometric deficiency, of the novel diisocyanates which fall within Formula I supra. The highly preferred dihydroxy compounds are the alkylene glycols, the polyether glycols, the polyoxyalkylated diols, the polyester diols, and the initiated lactone polyester diols, especially those dihydroxy-compounds which have average molecular weights as low as about 60 and as high as about 7000, and higher. A preferred average molecular weight range is from about 300 to about 5000. The initiated lactone polyester diols which have an average molecular weight of from about 600 to about 4000 are eminently preferred since within this molecular weight range there can be prepared, for example, polyurethane products such as cast resins, thermoplastic products, and elastic fibers which exhibit outstanding performance characteristics. Equation XIII below illustrates the linear extension reaction involved:

XIII

HO—A—OH + deficient Q(NCO)₂

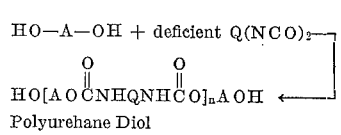
Polyurehane Diol wherein HO—A—OH is an abbreviated representation of the organic dihydroxy compounds, the variable A being an organic divalent aliphatic radical such as those illustrated previously; wherein Q(NCO)₂ is an abbreviated representation for the novel diisocyanates encompassed within the scope of Formula I supra, the variable Q representing the divalent unit

the R and R₁ variables of said unit having the assigned values of Formula I supra; and wherein $n$ is a number having an average value of at least one.

It will be noted from Equation XIII that the degree of linear extension is realistically controlled by the amount of the reactants employed. If the proportions of diol and diisocyanate are chosen so that the number of reactive hydroxyl groups on the diol are equal to the number of reactive isocyanate groups on the diisocyanate, then relatively long, high molecular weight chains can be formed. In general, one can employ such relative amounts so that there is provided slightly greater than one equivalent of hydroxyl group from the diol per equivalent of isocyanato group from the diisocyanate. It is desirable, however, to employ amounts of diol and organic diisocyanate (in Equation XIII so that there is provided a ratio of from about 1.1 to about 2.2 equivalents, and higher, of hydroxyl group per equivalent of isocyanato group, and preferably from about 1.3 to about 2 equivalents of hydroxyl group per equivalent of isocyanato group.

It is to be understood that in lieu of the dihydroxy compounds employed in Equation XIII one can employ higher functional polyols such as the triols, tetrols, etc., and obtain novel polyurethane triols, tetrols, etc. In addition, admixtures of dihydroxy compounds, or dihydroxy compounds plus higher functional hydroxy compounds, can be empolyed.

An eminently preferred class of novel polyurethane diisocyanates which are contemplated are those which result from the reaction of a dihydroxy compound exemplified previously, with a molar excess of the novel diisocyanates of Formula I supra. The highly preferred dihydroxy compounds which can be employed include those illustrated in the discussion re Equation XIII supra as well as the resulting polyurethane diol products of Equation XIII. Equation XIV below illustrates this linear extension reaction involved:

XIV

HO—A—OH + excess Q(NCO)₂

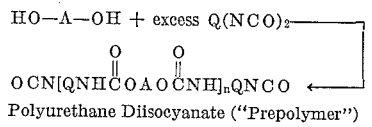
Polyurethane Diisocyanate ("Prepolymer")

wherein all the variables of Equation XIV have the meanings set out in Equation XIII previously.

It will be noted from Equation XIV that the use of an excess of diisocyanate provides an efficient means of control over the degree of linear extension of the polyurethane molecule. If the proportions of diol and diisocyanate are chosen so that the number of reactive terminal hydroxyl groups on the diol are equal to the number of reactive isocyanate groups on the diisocyanate as indicated previously, relatively long, high molecular weight chains would be formed. It is desirable, for many applications, to employ amounts of diisocyanate and diol in Equation XIV so that there is provided a ratio of greater than about one equivalent of diisocyanate per equivalent of diol, preferably from about 1.05 to about 7 equivalents, and higher, of diisocyanate per equivalent of diol, and preferably still from about 1.2 to about 4 equivalents of diisocyanate per equivalent of diol.

During and after preparation of the isocyanato-terminated reaction products it is oftentimes desirable to stabilize said reaction products by the addition of retarders to slow down subsequent further polymerization or less desirable side-reactions such as, for example, allophanate formation. Retarders may be added to the diisocyanate, diol, and/or the aforesaid reaction products. Illustrative of the retarders suitable for the diol-diisocyanate reaction are hydrochloric acid, sulfuric acid, phosphoric acid, boric acid, acetyl chloride, para-toluenesulfonyl chloride, phosphorous trichloride, phosphorous oxychloride, sulfuryl chloride, thionyl chloride, and sulfur dioxide.

In lieu of, or in conjunction with the dihydroxy reactants of Equation XIV, it is oftentimes desirable to employ higher functional polyols such as the triols, tetrols, etc., and obtain novel polyurethane triisocyanates, tetra-isocyanates, etc.

Another particular desirable class of novel compounds which are contemplated are the novel polyurea diamines which are prepared via the reaction of a diamino compound (which contain two groups from the class of primary amino, secondary amino, and mixtures thereof) as illustrated previously with a molar deficiency of the novel diisocyanates. Equation XV below illustrates this linear extension reaction involved:

XV

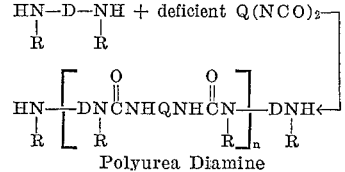
Polyurea Diamine wherein

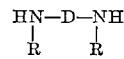

is an abbreviated representation of a diamine compound (the R variables representing hydrogen; a monovalent hydrocarbon or azahydrocarbon radical, e.g., alkyl, aryl, aralkyl, azalkyl, and the like; and D representing a divalent organic radical, e.g., a divalent aliphatic, alicyclic, aromatic, or heterocyclic radical), and wherein $Q(NCO)_2$ and $n$ have the meanings set forth in Equation XIII supra. In general, one can employ slightly greater than about one and upwards to about two, and higher, equivalents of amino group per equivalent of isocyanato group. In lieu of, or in conjunction with, the diamino reactants of Equation XV, it is oftentimes desirable to employ higher functional polyamines such as the triamines, tetraamines, etc., and obtain novel polyurea triamines, polyurea tetraamines, etc.

On the other hand, the use of a molar excess of diisocyanate with relation to the diamino compound produces novel polyurea diisocyanates as illustrated by Equation XVI:

XVI

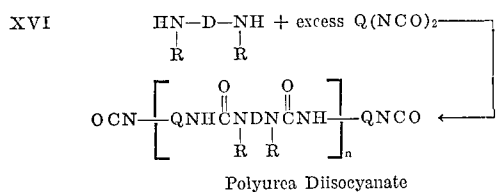

Polyurea Diisocyanate

In the reaction exemplified by Equation XVI supra, there can be employed slightly greater than about one and upwards to about 3, and higher, equivalents of isocyanato group per equivalent of amino group. Higher functional polyamines can be employed instead of, or admixed with, the diamines, to thus yield novel polyurea triisocyanates, polyurea tetraisocyanates, etc.

If desired, the preceding novel linear extension reactions can be carried out in the presence of essentially inert normally-liquid organic vehicles such as various organic solvents, depending upon the further application which may be intended for said reaction products.

In another aspect, the invention is directed to the preparation of cast polyurethane systems. Highly useful rigid to flexible, polyurethane resins which can range from slightly crosslinked products to highly crosslinked products can be prepared by the novel diisocyanates of Formula I supra and/or the novel polyisocyanato-containing polymers exemplified by Units IX to IXF supra and/or the polyurethane polyisocyanato reaction products discussed in the section re Equation XIV with a polyfunctional chain extender which contains at least two functional groups that are primary amino (—$NH_2$), secondary amino (—NHR), hydroxyl (—OH), or mixtures thereof. The polyisocyanate and polyfunctional chain extender are employed in such relative amounts that there is provided at least about one equivalent (group) of isocyanato (—NCO) from the polyisocyanate per equivalent (group) of functional group (hydroxyl and/or amino) from the polyfunctional compounds. When employing solely difunctional compounds as the chain extender(s), it is desirable to employ such relative amounts that result in greater than about one equivalent of —NCO, e.g., at least about 1.02 equivalents of —NCO, from the polyisocyanate per functional group from the difunctional compound. However, it is oftentimes highly satisfactory when employing polyfunctional chain extenders which contain 3 or more functional groups, alone or in admixture with difunctional chain extenders, to employ such relative amounts so that there is provided at least about one equivalent of —NCO from the polyisocyanate per equivalent of functional group from the chain extender(s). Cast polyurethane resins having special utility as printing ink rollers, cast solid urethane industrial tires, mechanical goods such as seals, O-rings, gears, etc., ladies shoe heels, and the like, can be prepared from castable formulations which provide from about 1.02 to about 1.6 equivalents of —NCO from the polyisocyanate per equivalent of functional group from the polyfunctional chain extender. Optimum properties result from the highly preferred castable formulations which provide from about 1.05 to about 1.4 equivalents of —NCO per equivalent of functional group.

It is further highly desirable that the aforesaid polyisocyanate be a prepolymer as defined in Equation XIV supra which has an average molecular weight of at least about 550 in the preparation of cast polyurethane resins. The upper limit can be as high as 8000 and higher. For many applications, a practical molecular weight range is from about 750 to about 5000. It is observed that within the aforesaid molecular weight limits there can be produced cast polyurethane resins which vary from extremely soft flexible products to relatively hard plastic products. Prepolymers which result from the reaction of diisocyanate and the initiated lactone polyester polyols are eminently suitable since cast resins which possess high performaance characteristics can be obtained.

Among the polyfunctional chain extenders which can be employed in the castable formulations are those organic compounds exemplified previously which have two or more hydroxyl or amino (primary and secondary) groups including mixtures of such groups such as the polyols (diols, triols, tetrols, etc.), the polyamines (diamines, triamines, etc.), amino alcohols, and the like. Among the polyfunctional chain extenders which deserve special mention because they result in especially useful cast polyurethane resins of high strength, high tear resistance, relatively low permanent set, good solvent resistance, and/or excellent abrasion resistance can be listed the following: 1,4-butanediol, 1,5-pentanediol, 1,6-hexanediol, quinitol, 1,4 - bis(2 - hydroxyethoxy)benzene, 4,4'-bis[(2-hydroxyethoxy)phenyl]isopropylidene, trimethylolpropane, triisopropanolamine, ethanolamine, p-aminophenylethyl alcohol, 2,4- and 2,6-toluenediamines, 3,3'-dichloro-4,4'-diphenylenediamine, and 4,4' - methylene bis(o - chloroaniline).

The preparation of the cast polyurethane products can take place over a wide temperature range, e.g., from about room temperature to about 200° C., and higher. The preferred temperature is in the range of from about 50° C. to about 150° C. A highly preferred temperature range is from about 60° C. to about 105° C. The upper limit of the reaction temperature, as indicated previously, is realistically controlled by the thermal stability of the reactants and reaction products whereas the lower limit is regulated, to a significant degree, by the reaction rate.

A valuable modification of the cast polyurethane aspect is the use of an admixture containing the polyols exemplified previously with/without the novel polyurethane diols (of Equation XIII) plus the novel diisocyanates (of Formula I) instead of, or in conjunction with, the prepolymer (of Equation XIV). It is preferred that the previously exemplified polyols be substantially linear hydroxyl-terminated polymers. It is highly preferred that these polymers have an average molecular weight of at least about 60 and upwards to 6000, and higher, and preferably from about 300 to about 5000. The hydroxyl-terminated polymers which are eminently suitable include the alkylene glycols, the polyether glycols, the polyester diols, the polyoxyalkylated diols, and the initiated lactone polyester diols. In this modification, the ratios of the equivalents of —NCO and the equivalents of functional groups are the same as set forth above. It is understood, of course, that these ratios will include all the —NCO groups and all the functional groups in the castable formulation regardless of the source. Thus, for example, if the formulation comprises novel polyurethane diol, novel diisocyanate, and alkanediol, one must take into consideration when computing the equivalents ratio of said formulation, the equivalents of —NCO from the diisocyanate with relation to the sum of the equivalents of the hydroxyl groups from the polyurethane diol plus alkanediol.

A further desirable modification of the cast polyurethane aspect is directed to the partial or incomplete reaction of the cast formulation to thus produce a thermoplastic reaction product mass which contains unreacted or free isocyanato groups. The aforesaid thermoplastic mass is relatively stable or non-reactive at room temperature, e.g., about 20° C., but possesses the characteristic of being further cured as, for example, by curing same at an elevated temperature for a sufficient period of time. This curable, isocyanato-containing mass can be prepared by heating the cast formulation or system, e.g., to about 100° C., and higher, and thereafter quenching the resulting partial reaction products (which contain a minor proportion of unreacted isocyanato groups) with an inert fluid in which said reaction products are insoluble, e.g., an inert normally liquid organic non-solvent. The aforesaid curable, isocyanato-containing thermoplastic mass can be stored for relatively long periods of time or shipped to customers over great distances without undergoing any appreciable reaction at ambient conditions, e.g., about 20° C.

An extremely significant aspect is directed to the preparation of thermoplastic polyurethane resins including curable polyurethane systems. Such useful systems and/or resins can be prepared from formulations (which include the reactants, especially the difunctional reactants, reaction conditions, and modifications thereof) as set out in the preceding aspect (re the cast polyurethanes) with the exception that there is employed at least about one equivalent of functional group, e.g., hydroxyl, primary amino, secondary amino, or mixtures thereof, from the polyfunctional chain extender per equivalent of isocyanato (—NCO) from the isocyanate source. In general, a practical upper limit would be about 1.5 equivalents of functional group per equivalent of —NCO. Preferred formulations contain from about 1.02 to about 1.3 equivalents of functional group per equivalent of —NCO, preferably still from about 1.05 to about 1.15 equivalents of functional group per equivalent of —NCO. In other modifications, it is eminently preferred that the thermoplastic formulation contain about one equivalent of functional group per equivalent of isocyanato, especially to prepare thermoplastic elastomers which exhibit high performance characteristics.

The thermoplastic and curable polyurethane resins can be cured or crosslinked with an organic polyisocyanate. In this respect the novel diisocyanates of Formula I supra, the novel polyisocyanato-containing polymers exemplified previously, and/or polyisocyanates well known in the literature can be employed, e.g., publication by Siefken [Annalen, 562, pages 122–135 (1949)]. Polyisocyanates such as those produced by the phosgenation of the reaction products of aniline and formaldehyde, or p,p′,p″-triphenylmethane triisocyanate, represent further illustrations.

In general, the cure can be effected by using an amount of polyisocyanate which is in stoichiometric excess necessary to react with any free or unreacted functional group from the polyfunctional chain extender. In general, from about 1 to about 10 parts by weight of additional polyisocyanate per 100 parts by weight of curable polyurethane resin is adequate to accomplish the cure for most applications. A preferred range is from about 2.5 to about 6 parts by weight of polyisocyanate per 100 parts by weight of curable stock. The additional polyisocyanate can be admixed with the curable polyurethane stock on a conventional rubber mill or in any suitable mixing device and the resulting admixture is cured in the mold at an elevated temperature, e.g., from about 125°–160° C., in a relatively short period, e.g., a few minutes, or longer. In the mold, the cure is accomplished apparently by a reaction of excess amino or hydroxyl groups with the newly admixed polyisocyanate, and secondly by reaction of the remaining free terminal isocyanate groups with hydrogen atoms of the urea and urethane groups to form a crosslinked resin. By this procedure, there can be obtained cured polyurethane products which range from highly elastomeric materials possessing excellent tensile strength and exceptional low brittle temperature to tough, rigid rubbery materials.

Various modifying agents can be added to the castable or curable formulations among which can be listed fillers such as carbon blacks, various clays, zinc oxide, titanium dioxide, and the like; various dyes; plasticizers such as polyesters which do not contain any reactive end-groups, organic esters of stearic and other fatty acid, metal salts of fatty acids, dioctyl phthalate tetrabutylthiodisuccinate; glass; asbestos; and the like.

A modification of the thermoplastic and curable polyurethane resins is the preparation of formulations using diisocyanates which are well known in the literature, and subsequently effecting the cure with the novel polyisocyanates of Formulas I or XIV or the polyisocyanato-containing polymers characterized by units IX to IXF supra.

A particularly preferred aspect is directed to the preparation of elastomeric products, especially elastomeric films and elastic fibers. It has been discovered quite surprising, indeed, that there can be prepared exceptional elastic polyurethane films and fibers which are derived from substantially linear hydroxyl terminated polymers having an average molecular weight greater than about 500 and the novel diisocyanates of Formula I supra. The elastic films and fibers of this aspect are characterized by outstanding resistance to sunlight degradation, outstanding elongation, high resistance to fume aging, i.e., resistance to breakdown caused by nitrous oxide which is commonly found as an impurity in the atmosphere, high tensile and modulus properties, and/or good stability to oxidizing agents such as chlorine bleach.

These novel elastomeric films and fibers can be prepared by first reacting the aforesaid substantially linear hydroxyl-terminated polymer with a molar excess of the novel diisocyanate (of Formula I) to produce a substantially linear isocyanato-terminated polyurethane product (known as a "prepolymer"). The chain extension reaction of said prepolymer with a bifunctional curing compound in accordance with, for instance, well known cast or spinning techniques results in elastomeric films or fibers as may be the case. In a useful embodiment, the aforesaid substantially linear hydroxyl-terminated polymers can be linearly extended by reaction with a molar deficiency of an organic diisocyanate to yield substantially linear hydroxyl-terminated polyurethane products which products then can be reacted with a molar excess of the novel diisocyanates to obtain the prepolymer.

The substantially linear hydroxyl-terminated polymer possesses an average molecular weight of at least about 500, more suitably at least about 700, and preferably at least about 1500. The upper average molecular weight can be as high as 5000, and higher, a more suitable upper limit being about 4000. For many of the novel elastic fibers and films which exhibited a myriad of excellent characteristics, the average molecular weight of the starting hydroxyl terminal polymer did not exceed about 3800.

In addition, the hydroxyl-terminated polymers possess a hydroxyl number below about 170, for example, from about 20 to about 170; and a melting point below about 70° C., and preferably below about 50° C.

Exemplary of the substantially linear hydroxyl-terminated polymers which are contemplated include the alkylene glycols, the polyether glycols, the polyoxyalkylated diols, the polyester diols, and the initiated lactone polyester diols. The initiated lactone polyester diols are eminently preferred since elastomeric films and elastic fibers exhibiting outstanding performance characteristics can be obtained. Of the highly preferred initiated lactone polyester diols are included those which are characterized by at least about 50 mol percent of carbonylpentamethyleneoxy units therein

and which possess an average molecular weight of from about 500 to about 5000, particularly from about 600 to about 4000. The remaining portion of the molecule can be comprised of, in addition to the initiator, essentially linear units derived from a cyclic carbonate such as those illustrated previously, e.g., 4,4-dimethyl-2,6-dioxacyclohexanone, 4,4 - dicyanomethyl - 2,6 - dioxacylohexanone, 4,4 -dichloromethyl - 2,6 - dioxacyclohexanone, 4,4-di(methoxymethyl) - 2,6 - dioxacyclohexanone, and the like; an oxirane compound especially ethylene oxide, 1,2-epoxypropane, the epoxybutanes, etc.; a mono-, di-, and/or trialkyl-epsilon-caprolactone such as the monomethyl-, dimethyl-, trimethyl-, monoethyl-, diethyl-, triethyl-epsilon-caprolactones, and others exemplified supra; an alpha, alpha-dialkyl-beta-propiolactone and as alpha, alpha-dimethyl-beta-propiolactone; an alpha, alpha-dihaloalkyl-beta-propiolactone as illustrated by alpha, alpha - dichyoromethyl - beta - propiolactone; and others. Also highly preferred polymeric diols include the so-called initiated lactone homopolyester diols which are prepared via the reaction of an admixture of epsilon-caprolactone and an initiator which contains two groups from the class of hydroxyl, primary amino, secondary amino, and mixtures thereof, in the presence of a catalyst such as stannous dioctanoate or stannic tetraoctanoate.

Illustrative of the polyether glycols which are contemplated include those illustrated previously as well as those illustrated in column 7, lines 19 through 70 of U.S. Pat. No. 2,929,804 which patent is incorporated by reference into this disclosure. Many of the polyester diols which into this disclosure have been exemplified previously. Others are set forth in columns 4–5 of U.S. Pat. No. 3,097,192 which patent is incorporated by reference into this disclosure. The initiated lactone polyester diols have been thoroughly illustrated previously; others are disclosed in U.S. Pats. Nos. 2,878,236, 2,890,208, 2,914,556, and 2,962,524 which patents are incorporated by reference into this disclosure. The polyurethane diols of Equation XI also represent a preferred group of substantially linear hydroxyl-terminated polymers.

The minimization or elimination of crystallinity, if present in the hydroxyl-terminated polymer, can be achieved, as oftentimes is desired, by introducing pendant groups and/or unsymmetrical groups in the polymeric chain as illustrated by lower alkyl groups, e.g., methyl, ethyl, isopropyl, etc.; halo, e.g., chloro, bromo, etc.; ortho-tolylene; and similar groups which do not interfere with the subsequent polymerization under the conditions used. As is readily apparent to those skilled in the art, the choice of the proper reactants will readily yield hydroxyl-terminated polymers with the desired quantity and type of pendant and/or unsymmetrical groups. Along this vein, polymers of desired molecular weight and melting point can thus be obtained. In addition, the polymer chain can be interrupted with divalent keto, urea, urethane, etc., groups.

The hydroxyl-terminated polymer and diisocyanate can be reacted in such proportions so as to produce either a hydroxyl-terminated polyurethane product or an isocyanato-terminated polyurethane product (prepolymer). A molar ratio of diol to diisocyanate greater than one will yield the hydroxyl-terminated polyurethane whereas a molar ratio less than one will result in the prepolymer.

As indicated previously, in a particularly useful embodiment, there is employed a sufficient molar excess of hydroxyl-terminated polymer, in particular, the initiated lactone polyester diols, with relation to the organic diisocyanate so that there results substantially linear hydroxyl-terminated polyurethane products which have average molecular weights of from about 1200 to about 5000, and preferably from about 1500 to about 3800.

The hydroxyl-terminated polymers or the abovesaid hydroxyl-terminated polyurethane products then are linearly extended with the diisocyanates of Formula I. This reaction can be carried out by employing a molar ratio of diisocyanate to hydroxyl-terminated compound of from about 1.1:1 to about 5:1 preferably from about 1.5:1 to about 3.5:1, and more preferably from about 2:1 to 2.5:1.

In the preparation of the hydroxyl-terminated polyurethane products or the prepolymer, the reaction temperature can vary over a broad range such as noted for the isocyanato/active hydrogen (hydroxyl in this instance) section discussed previously. Of course, the optimum reaction temperature will depend, to a significant degree, upon several variables such as the choice of reactants, the use of a catalyst, the concentration of the reactants, etc. A suitable temperature range is from about 20° C. to about 125° C., and preferably from about 50° C. to about 100° C. The reaction time likewise is largely influenced by the correlation of the variables involved, and can vary from a few minutes to several hours, e.g., from about 0.5 to about 5 hours, and longer. The tertiary amine compounds and/or the organic metal compounds disclosed in the section which discusses the isocyanato/active hydrogen reactions can be employed as catalysts, if desired. The isocyanato/hydroxyl reactions are suitably carried out in the absence of an inert normally liquid organic vehicle, though one can be employed, if desired.

In the next step, the prepolymer which results from the above discussed isocyanato/hydroxyl reaction is reacted with a bifunctional curing compound which possesses two groups that are reactive with isocyanato groups. Examples of such curing compounds include diamines, diols, amino alcohols, hydrazino compounds, e.g., hydrazine, water, and the like. It is preferred that said curing compound have two reactive groups from the class of alcoholic hydroxyl, primary amino, and second amino. The most preferred reactive group is primary amino. It is to be understood that primary amino (—NH$_2$) and secondary amino (—NHR) include those compounds in which the nitrogen of the these amino groups is bonded to a carbon atom as in, for example, ethylenediamine, as well as those compounds in which said nitrogen (of these amino groups) is bonded to another nitrogen atom as in, for instance, hydrazine.

The bifunctional curing compounds have been illustrated previously in the discussion of the active hydrogen compounds. Among the more desirable diamines (which term includes the mono- and polyalkylene polyamines which have two and only two primary and/or secondary amino groups) are such compounds as ethylenediamine, 1,2- and 1,3-propylenediamine, tetramethylenediamine, pentamethylenediamine, hexamethylenediamine, the cyclohexylenediamines, the phenylenediamines, the tolylenediamines, 4,4'-diaminodiphenylmethane, m- and p-xylylenediamine, 3,3' - dichloro - 4,4' - diaminophenylmethane, benzidine, 1,5-diaminonaphthalene, piperazine, 1,4 - bis(3 - aminopropyl)piperazine, trans-2,5-dimethylpiperazine, and the like.

It is preferred that the diamine contain no groups other than the two reactive amino groups that are reactive with isocyanato. The said diamine can have various substituent groups including chloro, bromo, alkoxy, alkyl, and the like. Generally it is also preferred that the diamine have not more than 15 carbon atoms.

Illustrative of the various diols and amino alcohols include those exemplified previously and, in particular, ethylene glycol, propylene glycol, 2,2-dimethyl-1,3-propanediol, paradibenzyl alcohol, 1,4-butanediol, ethanolamine, isopropanolamine, and the like. Water and hydrazine are also useful bifunctional curing agents. The organic diamines are the preferred curing compounds, with the alkylenediamines being more preferred, and ethylenediamine being most preferred.

The ratio of reactants in the curing step can vary from about 0.8 to about 1.5 equivalents of isocyanato from the prepolymer per equivalent of functional group from the bifunctional curing compound. In many cases, it is desirable to employ approximate stoichiometric proportions of prepolymer and curing compound, i.e., in proportions such that there is present approximately one isocyanato group from the prepolymer per reactive group from the difunctional curing compound. Oftentimes, it is desirable to employ a slight stoichiometric excess of prepolymer, e.g., greater than about one equivalent and upwards to about 1.4 equivalents of isocyanato per equivalent of functional group (from the bifunctional curing compound), and preferably from about 1.05 to about 1.2 equivalents of isocyanato per equivalent of functional group.

A preferred method for carrying out the reaction of prepolymer with curing compound is to effect the reaction in an inert normally liquid organic solvent and thus form a solution from which the elastic fibers and films of the invention can be produced by conventional solution spinning and casting techniques. This can be done by dissolving the prepolymer in a solvent to make, for example, from about 5 to about 40 weight percent solid solution (percent based on total solution weight), and then adding the bifunctional curing compound to this solution. The addition will be facilitated if the curing compound is also dissolved in the same solvent. Many solvents can be used for this purpose. The essential requirement is that the solvent be non-reactive with the prepolymer and with the curing compound. Examples of useful solvents include acetone, dimethyl sulfoxide, N,N-dimethylformamide, N,N-dimethylacetamide, tetrahydrofuran, and the like. N,N-dimethylformamide is a preferred solvent. Acetone alone or in admixture with other organic vehicles such as those illustrated above represent, by far, the most preferred solvents from commercial and economic standpoints. In this respect, it should be particularly noted that commercial polyurethane fibers prepared from aromatic diisocyanates, e.g., p,p'-methylenediphenyl diisocyanate (MDI), cannot be spun or cast from an acetone system. In lieu thereof, the universal solvent for the aforesaid commercial polyurethane fibers is the expensive dimethylformamide.

The reaction between the prepolymer and the curing compound takes place readily at room temperature. Therefore, the solution can be spun into a fiber or cast into a film within a relatively short period, e.g., a few minutes, after the curing compound has been added. For example, the solution can usually be cast or spun within 10 minutes after the addition of a diamine to the prepolymer when the reactants are at a temperature of about 25° C. In making fibers, the polymer solution can be spun into a water bath, or dry spun, via conventional techniques. Liquids other than water can be employed in the bath, if desired, but water is generally preferred for economic reasons. Ethylene glycol, glycerol, and the like are illustrative of such other liquids. The temperature of the bath can be varied over a range of, for instance, 25° C. to 150° C. The fiber is recovered from the bath by conventional techniques, and can be given a post-cure to oftentimes enhance certain of the properties. A cure at elevated temperatures, for example, up to about 125° C., and higher, for periods ranging from several minutes to several hours may be desirable in many instances. For the preparation of fibers, the cure can be conducted for a period, for example, as long as five hours whereas the cure can be increased to 16 hours, and longer, for the preparation of films. In any event, the cure, if desired, can be varied in duration to obtain the desired and optimum properties in the final product. Conventional solution casting techniques can be employed in making films.

If gelation should occur during the reaction between the prepolymer and the curing compound in the solvent, it is oftentimes desirable to add a small amount of acid to the prepolymer solution preferably before the curing compound is added. By so doing, the storage life of the solution containing the reaction product of prepolymer and curing compound can be increased significantly, for example, from a storage life in some cases of only a few minutes without the acid to a storage life of up to about several days with the acid. The acid is used in small amounts. For instance, from about 0.005, and lower, weight percent to about 0.6 weight percent of acid, and higher, based on the weight of the prepolymer, has been found to be suitable.

Laboratory tests have shown that the following acids and acid-forming compounds are oftentimes useful for the purpose described in the preceding paragraph: phosphoric acid, phosphorous acid, hydrochloric acid, nitric acid, sulfuric acid, benzoyl chloride, benzene sulfonyl chloride, benzenesulfonic acid, dichloroacetic acid, octylphenyl acid phosphate, stearyl acid phosphate, and boron trifluoride-etherate. It is to be noted that the $pK_{A'}$ of each of the above mentioned acids is less than about 2.5. (The term $pK_{A'}$ refers to the negative of the $\log_{10}$ of the hydrogen ion ionization constant in aqueous solution.) The strong mineral acids which have a $pK_{A'}$ less than about 2.5 represent a preferred subclass. Phosphoric acid is the preferred species.

The characteristics of the novel fibers and films can be varied over a wide range depending, to a significant degree, on the choice and proportion of the hydroxyl terminated polymers (diol), the diiocyanate source, and bifunctional curing compound, the reaction conditions, etc. The novel fibers and films can range from semi-elastic to highly elastic. A uniqueness which should be stressed is the overall combination of properties which oftentimes can be obtained such as would result from fibers prepared via the reaction of lactone polyester diol, FDI, and piperazine. For instance, novel elastic fibers and films can be obtained by the practice of the invention which exhibit many of the following characteristics.

The molecular weights of the resulting novel elastomeric fibers and films are somewhat difficult to ascertain with exactness. Nevertheless, they are sufficiently high enough so that significant semi-elastic and elastic properties in the film- and fiber-forming ranges result. For instance, novel elastic films and fibers (FDI, lactone polyester diol, and piperazine-diamine) can be obtained by the practice of the invention which exhibit many of the following characteristics:

| | |
|---|---|
| Tensile strength, p.s.i. | 8000 |
| Elongation, percent | 550 |
| 300% modulus, p.s.i. | 1000 |
| Stress decay, percent | 31 |
| Work recovery, percent | 25 |
| Tension set, percent | 20 |

Stability in Fadeometer test—No discoloration after 120 hours exposure.

The novel elastic and semi-elastic polymers are highly useful compositions. For instance, in the form of fibers, the polymers can be used to make foundation garments, bathing suits, sporting clothes, elastic waist bands, hose, and the like. In the form of films, the polymers can be employed as elastic sheeting, as "rubber bands," and the like.

Another highly significant aspect of the invention is the use of the novel diisocyanates of Formula I, and/or the novel prepolymers, and/or the novel polyisocyanato-containing polymers (especially the relatively low molecular weight polymeric aliphatic multiisocyanates as illustrated by Units IXE and IXF supra), to prepare foams, e.g., polyurethane foams, which can range from the extremely flexible to the highly rigid state. The prepolymers which are contemplated in this aspect are the polyisocyanato-containing reaction products which result from the reaction of polyfunctional compounds which contain two or more active hydrogen substituents as described previously, e.g., diols, triols, tetrols, diamines, triamines, amino alcohols, etc., with the novel diisocyanates of Formula I. The proportions of the reactants are such that a sufficient stoichiometric excess of diisocyanates with relation to the polyfunctional compound is employed, i.e., the equivalents of —NCO from the diisocyanate with relation to the equivalents of active hydrogen substituent from the polyfunctional compound is greater than one to thus give non-cross-linked polyisocyanato-containing reaction products (containing at least two —NCO groups) which are soluble in various common organic vehicles, e.g., benzene. Eminently desirable, non-yellowing flexible foams can be prepared via the so-called "one step" method which involves reacting a polyhydroxy compound, preferably one that contains at least three alcoholic hydroxyl groups, with the above-illustrated novel polyisocyanates, especially the novel low molecular weight polymeric aliphatic multiisocyanates, in the presence of a blowing agent such as water, a liquefied gas, and the like. It is desirable to conduct the reaction in the presence of a catalyst and surfactant. The preparation of the rigid foams differs from the preparation of the flexible foams in that it is generally preferred to first prepare what is oftentimes referred to as a "quasi prepolymer," and subsequently add thereto the remainder of the polyhydroxy compound, blowing agent, and other ingredients, if employed, e.g., catalyst, surfactant, etc.

A wide scope of polyhydroxy compounds can be employed. The preferred polyhydroxy compounds are those which contain three or more hydroxy groups. Illustrative polyhydroxy compounds include the following classes of compounds (as well as those illustrated previously in this specification):

(a) The polyhydroxy initiated lactone polyesters, and the alkylene oxide adducts thereof;

(b) The polyester polyols (including the polyester diols), and the alkylene oxide adducts thereof;

(c) The polyhydroxyalkanes and polyhydroxycycloalkanes, and the alkylene oxide adducts thereof;

(d) The trialkanolamines, and the alkylene oxide adducts thereof;

(e) The polyols derived from polyamines by the addition of alkylene oxides thereto;

(f) The non-reducing sugars and sugar derivatives, and the alkylene oxide adducts thereof;

(g) The alkylene oxide adducts of aromatic amine/phenol/aldehyde ternary condensation products;

(h) The alkylene oxide adducts of phosphorus and polyphosphorus acids, and various hydroxyl-terminated phosphites and phosphonates;

(i) The alkylene oxide adducts of polyphenols;

(j) The polytetramethylene glycols;

(k) The functional glycerides, such as caster oil;

(l) The polyhydroxy-containing vinyl polymers; and the like.

The "preferred alkylene oxides" which term will be employed hereinafter include ethylene oxide, 1,2-epoxypropane, 1,2-epoxybutane, 2,3-epoxybutane, isobutylene oxide, epichlorohydrin, and mixtures thereof.

Illustrative polyhydroxyalkanes and polyhydroxycycloalkanes include, among others, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane, pentaerythritol, xylitol, arabitol, sorbitol, mannitol, and the preferred alkylene oxide adducts thereof.

Exemplary trialkanolamines include triethanolamine, triisopropanolamine, and the tributanolamines, and the preferred alkylene oxide adducts thereof.

Among the alkylene oxide adducts of polyamines can be listed the adducts of the preferred alkylene oxides with ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Illustrative of the resulting adducts which are of particular interest include, N,N,N',N'-tetrakis(2-hydroxyethyl)ethylenediamine, N,N,N',N'-tetrakis(2-hydroxypropyl)ethylenediamine, N,N,N',N',N''-pentakis(2-hydroxypropyl)diethylenetriamine, phenyldiisopropanolamine, and the like. Others which deserve particular mention are the preferred alkylene oxide adducts of aniline or substituted-aniline/formaldehyde condensation products.

Illustrative of the non-reducing sugars and sugar derivatives contemplated are sucrose; the alkyl glycosides such as methyl glucoside, ethyl glucoside, and the like; the polyol glycosides such as ethylene glycol glucoside, propylene glycol glucoside, glycerol glucoside, 1,2,6-hexanetriol glucoside, and the like; and the preferred alkylene oxide adducts thereof.

Preferred alkylene oxide adducts of polyphenols include those in which the polyphenol can be bisphenol A; bisphenol F; the condensation products of phenol and formaldehyde, more particularly the Novolac resins; the condensation products of various phenolic compounds and acrolein, the simplest members of this class being the 1,1,3 - tris(hydroxyphenyl)propanes; the condensation products of various phenolic compounds and glyoxal, glutaraldehyde, and other dialdehydes, the simplest members of this class being the 1,1,2,2-tetrakis(hydroxyphenyl)ethanes, and the like.

Another suitable class of polyhydroxy compounds include the preferred alkylene oxide adducts of aromatic amine/phenol/aldehyde ternary condensation products. The ternary condensation products are prepared by condensing an aromatic amine, for instance, aniline, toluidine, or the like, a phenol such as phenol, cresol, or the like; and an aldehyde preferably formaldehyde; at elevated temperatures in the range of, for example, from about 60° C. to 180° C. The condensation products are then recovered and reacted with said preferred alkylene oxide, using a basic catalyst (e.g., potassium hydroxide), if desired, to produce the polyols. The propylene oxide and mixed propyleneethylene oxides adducts of aniline/phenol/formaldehyde ternary condensation products deserve particular mention.

The preferred alkylene oxide adducts of phosphorus and polyphosphorus acids are another useful class of polyols. Phosphoric acid, phosphorous acid, the polyphosphoric acids such as tripolyphosphoric acid, and the like, are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydroxyl groups. Illustrative are polyvinyl alcohol, vinyl chloride-vinyl alcohol copolymers, and other copolymers of various ethylenically-unsaturated monomers and vinyl alcohol. Also useful are polymers formed by reacting a dihydric phenol [for instance, 2,2-bis(4-hydroxyphenyl)propane] with epichlorohydrin in the presence of sodium hydroxide, such as the polymers disclosed in U.S. Pat. No. 2,602,075.

The polyhydroxy compound, including mixtures thereof, employed in the foam formulation can have hydroxyl numbers which vary over a wide range. In general, the hydroxyl numbers of these polyols can range from about 20, and lower, to about 1000, and higher, preferably from about 30 to about 600, and more preferably from about 35 to about 450.

The functionality and the hydroxyl number of the polyhydroxy compound are significant factors which enter into consideration in the preparation of foams. Thus, the polyol preferably possesses a hydroxyl number of from about 200 to about 800 when employed in rigid foam formulations, from about 50 to about 250 for semi-flexible foams, and from about 20 to about 70, or more, when employed in flexible foam formulations. Such limits are not intended to be restrictive, but are merely illustrative of the large number of possible combinations.

In general, it is desirable to employ at least about one —NCO equivalent (group) per hydroxyl equivalent (group) in the preparation of the urethane foamed product. As a practical matter, a slight excess of —NCO equivalents with relation to the hydroxyl equivalents is oftentimes employed. For optimum properties, those skilled in the art can readily determine the desired concentration of the reactants. Factors which will influence the concentration are the choice and functionality of the reactants, the end product—whether flexible or rigid, the choice of the blowing agent, the use of a catalyst and/or surfactant, and other considerations.

As indicated previously, various blowing agents such as water and halogenated hydrocarbons can be employed in the preparation of the foams. The preferred blowing agents are water and certain halogen-substituted aliphatic hydrocarbons which have boiling points between about —40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1, 1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1 - trichloro-2,2,2-trifluoroethane, 2-chloro-1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanato-hydroxyl reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanato/reactive hydrogen ratio of about 1:1, about 0.005 to 0.3 mol of gas are used to provide densities ranging from 30 to 1 pound per cubic foot, respectively.

In producing foamed reaction products, it is also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymers and from 90 to 20 percent by weight of alkylene oxide polymer, such as the block copolymers described in U.S. Pats. 2,834,748 and 2,917,480. Another useful class of emulsifiers are the "non-hydrolyzable" polysiloxane-polyoxyalkylene block copolymers, such as those described in U.S. 2,846,458. This class of compounds differs from the above-mentioned polysiloxane-polyol-oxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicone oil, polyethoxylated vegetable oils commercially available as "Selectrofoam 6903," "Emulphor EL-720," and others. Although the use of an emulsifier is desirable to influence the type of foam structure that is formed, the foam products of the invention can be prepared without emulsifiers in some cases.

The use of catalysts is generally desirable in the preparation of the novel foamed compositions. Among the catalysts which are contemplated include the tertiary amines, the phosphines, the organic metal compounds, and mixtures thereof, discussed supra with regard to the catalysis of the isocyanato/active hydrogen reactions. It is extremely advantageous to employ a combination of the tertiary amine compound and the organic tin compound as catalysts in the foam formulation. The catalyst is used in catalytically significant quantities. For instance, concentrations in the range of from about 0.001 weight percent, and lower, to about 2 weight percent, and higher, based on the total foam ingredients, have been found useful.

The techniques for producing polyurethane foams by the one shot, prepolymer, or semi-prepolymer methods are well known in the art, as is exemplified by the Saunders et al. text, cited above.

In some cases it is desirable to add a small quantity, e.g., up to 5 parts per 100 parts by weight of polyol, of a dipolar aprotic solvent such as formamide, N,N-dimethylformamide, or dimethyl sulfoxide to the foaming formulation. This serves to "open up" the cell structure when there is an undesired tendency to form closed-cell foams.

A particularly useful embodiment is directed to the preparation of so-called "vinyl foams." In this embodiment, an ethylenically unsaturated organic compound plus a catalytically effective amount of a vinyl polymerization catalyst, both of which have been illustrated previously, e.g., ethylene, vinyl chloride, benzoyl peroxide, etc., can be employed in the foam formulations and techniques described above. If desired, an ethylenically unsaturated polyol can be used which polyol can serve as the reactant in both the vinyl polymerization and the isocyanate condensation polymerization reactions. This embodiment opens up a new avenue in the preparation of polyurethane products, that is, "vinyl foams." Various commercial advantages are apparent in that the vinyl foam can be "tailor-made" by regulating the vinyl and isocyanate serving ingredients of the foam formulation. The formulation, also, can be made more fluid by the incorporation therein of mobile vinyl monomers such as styrene which, incidentally, lend to decreasing the cost of the formulation.

A further aspect of the invention is directed to the preparation of novel laminates and/or reinforced plastic materials which exhibit outstanding and extraordinary characteristics. The novel laminates and reinforced plastic materials exhibit high impact resistance, superior weathering properties, good dye receptivity, etc. Moreover, the novel laminates, in many respects, exhibit superior properties at elevated temperatures than those prepared from conventional polyesters. Though reinforced plastics prepared from such conventional polyesters enjoy commercial success, the use of polyurethane and/or polyurea systems in the subject field represents relatively new technology that does not appear to have been successfully commercialized to any noticeable extent.

The most common reinforcing material is glass, generally in the form of chopped fibers or as a woven glass cloth. The invention pertains, also, to other reinforcing material which are set forth in the well documented polyester laminating art. In general, a glass fiber or mat is placed in the reinforcing formulation explained hereinafter in such a manner as to essentially eliminate all trapped gases. The glass mat is often placed layer upon layer whereas the glass fiber can be dispersed in a predetermined set pattern, if desired. The formulation then can be cured in a heated mold, generally at superatmospheric pressure.

The reinforcing formulation can comprise (1) the novel polyisocyanates illustrated in Formula I, Units IX through IXD, the telomers such as those illustrated by units IXE and IXF, Formula XIV, and/or Formula XVI, (2) a polyfunctional active hydrogen compound (especially those which contain at least two groups from the class of hydroxyl, primary amino, and secondary amino, or mixture of such groups), (3) an ethylenically unsaturated organic compound, and (4) a vinyl polymerization catalyst. The proportions of the ingredients are such that the formulation will result in a cross-linked resin under the curing conditions. The conditions and techniques employed in the conventional polyester laminating art are translatable in this respect. The above ingredients as well as the proportion of the ingredients have been illustrated throughout the specification.

The reinforcing formulation offers an additional advantage in that the ethylenically unsaturated organic compound becomes a chemical part of the cured system during the vinyl polymerization and cure, instead of being simply a homopolymeric "filler" as is the case in various conventional polyester systems.

The afore-described novel reinforcing formulation is, of course, useful per se, that is, without the incorporation of glass therein. Curing the reinforcing formulation results in novel urea and/or urethane products which can be termed "poly(vinyl urethanes)" or "poly(vinyl ureas)" which terms include the "copoly(vinyl urethanes)" and the "copoly(vinyl ureas)." These products can be used as sealants, gaskets, O-rings, and the like. They can be machined, molded, extruded, fabricated, etc., into various shapes depending upon the type of ingredients employed. As discussed previously, the use of a blowing agent would result in the production of a "vinyl foam." The curing of the novel "reinforcing formulation" can be conducted over a wide temperature range. Thus, dual polymerization can be effected, i.e., isocyanato/active hydrogen polymerization and vinyl polymerization, by employing the operative conditions noted in the discussions re the active hydrogen and vinyl polymerization sections supra. The ratio of the NCO/active hydrogen can be varied as discussed previously in the NCO/active hydrogen section. The ratio of ethylenic bonds from the isocyanate source to ethylenic bonds from the ethylenically unsaturated organic compounds can be varied over an extremely wide range, e.g., from 1:99 to 99:1.

Another aspect of the invention is directed to the preparation of novel adhesive formulations which exhibit superior bond strength, no discernible "creeping," etc. These adhesive formulations can be used to bond metal to metal surfaces, fiber to rubber surfaces (such as in tire cords), cellulosic (such as wood) to cellulosic surfaces, cellulosic to metal surfaces, cellulosic to rubber surfaces, and others.

Chemically speaking, the novel adhesive formulations can comprise the novel polyisocyanates, e.g., the polyisocyanates exemplified by Formula I, the telomers such as those exemplified by Units IXE and IXF, Units IX through IXD, Formula XIV, and/or Formula XVI, with/without synthetic or natural rubber admixed therewith. Useful modifications of novel adhesive formulations are those which contain any of the novel ethylenically unsaturated polyisocyanates described supra, an ethylenically unsaturated organic compound, a vinyl polymerization catalyst, with/without synthetic or natural rubber. Further desirable novel adhesive formulations comprise the novel blocked products illustrated by Formula XI and/or Units XII through XIIIF supra with/without an ethylenically unsaturated organic compound and a vinyl polymerization catalyst.

In general, it should be noted that practically all of the novel aspects or embodiments described herein can be employed as adhesives when properly applied. The application of adhesive formulations is adequately covered in the literature; however, illustrative general procedures are as follows: (1) a solution comprising the novel polyisocyanate with/without rubber in an inert normally-liquid organic vehicle is coated on the metal, fabric, wood, etc. surface. Curing is then effected at room temperature. (2) A solution comprising the prepolymers, telomers, polyisocyanato polymeric products, etc. in an inert normally-liquid organic vehicle is applied to the surface to be bonded and then exposed to air for several minutes, e.g., 10 to 15 minutes. The vehicle thus evaporates and moisture from the air initiates the cure. The surfaces then are joined under moderate pressure and cured at room temperature or temperatures up to 200° C. (3) A solution comprising the products illustrated by Formulas XI, XIII, or XV, or by Units XII to XIIF contained in an inert normally liquid organic vehicle are supplied to the surface(s) to be bonded. The solvent is allowed to evaporate to form a slight tacky surface. Thereafter the cure is effected under pressure and/or elevated temperatures.

Extremely useful aspects of the invention are directed to the preparation of novel coatings. Such coatings include the one package moisture cure, the two package heat cure, and the blocked isocyanates.

In the one package moisture cure, there is dissolved in an inert normally-liquid organic vehicle a novel polyisocyanate such as illustrated by Formula I, Units IX through IXD, the telomers such as illustrated by Units IXE and IXF, Formula XIV, and/or Formula XVI. The resulting solution then is painted on the substrate to be coated. Curing is effected by reaction of the isocyanate group with moisture from the air to form urea linkages. The carbon dioxide which is formed is diffused through the thin coating. The coating can be either tightly or loosely cross-linked, depending on the mechanical properties desired. The quantity of polyisocyanate in the vehicle is readily controlled by the formulator. A prepolymer system is preferred. As intimated above the novel polyisocyanates of Formulas I, XIV, and/or XVI can be used "as is," or they may be reacted with ethylenically unsaturated organic compounds beforehand (note Units IX through IXD), or in situ, that is, during the coating preparation to form "poly(vinyl isocyanates)."

In the two-package heat cure, the novel polyisocyanates described throughout this specification are reacted, either in an inert normally-liquid organic vehicle or neat, with a polyfunctional compound which preferably contains hydroxyl, primary amino, and/or secondary amino groups. The polyfunctional compounds which contain at least two hydroxyl groups are preferred. Such compounds would also include, for example, the polyurethane polyols discussed in the section re Formula XIII supra. The ratio of NCO/active hydrogen is generally about one, although it can be greater than or less than one, e.g., about 0.8, and lower, to about 1.2, and higher. When the NCO/active hydrogen ratio is greater than one, the excess NCO reacts, at elevated temperatures, or in the presence of a catalyst such as dibutyltin dilaurate, with the urethane or urea groups in the molecule to form allophanate or biurets groups, respectively.

The two package heat cure systems get their name from the obvious fact that the art employs two packages. Thus, one package can comprise the polyisocyanate source, such as the novel prepolymers, generally contained in an inert normally liquid organic vehicle, whereas the second package can contain, for example, the polyol source in the inert vehicle. Either package could contain other ingredients such as catalyst, etc. Any of the novel polyisocyanates described previously can be employed in the two package coating systems. The polyfunctional compounds, especially the preferred polyhydroxy compounds, have been adequately illustrated supra. In addition, ethylenically unsaturated organic compounds can be employed. These compounds can be placed in either the ethylenically unsaturated isocyanate-containing package, or the active hydrogen-containing package, and the vinyl polymerization effected during the cure. Alternatively, the polymerization can be conducted first, followed by reacting the resultant poly(vinylisocyanate)

with the polyfunctional compounds. Of course, vinyl polymerization catalysts are employed wherever desirable.

In the blocked isocyanate systems, a "blocked" isocyanate as illustrated by Units XII through XIIF is admixed with a polyfunctional compound as illustrated in the two package system to form a solution which is stable at room temperature or slightly higher than room temperature. At elevated temperatures, e.g., about 165° C., the blocked isocyanate can be visualized as "unblocking" itself and instantaneously reacting with the polyfunctional compound to thus form the coating.

In various aspects, the novel polyisocyanate compounds as well as the novel "blocked" isocyanates and the "partially blocked" isocyanates (such as would occur via the reaction of equimolar amounts of the diisocyanate of Formula I with a monofunctioinal compound) with/without active hydrogen-containing compounds can be employed to treat textiles. Such treatment imparts to the treated textile a host of desirable characteristics among which the following should be noted: (1) water repellency, (2) improve wet strength, (3) reduce shrinkage, (4) improve dye-receptivity, (5) induce flame-proofing, (6) modification of cellulose and cellulosic derivatives (a) to improve water resistance, and (b) to raise softening point, and/or (7) improve resistance.

Two methods can be employed in the treatment of textiles, namely the so-called "emulsion" treatment and the "solution" treatment. In the "emulsion" method, the isocyanate-containing compound, an emulsifier, and water are mixed to form an emulsion. The textile to be treated is immersed in this emulsion, excess emulsion is then squeezed out, and the treated textile cured at elevated temperatures. In the "solution" method the textile is immersed in a solution of the isocyanate containing compound in an inert normally ilquid organic vehicle, e.g., toluene, followed by air drying and curing at elevated temperatures, e.g., about 100° to 150° C. If it is desired to use an active hydrogen compound, the textile is usually impregnated with said compound prior to immersion in the isocyanate-containing bath.

In the case of monomeric isocyanates such as those exemplified by Formula I supra, the "solution" method is preferred. Moreover, the monomeric isocyanate and an ethylenically unsaturated organic compound can be copolymerized on a textile fabric during the cure.

Flame proofing of the textile fabric can be induced through the use of the novel polyisocyanates and hydroxyl-containing phosphorus compound. Halogen-containing compounds will also impart flame proofing characteristics, and an interesting method of incorporating halogen into the system is via the copolymerization of the isocyanates of Formula I with a halogen-containing vinyl monomer, e.g., chloroprene, vinyl chloride, vinylidene chloride, etc.

Improvement of abrasion resistance can be accomplished by the use of "blocked" isocyanates (of Formula XI and Units XII to XIIF). The textile (e.g., fabric or yarn) to be treated is dipped into an inert solution containing the "blocked" isocyanate which can be maintained, for example, at temperatures in excess of unblocking temperature. The unblocked isocyanate then reacts with active hydrogen-containing material within the fabric or yarn, or else an active hydrogen-containing material can be included in the solution and the unblocked isocyanate reacts with it to form a coating. Of course, the novel polyisocyanates with/without an active hydrogen compound contained in an inert normally-liquid organic vehicle can be employed in this respect.

Various terms, abbreviations, designations, properties, etc., used in this specification are explained hereinbelow:

(1) MOCA represents 4,4'-methylene-bis(2-chloroaniline).

(2) FDI represents bis(2-isocyanatoethyl) fumarate.

(3) LIFDI represents bis(2-isocyanato-1-methylethyl)-fumarate.

(4) $BF_3$-MEA represents boron trifluoride-monoethanolamine complex.

(5) TDI represents an 80/20 mixture (by weight) of 2,4- and 2,6-tolylenediisocyanate.

(6) DMF represents N,N-dimethyl formamide.

(7) EDA represents ethylenediamine.

(8) Shore D hardness Shore A–2 hardness—Determined according to ASTM D1706–59T. Instruments were Shore Durometers D and A–2.

(9) Impact Resistance was determined by the Gardner Bump Test Method.

The Gardner Bump Tester consists of a weight which can be dropped onto a plunger from a measured height. The plunger rests on the material to be tested—the test sample being placed over a circular opening.

Samples were tested at about 26° C. and were generally ¼" in thickness. The test was repeated, at a different point on the sample each time, until the sample either cracked, broke into pieces, or the limits of the weights were attained.

Impact resistance was calculated by multiplying the weight by the distance dropped and recorded in "inch pounds."

(10) Stiffness Modulus—A secant modulus measure determined in the following manner. A sample in an Instron at 26° C. is extended to one percent of its original length at 0.1 inch/min. for 1 inch gauge length. The stress in p.s.i. necessary to extend the sample one percent is determined and the Stiffness Modulus determined by dividing this stress in p.s.i. by 0.01, to wit:

$$\frac{\text{P.s.i. at 1\% extension}}{0.01} = \text{Stiffness Modulus, p.s.i.}$$

(11) Conversion (percent) as used in the examples represents the amount of polymer recovered (in grams) multiplied by 100 divided by the total amount of monomer charged (in grams); thus $$\frac{\text{Polymer (grams)} \times 100}{\text{Total Monomer(s) (grams)}} = \text{Percent Conversion}$$

(12) Fadeometer Test—Light source is a violet Carbon Arc Lamp which produces a spectrum from 270 m$\mu$ through 2000 m$\mu$. Sample is rotated in the presence of said light source at 63° C. and 35 percent relative humidity. Exposed sample is compared with unexposed sample.

(13) Standard Time Analysis For Isocyanate—The isocyanato-containing compound to be analyzed is weighed into a measured amount (excess) of di-n-butyl-amine solution in dry toluene (in solution), and allowed to stand for 30 minutes at about 26° C. with occasional swirling. Isopropanol then is added and the excess amine is titrated with standard HCl to the bromophenol blue end point.

(14) Solv. 150 (Solvesso 150)—A commercial solvent which is 97.3 percent aromatics and possesses a boiling range of from 184.4° C. to 213.3° C.

(15) Hydroxvyl Number—The minimum number of milligrams of KOH that is required to neutralize the acid which is generated by the reaction of one gram of the hydroxyl-containing compound with anhydride, e.g., acetic anhydride, or its halide. The following equation illustrates the foregoing:

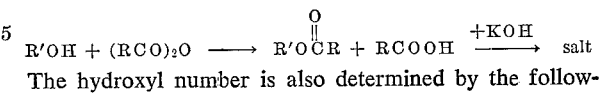

The hydroxyl number is also determined by the following equation:

$$OH = \frac{56.1 \times 1000 \times F}{M.W.}$$

wherein OH is the hydroxyl number, wherein F is the functionality, i.e., number of hydroxyl groups, of the hydroxyl-containing compound, and wherein M.W. is the molecular weight of the hydroxyl-containing compound.

(16) Polyol A—The propylene oxide adduct of 1,2,6-hexanetriol having a hydroxyl number of 240. Preparation is as follows: 1,2,6-hexanetriol (1072 grams, 8.0 mols) are mixed with 3.0 grams of KOH, heated to 105° C., and then propylene oxide (4510 grams, 72.8 mols) are added over a period of about 4 hours, the temperature being maintained betwen 105° and 130° C. Magnesium silicate then is added to the resulting mixture, followed by stirring at 120° C. for 4 hours. After filtration, the filtrate is stripped at 120° C. under 12 mm. of Hg. The product has the following charcteristics:

Hydroxyl No. _____ 240
Propyleneoxy groups per chain (aver.) _____ 3.67

(17) Polyol B—The propylene oxide adduct of 1,1,3-tris(hydroxyphenyl)propane having a hydroxyl number of 245. Preparation is as follows: 1,1,3-tris(hydroxyphenyl)propane (320 grams) are mixed with 1.6 grams of NaOH, heated to about 165° C., and then propylene oxide (522 grams, 9.0 mols) are added over a period of about 25.5 hours, the temperature being maintained at about 165° C. 407 grams of the reaction product is dissolved in 800 cc. of neutral 1,4-dioxane and allowed to flow by gravity through a 34 mm. diameter x 1 foot long tube of Dowex 50–×8 cation exchange resin. The neutralized dioxane solution is stripped up to a temperature of 160° C. at a pressure of 3 millimeters of mercury. The product analyzes as follows:

Hydroxyl No. _____ 245
Propyleneoxy groups per chain (average) _____ 2.68

(18) Polyol C—The propylene oxide adduct of 1,1,1-trimethylolpropane having a hydroxyl number of 359. Preparation is as follows: 1,1,1-trimethylolpropane (536 grams, 4 mols) are mixed with 1.0 gram of KOH, heated to between 75°–120° C., and then propylene oxide (1336 grams, 23 mols) are added over a period of about 54 hours, the temperature being maintained at about 110° C. The resulting reaction product mixture is treated with Amberlite IR–120 and Nalcite HCR ion exchange resins to remove KOH therefrom, followed by stripping the same to 110° C. at 9 mm. of Hg. The product analyzes as follows:

Hydroxyl No. _____ 359
Propyleneoxy groups per chain (average) _____ 1.92

(19) Polyol D—The propylene oxide adduct of sorbitol having a hydroxyl number of about 381. Preparation is as follows: Sorbitol (910 grams, 5 mols) are mixed with 2.0 grams of KOH, heated to 120° C., and then propylene oxide (3492 grams, 60.3 mols) are added over a period of about 24 hours. The resulting reaction mixture is treated with Amberlite IR–120 and Nalcite HCR ion exchange resins to remove KOH therefrom, followed by stripping the same to 130° C. at 10 mm. of Hg. The product analyzes as follows:

Hydroxyl No. _____ 381
Propyleneoxy groups per chain (average) _____ 2.02

(20) Polyol E—The propylene oxide adduct of glycerol having a hydroxyl number of 382. Preparation is as follows: Glycerol (368.4 grams, 4.0 mols) are mixed with 0.75 gram of KOH, heated to between 95°–130° C., and then propylene oxide (1393.6 grams, 24.1 mols) are added over a period of about 60 hours. The resulting reaction product is neutralized to give a propylene oxide adduct of glycerol which analyzes as follows:

Hydroxyl No. _____ 382
Propylenoxy groups per chain (average) _____ 2.0

(21) Polyol F—Polypropylene glycol having an average molecular weight of 425 (known as PPG–425).

(22) Polyol G—Polypropylene glycol having an average molecular weight of 2025 (known as PPG–2025).

(23) Polyol H—A blend of the propylene oxide adduct of the reaction product of acrolein and phenol which has a hydroxyl number of 255, and the propylene oxide adduct of glycerol which has a hydroxyl number of 653. The resulting blend has a hydroxyl number of 380. Preparation of this blend is as follows.

8900 grams (94.7 moles) of phenol and 23.6 grams of a 1:1 molar complex of boric and oxalic acids are charged to a reaction kettle and heated to 70° C. 556 grams (9.47 moles) of acrolein is fed into the kettle over a period of one hour while stirring at 70° C. The temperature of the reaction mixture is increased to 120° C. for one-half hour. The temperature is then increased to 180° C. at atmospheric pressure to destroy the acid catalyst complex. After one hour at 180° C. the pressure is gradually lower to distill the remaining water and excess phenol. The temperature is held at 180° C. at a low pressure after phenol distillation is completed. Upon cooling a red-brown glassy product is recovered. The molecular weight of the product is 411.

1960 grams (4.77 mols) of the pulverized product from above is heated to 150° C. 4.5 grams of KOH pellets is added and after fifteen minutes stirring the propylene oxide feed is started. 2365 grams (40.8 mols) of propylene oxide is fed over a period of 24 hours at a temperature between 140° C. to 177° C. An additional 5.0 grams of KOH is added during the addition period to accelerate the reaction rate. The polyether product has a hydroxyl number of 255.

4013 grams of the above polyol is blended with 1837 grams of a propylene oxide adduct of glycerol having a hydroxyl number of 653. After removal of ionic impurities by means of ion exchange resins, the resulting polyol blend has a hydroxyl number of 380.

(24) Polyol J—Polypropylene glycol having an average molecular weight of 1025 (known as Niax Diol PPG–1025).

(25) Polyol K—The propylene oxide adduct of glycerol having a hydroxyl number of 623. Preparation is similar to that set forth in the discussion of Polyol E supra except 712 grams (12.25 mols) of propylene oxide are employed. The resulting adduct averages 1.02 propyleneoxy groups per chain.

(26) Polyol L—The propylene oxide adduct of sorbitol having a hydroxyl number of 509. Preparation is similar to that set forth in the discussion of Polyol D supra except 2380 grams (41.1 mols) of propylene oxide are employed. The resulting adduct averages 1.37 propyleneoxy groups per chain.

(27) Polyol M—Polypropylene glycol having an average molecular weight of 2025 (known as Niax Diol PPG–2025).

(28) Polyol N—Poly(tetramethyleneoxy)glycol prepared by polymerizing tetrahydrofuran to an average molecular weight of 3000 (known as Teracol–30).

(29) Polyol P—The propylene oxide adduct of sucrose having a hydroxyl number of 481. Preparation is as follows: Sucrose (1710 grams, 5.0 mols) are mixed with 3 grams of KOH, heated to 195° C., and then propylene oxide (2950 grams, 50.7 mols) are added over a period of about 48 hours. The resulting reaction product is neutralized to give a propylene oxide adduct of sucrose which analyzes as follows:

Hydroxyl No. _____ 481
Propyleneoxy groups per chain (average) _____ 1.27

(30) Polyol Q—Polypropylene glycol having an average molecular weight of 1025 (known as PPG–1025).

(31) Polyol R—A polyol prepared in the same manner as Polyol E except that sufficient propylene oxide is employed to give a final product which has a hydroxyl number of 56.

(32) Surfactant A—A hydrolyzable polysiloxane-polyoxyalkylene block copolymer in which the blocks are connected by —Si—O—C— links. The oxyalkylene portion is a butanol terminated mixed oxyethyleneoxypropylene polymer which has an average molecular weight of about 1500 (about 50 weight percent oxyethylene and about 50 weight percent oxypropylene). The polysiloxane portion is an open chain polymer which contains silicon bonded methyl groups and has an average molecular weight of about 1500.

(33) Surfactant B—A modified Surfactant A made from (1) ethoxy end-blocked dimethylpolysiloxane of about 1525 molecular weight, and (2) a water-soluble, hydroxyl-terminated polyether composed of 75 weight percent oxyethylene and 25 weight percent oxypropylene and having a viscosity Saybolt seconds at 100° F. of 1400.

The sole figure represents stress-strain curves which were obtained in the following manner:

(a) ASTM D-412-62t die C tensile dog bones, bench marked for one inch gauge lengths, were extended at an Instron crosshead rate of 20 inches per minute to a strain of 300 percent (as measured by the relative displacement of the bench marks); the loading portion of the loading-unloading cycle is indicated by line $o$–$a$ in the figure.

(b) The samples were held at 300 percent elongation for 1 minute, during this time stress due to extension "decays" as bonds between molecules breakdown and the molecular chains orient themselves in the direction of extension, this phenomenon is indicated by the line $a$–$b$.

(c) The crosshead of the tensile tester was returned to its original position at a rate of 20 inches per minute, note that the stress response of the samples to extension becomes zero before the specimen returns to the state of zero elongation (line $b$–$c$).

(d) After allowing one minute for the samples to "recover" they were strained at a rate of 20 inches per minute to rupture (line $e$–$f$). This measures tensile strength.

The distance $o$–$e$ in the figure is due to "permanent set," percent increase in the distance between the bench marks, due to the loading-unloading cycle. This parameter has significance in that it indicates how well a garment will hold its shape. A woman's girdle made from a yarn with a large permanent set would increase in size with repeated wearing.

"Stress decay" is defined as the absolute decrease in stress ($\Delta\sigma$) divided by the original stress at point ($a$). This ratio is most often expressed as a percentage. Stress decay and creep, extension of a sample with time when subjected to a constant load, are functionally related. A material exhibiting a large amount of stress decay will also exhibit a large amount of creep. A girdle made from a yarn exhibiting a large amount of creep would expand with time upon wearing and provide less and less support as the period of wearing increased.

The areas encompassed by the points oad and cbd are proportional, respectively, to the work done on the sample when extending it and the work given back by the sample when it is released. The ratio of the work returned by the sample to the work done on the sample is defined as "work recovery." This parameter is a measure of how "snappy" the material is. High work recovery values are associated with materials of high snap.

"Tension set" is the amount of permanent increase in length due to holding a specimen at an elongation of 400 percent for 16 hours at 21° C. The strain level (400%) and the amount of permanent increase in length are determined by the relative displacement of gauge marks initially placed 1 inch apart. Tension set is measured 10 minutes after the strained sample is released.

Laminac 4123—Trade name for a commercially available polyester prepared via the reaction of an admixture of phthalic anhydride, maleic anhydride, and propylene glycol dissolved in styrene.

EXAMPLE 1

Bis(2-aminoethyl) fumarate and dihydrochloride salt

Phosgene was sparged through a solution of 195 grams (2.0 mols) of monoethanolamine hydrochloride and 98 grams (1.0 mol) of maleic anhydride in 1168 grams of ethylene dichloride at a rate of 0.25 mol of phosgene per mol of anhydride per hour for a period of 11 hours. The kettle temperature was maintained at 75° C. to 80° C. throughout the phosgene addition. The resultant crude bis(2-aminoethyl) fumarate dihydrochloride was isolated by filtration, washed with ether and methanol and finally dried. 95 grams of the refined product were obtained which represented a 35 percent yield. The bis(2-aminoethyl) fumarate dihydrochloride was characterized by a melting point of 204°–206° C. Upon analysis the product had the following properties: Calculated for $C_8H_{14}N_2O_4Cl_2$: N, 10.18. Found N, 10.33. Infrared spectrum was in agreement with that of the assigned structure with absorption maxima at $3.35\mu$ ($NH_3^+$); $3.7\mu$, $3.85\mu$, and $4.0\mu$ amine hydrochloride); $5.8\mu$ (ester C=O); $6.08\mu$ (C=C); $6.27\mu$ and $6.7\mu$ ($NH_3^+$); $7.9\mu$ and $7.95\mu$ (C=O as in fumarate); and $12.3\mu$ (fumarate).

Upon basification of the bis(2-aminoethyl) fumarate dihydrochloride, the free ester diamine is obtained.

EXAMPLE 2

Bis(2-aminoethyl) fumarate and dihydrochloride salt

Phosgene was sparged through a slurried solution of 989 grams (10.02 mols) of monoethanolamine hydrochloride and 490 grams (5.0 mols) of maleic anhydride in 2095 grams of ortho-dichloro-benzene at a rate of 0.02 mol of phosgene per mol of anhydride per hour for a period of 10 hours. The kettle temerature was maintained at 75°–85° C. throughout the phosgene addition. The crude bis(2-aminoethyl) fumarate dihydrochloride was isolated by filtration, washed with ether and methanol and finally dried. 1259 grams of the refined product were obtained which represented a 91.5 percent yield of the theoretical value and exhibited an infrared spectrum in agreement with the assigned structure.

Upon basification of the bis(2-aminoethyl) fumarate dihydrochloride, the free ester diamine is obtained.

EXAMPLE 3

Bis(2-aminoethyl) fumarate and dihydrochloride salt

A mixture was prepared containing 195 grams (2.0 mols) of monoethanolamin hydrochloride, 151 grams of fumaroyl chloride (1.0 mol) and 1380 grams of toluene. This mixture was heated to 80°–90° C. and held at that temperature for a period of 46 hours at which time no further evolution of hydrogen chloride was detected. The resulting solid bis(2-aminoethyl) fumarate dihydrochloride was isolated by filtration, washed with ether and methanol, and finally dried. 193 grams of the refined product was obtained which represented a 70 percent yield of the theoretical value. The bis(2-aminoethyl) fumarate dihydrochloride had a melting point of 206° C. and the following analysis. Calculated for $C_8H_{16}N_2O_4Cl_2$: C, 34.92; H, 5.86; N, 10.18; and Cl, 25.77. Found: C, 34.34; H, 5.85; N, 10.20; and Cl, 26.00. Infrared spectrum was in agreement with that of the assigned structure with absorption maxima at $3.3\mu$, $3.85\mu$, $4.12\mu$, and $4.97\mu$ ($NH_3^+$), $6.1\mu$ (C=C), and $5.8\mu$ (C=O).

Upon basification of the bis(2-aminoethyl) fumarate dihydrochloride, the free ester diamine is obtained.

EXAMPLE 4

Bis(2-aminoethyl) fumarate and dihydrochloride salt

A mixture containing 97 grams (1.0 mol) of monoethanolamine hydrochloride, 49 grams (0.5 mol) of maleic anhydride in 436 grams of xylene was maintained at reflux temperature, i.e., about 138° C., while anhydrous hydrogen chloride was sparged through the mixture at a rate of 0.6 mol of hydrogen chloride per mol of anhydride per hour and by-product water was removed overhead. The theoretical quantity of water (9.0 cubic centimeters) was collected over a period of 15 hours and the residue product, bis(2-aminoethyl) fumarate dihydrochloride, isolated by filtration, washed with ether and methanol, and finally dried. 46 grams of the refined product was obtained which represented a 33 percent yield of the theoretical value. The bis(2-aminoethyl) fumarate dihydrochloride had a melting point of 197° C. and exhibited an infrared spectrum in agreement with that of the assigned structure.

Upon basification of the bis(2-aminoethyl) fumarate dihydrochloride, the free ester diamine is obtained.

EXAMPLE 5

Bis(2-isocyanatoethyl) fumarate

Phosgene was sparged through a slurry of 1067 grams (3.9 mols) of bis(2-aminoethyl) fumarate dihydrochloride in 9962 grams of ortho-dichlorobenzene at a rate of one mol per hour per mol of hydrochloride for a period of six hours. The temperature of the mixture was maintained at 140°–160° C. throughout the addition of the phosgene. Thereafter, the ortho-dichlorobenzene solvent was removed by distillation from the resultant clear solution and 937 grams of crude residue product, which represented 95 percent of the theoretical value, further refined by distillation. 800 grams of refined bis(2-isocyanatoethyl) fumarate was recovered which represented 81 percent of the theoretical value. The product had a boiling point of 147° C. at a pressure of 0.05 millimeters of mercury. Upon analysis the product had the following properties: Calculated for $C_{10}H_{10}O_6N_2$: C, 47.25; H, 3.94. Found C, 46.84; H, 4.07. Infrared spectrum was in agreement with that of the assigned structure with absorption maxima at $2.87\mu$ (overtone of $5.85\mu$ C=O), $3.25\mu$ (C=CH—), $4.4\mu$ (N=C=O), $5.85\mu$ (ester C=O), $6.08\mu$ (C=C), and $7.85\mu$ and $8.05\mu$ (ester C=O).

EXAMPLE 6

Bis(2-isocyanatoethyl) fumarate

Phosgene was sparged through a slurry of 98 grams (1.0 mol) of maleic anhydride, 195 grams (2.0 mols) of monoethanolamine hydrochloride, in 435 grams of chlorobenzene at a rate of 0.2 mol per hour per mol of anhydride for a period of seven hours. The temperature of the mixture was maintained at 80°–100° C. throughout the addition of the phosgene. The intermediate solid bis-(2-aminoethyl) fumarate dihydrochloride was not isolated from the resulting slurry but an additional 665 grams of chlorobenzene were added to the mixture and the phosgenation continued at a rate of one mol per hour per mol of hydrochloride for a period of nineteen hours. The temperature was maintained at 120°–130° C. throughout the phosgenation. The bis(2-isocyanatoethyl) fumarate product was isolated and refined in the same manner as described in Example 6. 130 grams of the refined diisocyanate were recovered which represented 51 percent of the theoretical value. Infrared spectrum was in agreement with that of the assigned structure with absorption maxima at $2.87\mu$ (overtone of $5.85\mu$ C=O), $3.25\mu$ (CH stretching), $4.4\mu$ (N=C=O), $5.85\mu$ (ester C=O), $6.08\mu$ (C=C), and $7.85\mu$ and $8.05\mu$ (ester C=O).

EXAMPLE 7

Bis(2-amino-1-methylethyl) fumarate dihydrochloride

To a 2-liter glass resin kettle equipped with a high-speed air stirrer of the scraped-wall type, a thermometer, a reflux condenser and a nitrogen sparger was charged a mixture of 55.8 g. (0.5 m.) of monoisopropanolamine hydrochloride, 38.25 g. (0.25 m.) of fumaroyl chloride and 100 ml. of o-dichlorobenzene. The temperature was raised to 85–90° and maintained for a period of 13 hours, by which time the evolution of hydrogen chloride had ceased. A nitrogen sparge was maintained throughout the course of the reaction to aid in carrying-off the by-product hydrogen chloride. The hard white solid product was recovered by filtration, triturated under ether, refiltered and vacuum dried. There was obtained in this manner 70 g. (92.1 percent) of a fine, white powder melting at 178–181° with evolution of an acidic gas. The product was slightly soluble in the lower alcohols, particularly methanol, highly soluble in water and insoluble in all other usual organic solvents. A small sample of this material was taken up in hot methanol, filtered and reprecipitated by addition of ethyl acetate. The melting point of the product obtained in this manner was 194–196°. Upon analysis the product had the following properties: Calculated for $$C_{10}H_{20}N_2O_4Cl_2$$

C, 39.61; H, 6.60; N, 9.24. Found: C, 39.47; H, 6.78; N, 9.20. The infrared spectrum was consistent with the assigned structure, exhibiting bonds at $3.96\mu$, $5.0\mu$, $6.25\mu$ and $6.65\mu$ ($NH_3^+$); $7.23\mu$ ($CH_3$); $6.11\mu$ (C=C); $7.73\mu$, $7.92\mu$ and $8.62\mu$ (C—O); $5.85\mu$ (C=O), and $10.25\mu$ (RC=CR).

EXAMPLE 8

Bis(2-isocyanato-1-methylethyl) fumarate

To a 2-liter glass resin kettle equipped as described above was charged a mixture of 111.6 g. of monoisopropanolamine hydrochloride (1.0 m.), 75.6 g. (0.5 m.) of fumaroyl chloride and 120 g. of o-dichlorobenzene. The temperature was raised to 85° and maintained at 85–95° for 14 hours, at which time a white solid product was present and hydrogen chloride evaluation ceased. The charge was then allowed to cool to ambient temperatures, after which 1110 g. of o-dichlorobenzene was added and the gas sparging tube was connected to a source of phosgene gas. Phosgene sparging was commenced while the temperature was raised rapidly to 135–145° and maintained for 6 hours. Throughout this period, the rate of the phosgene sparging was approximately one mole/hour. At the conclusion of the 6 hour period, hydrogen chloride evolution had ceased and a clear solution was obtained. After a nitrogen sparge at 150° to remove excess phosgene, the solvent was stripped off at reduced pressure leaving 144 g. of a liquid residue. Evaporative distillation at 190°/.11 mm. through a turba-film evaporator afforded 106 g. (75.1 percent) of a yellowish-green, mobile oil. On redistillation, the principal product was recovered as a water-white liquid, B.P. 135–145°/.015 mm., 30/D, 1.4716 with analysis calculated for $C_{12}H_{14}N_2O_6$: C, 51.06; H, 4.97; N, 9.93. Found: 50.81; H, 5.17; N, 10.05. The infrared spectrum (neat) was in agreement with the assigned structure. Bands were present at $3.35\mu$ ($CH_3$), $3.42\mu$ and $3.47\mu$ (CH and $CH_2$); $4.45\mu$ (NCO); $5.84\mu$ (C=O); $6.1\mu$ (conjugated C=C); 7.74, 7.97 and $8.62\mu$ (C—O); $10.15\mu$ (trans RCH=CHR). Very weak bands attributed to possible OH and NH impurities were found at $2.72\mu$, $3.0\mu$ and $6.5\mu$.

EXAMPLE 9

Bis(3-aminopropyl) fumarate dihydrochloride

A mixture is prepared containing 223 grams (2.0 mols) of 3-aminopropanol hydrochloride, 153 grams of fumaroyl chloride (1.0 mol) and 457 grams of toluene. This mixture is heated to 80°–90° C. and held at that temperature for a period of 46 hours at which time no further evolution of hydrogen chloride is detected. The resulting solid bis(3-aminopropyl) fumarate dihydrochloride is isolated by filtration, washed with ether and methanol, and finally dried.

EXAMPLE 10

Bis(3-isocyanatopropyl) fumarate

Phosgene is sparged through a slurry of 303 grams (1.0 mol) of bis(3-aminopropyl) fumarate dihydrochloride in 2700 grams of ortho-dichlorobenzene at a rate of one mol per hour per mol of hydrochloride for a period of six hours. The temperature of the mixture is maintained at 140–160° C. throughout the addition of the phosgene. Thereafter, the ortho-dichlorobenzene solvent is removed by distillation from the resultant clear solution and the crude residue product is further refined by distillation to give bis(3-isocyanatopropyl)-fumarate. The infrared spec-

EXAMPLE 11

Bis(4-aminophenyl) fumarate dihydrochloride

A mixture is prepared containing 291 grams (2.0 mols) of 4-aminophenol hydrochloride, 153 grams of fumaroyl chloride (1.0 mol) and 559 grams of toluene. This mixture is heated to 80°–90° C. and held at that temperature for a period of 46 hours at which time no further evolution of hydrogen chloride is detected. The resulting solid bis(4-aminophenyl) fumurate dihydrochloride is isolated by filtration, washed with ether and methanol, and finally dried.

EXAMPLE 12

Bis(4-isocyanatophenyl) fumarate

Phosgene is sparged through a slurry of 371 grams (1.0 mol) of bis(4-aminophenyl) fumarate dihydrochloride in 333 grams of ortho-dichlorobenzene at a rate of one mol per hour per mol of hydrochloride for a period of six hours. The temperature of the mixture is maintained at 140–160° C. throughout the addition of phosgene. Thereafter, the ortho-dichlorobenzene solvent is removed by distillation from the resultant clear solution and the crude residue product is further refined by recrystallization to give bis(4-isocyanatophenyl) fumarate. The infrared spectrum, the isocyanate functional group analysis, and the elemental analysis for carbon, hydrogen, and nitrogen, are consistent with the assigned structure.

EXAMPLE 13

Bis(4-aminocyclohexyl) fumarate dihydrochloride

A mixture is prepared containing 303 grams (2.0 mols) of 4-aminocyclohexanol hydrochloride, 153 grams of fumaroyl chloride (1.0 mol) and 559 grams of toluene. This mixture is heated to 80°–90° C. and held at that temperature for a period of 46 hours at which time no further evolution of hydrogen chloride is detected. The resulting solid bis(4-aminocyclohexyl) fumarate dihydrochloride is isolated by filtration, washed with ether and methanol, and finally dried.

EXAMPLE 14

Bis(4-isocyanatocyclohexyl) fumarate

Phosgene is sparged through a slurry of 383 grams (1.0 mol) of bis(4-aminocyclohexyl) fumarate dihydrochloride in 3447 grams of ortho-dichlorobenzene at a rate of one mol per hour per mol of hydrochloride for a period of six hours. The temperature of the mixture is maintained at 140°–160° C. throughout the addition of the phosgene. Thereafter, the ortho-dichlorobenzene solvent is removed by distillation from the resultant clear solution and the crude residue product is further refined by distillation to give bis(4-isocyanatocyclohexyl) fumarate. The infrared spectrum, the isocyanate functional group analysis, and the elemental analysis for carbon, hydrogen, and nitrogen, are consistent with the assigned structure.

EXAMPLE 15

Bis(2-aminoethyl) itaconate dihydrochloride

A mixture is prepared containing 195 grams (2.0 mols) of monoethanolamine hydrochloride, 167 grams of itacanoyl chloride (1.0 mol) and 431 grams of toluene. This mixture is heated to 80°–90° C. and held at that temperature for a period of 46 hours at which time no further evolution of hydrogen chloride is detected. The resulting solid bis (2-aminoethyl) itaconate dihydrochloride is isolated by filtration, washed with ether and methanol, and finally dried.

EXAMPLE 16

Bis(2-isocyanatoethyl) iatconate

Phosgene is sparged through a slurry of 289 grams (1.0 mol) of bis(2-aminoethyl) itaconate dihydrochloride in 2601 grams of ortho-dichlorobenzene at a rate of one mol per hour per mol of hydrochloride for a period of six hours. The tempearture of the mixture is maintained at 140°–160° C. throughout the addition of the phosgene. Thereafter, the ortho-dichlorobenzene solvent is removed by distillation from the resultant clear solution and the crude residue product is further refined by distillation of bis(2-isocyanatoethyl) itaconate. The infared spectrum, the isocyanate functional group analysis, and the elemental analysis for carbon, hydrogen, and nitrogen, are consistent with the assigned structure.

EXAMPLE 17

Bis(4-aminophenylmethyl) chlorofumarate dihydrochloride

A mixture is prepared containing 319 grams (2.0 mols) of 4-aminophenylmethanol hydrochloride, 187.5 grams of chlorofumaroyl chloride (1.0 mol) and 600 grams of toluene. This mixture is heated to 80°–90° C. and held at that temperature for a period of 46 hours at which time no further evolution of hydrogen chloride is detected. The resulting solid bis-(4-aminophenylmethyl) chlorofumarate dihydrochloride is isolated by filtration, washed with ether and methanol, and finally dried.

EXAMPLE 18

Bis(4-isocyanatophenylmethyl) chlorofumarate

Phosgene is sparged through a slurry of 399 grams (1.0 mol) of bis(4-aminophenylmethyl) chlorofumarate dihydrochloride in 3591 grams of ortho-dichlorobenzene at a rate of one mol per hour per mol of hydrochloride for a period of six hours. The temperature of the mixture is maintained at 140°–160° C. throughout the addition of the phosgene. Thereafter, the ortho-dichlorobenzene solvent is removed by distillation from the resultant clear solution and the crude residue product is further refined by recrystallization to give bis(4-isocyanatophenylmethyl) chlorofumarate. The infrared spectrum and the isocyanate functional group analysis are consistent with the assigned structure.

EXAMPLE 19

Bis(17-aminoheptadecyl) glutaconate dihydrochloride

A mixture is prepared containing 593 grams (2.0 mols) of 17 aminoheptadecanol hydrochloride glutaconoyl chloride (167 g., 1.0 mol) and 1061 grams of toluene. This mixture is heated to 80°–90° C. and held at that temperature for a period of 46 hours at which time no further evolution of hydrogen chloride is detected. The resulting solid bis(17-aminoheptadecyl) glutaconate dihydrochloride is isolated by filtration, washed with ether and methanol, and finally dried.

EXAMPLE 20

Bis(17-isocyanatoheptadecyl) glutaconate

Phosgene is sparged through a slurry of 687 grams (1.0 mol) of bis(17-aminoheptadecyl) glutaconate dihydrochloride in 6381 grams of ortho-dichlorobenzene at a rate of one mol per hour per mol of hydrochloride for a period of six hours. The temperature of the mixture was maintained at 140–160° C. throughout the addition of the phosgene. Thereafter, the orthodichlorobenzene solvent is removed by distillation from the resultant clear solution and the crude residue product is further refined by recrystallization to give bis(17-isocyanatoheptadecyl) glutaconate. The infrared spectrum, the isocyanate functional group analysis and the elemental analysis for carbon, hydrogen, and nitrogen, are consistent with the assigned structure.

EXAMPLE 21

Bis(2-aminoethyl)hydromuconate dihydrochloride

A mixture is prepared containing 195 grams (2.0 mols) of monoethanolamine, 181 grams of 2 - butene - 1,4 - dicarbonyl chloride (1.0 mol) and 457 grams of toluene. This mixture is heated to 80°–90° C. and held at that temperature for a period of 46 hours at which time no further evolution of hydrogen chloride is detected. The resulting solid bis(2-aminoethyl)hydromuconate dihydrochloride is isolated by filtration, washed with ether and methanol, and finally dried.

EXAMPLE 22

Bis(2-isocyanatoethyl) hydromuconate

Phosgene is sparged through a slurry of 303 grams (1.0 mol) of bis(2-aminoethyl) hydromuconate dihydrochloride in 2700 grams of ortho-dichlorobenzene at a rate of one mol per hour per mol of hydrochloride for a period of six hours. The temperature of the mixture is maintained at 140°–160° C. throughout the addition of the phosgene. Thereafter, the ortho-dichlorobenzene solvent is removed by distillation from the resultant clear solution and the crude residue product is further refined by distillation to give bis(2-isocyanatoethyl) hydromuconate. The infrared spectrum, the isocyanate functional group analysis, and the elemental analysis for carbon, hydrogen, and nitrogen, are consistent with the assigned structure.

EXAMPLE 23

Preparation of phenyl N-(2-hydroxyethyl)carbamate (A) Ethanolamine (122 grams, 2 mols) was added dropwise with stirring to phenyl chloroformate (156.5 grams, 1 mol) in ethyl ether (400 ml.). A white precipitate of ethanolamine hydrochloride was immediately formed, and the ether quickly started to reflux. At the end of the addition, the resulting slurry was immediately filtered to remove ethanolamine hydrochloride. On standing a white solid began to precipitate from the filtrate. After standing overnight, this solid was filtered to give 147 grams (82%) of phenyl N-(2-hydroxyethyl)carbamate, a white crystalline solid M.P. 79° C.–80° C. The infrared spectrum was consistent with the assigned structure. Molecular weight determination was found to be 180 (theoretical 181). Elemental analyses ($C_9H_{11}NO_3$) for carbon, hydrogen, and nitrogen was in agreement with the theoretical.

Reaction of phenyl N-(2-hydroxyethyl)carbamate with fumaroyl chloride (B) Phenyl N - (2 - hydroxyethyl)carbamate (36.2 grams, 0.2 mol) was dissolved in toluene (200 ml.) by heating to 70° C. Fumaroyl chloride (15.3 grams, 0.1 mol) was added dropwise, hydrogen chloride being evolved and the temperature rising to 100° C. The resultant clear, orange-colored solution was allowed to cool and stand overnight. A pink tinted solid was formed. This solid was filtered and washed with cold methyl ether (which completely removed the color) and dried at 50° C. under vacuum. There was obtained 37 grams (84%) of bis[2-(phenoxyformamido)-ethyl] fumarate, a white solid M.P. 115°–117° C. The infrared spectrum of this material was the same as that obtained from authenicated bis[2-(phenoxyformamido)ethyl] fumarate which was prepared by the reaction of a stoichiometric amount of bis-(2-isocyanatoethyl) fumarate and phenol.

*Analysis.*—Calculated for $C_{22}H_{22}N_2O_8$ (percent): C, 59.75; H, 5.01; N, 6.32. Found (percent): C, 59.86; H, 5.07; N, 6.61.

EXAMPLE 24

Reaction of phenyl N-(2-hydroxyethyl)carbamate with maleic anhydride (A) An admixture containing maleic anhydride (9.6 grams, 0.2 mol), phenyl N-(2-hydroxyethyl)carbamate (36.2 grams, 0.2 mol), toluene (100 ml.), and p-toluenesulfonic acid catalyst (0.46 gram) was heated to a temperature which caused the toluene to reflux. Toluene and water, as an azeotropic mixture, was slowly removed while adding additional toluene to the system to maintain a constant volume of reactoin mixture. This procedure was continued for 3 hours until the toluene-containing material being removed was no longer cloudy. After removing the toluene from the resulting reaction product mixture, there was obtained a viscous greenish-yellow liquid. This liquid then was heated to 140° C. under 0.3 mm. of Hg to give 30 grams of a residue and 8 grams of a yellow liquid distillate which had a boiling point of about 104° C. Examination disclosed that said distillate contained a small amount of maleic anhydride and phenol; elemental analysis revealed 6.23% nitrogen. The residue (30 grams), a viscous greenish-yellow liquid, eventually solidified on standing to a waxy solid having a wide melting range of about 25°–48° C. The infrared spectrum of this waxy solid did not agree with bis[2-(phenoxyformamido)ethyl] fumarate (see Example 23). The elemental analysis of said waxy solid was not in agreement with bis [2-(phenoxyformamido)ethyl] maleate, the desired product.

*Analysis.*—Calculated for $C_{22}H_{22}N_2O_8$ (percent): C, 59.75; H, 5.01; N, 6.32. Found (percent): C, 54.63, H, 5.11; N, 7.36.

(B) The materials and procedure of paragraph A were repeated except one milliliter of concentrated hydrochloric acid in lieu of the p-toluenesulfonic acid was used as the catalyst. On cooling, two phases formed. The lower layer was a viscous greenish-yellow liquid, the upper layer represented the bulk of the toluene. The lower phase was recovered and the toluene distilled therefrom. Further attempts to redistill the greenish-yellow liquid did not result in any distillate. Upon standing, said greenish-yellow liquid slowly solidified to a waxy solid having a wide melting range of about 25°–48° C. The infrared spectrum of this waxy product did not agree with bis-[2-(phenoxyformamido)ethyl] fumarate. The infrared spectrum was the same as that of the product obtained in paragraph A. It should be noted that concentrated hydrochloric acid was employed in this experiment (instead of p-toluenesulfonic acid) since maleate esters, in general, oftentimes isomerize to fumarate esters using said HCl as the catalyst.

Reaction of maleic acid and phenyl N-(2-hydroxyethyl) carbamate (C) A mixture of maleic acid (2.90 grams, 0.025 mol) and phenyl N-(2-hydroxyethyl)carbamate (9.06 grams, 0.05 mol) was heated in refluxing toluene (50 ml.)containing 1 wt. percent p-toluenesulfonic acid (0.115 gram) catalyst. An azeotrope of toluene and water was slowly removed while fresh toluene was added to maintain the volume. This procedure was continued for 7 hours until the liquid coming over was no longer cloudy. On cooling two layers formed. Toluene was stripped from the upper layer to give 6 grams of a viscous greenish-yellow liquid. The lower layer was dried in a vacum oven to give 2 grams of a viscous brown liquid containing small amounts of solid. The infrared spectra of products from both layers was similar. Moreover, these spectra were also in agreement with the spectrum of the reaction product of maleic anhydride and phenyl N-(2-hydroxyethyl)carbamate. Both product samples tended to very slowly solidify on standing.

*Analysis.*—Calculated for $C_{22}H_{22}N_2O_8$ (percent): C, 59.75; H, 5.01; N, 6.32. Found (percent): C, 56.75; H, 5.62; N, 5.98.

Thermal degradation of the product of the reaction of maleic anhydride and phenyl N-(2-hydroxyethyl) carbamate (D) The thermal degradation of 5 grams of the reaction product of maleic anhydride and phenyl N-(2-hydroxyethyl)carbamate was carried out between 150° and 170° C. at pressures between 2.0 and 5.0 mm. of Hg. At 150° C. a greenish-yellow liquid distillate was recovered. The infrared spectrum of this liquid (about 2.0 grams) was the same as that obtained when subjecting the previously stripped reaction product (of maleic anhydride and phenyl N-(2-hydroxyethyl)carbamate) to an infrared spectral analysis. The distillate was found to contain some maleic anhydride and phenol. but it consisted mainly of an unidentified nitrogen-containing compound(s). As the degradation temperature was increased to about 167° C., a brownish liquid which solidified in the receiver distilled over. This material (about 0.75 gram) was shown to be phenol. At about 170° C. after a short time no further distillate was obtained and the degradation was stopped. After cooling a white solid which had collected around the top of the flask and the neck of the condenser was recovered. This solid (about 0.25 gram) was conclusively shown to be oxazolidinone by means of its M.P. 88°–89° C., mixed melting point with known oxazolidinone, and comparison of its infrared spectrum with that of the authenticated oxazolidinone. The degradation residue (about 0.7 gram) was a clear brown polymeric material which did not melt, but decomposed about 270° C. Its infrared spectrum was not well defined but, in general, was similar to that of the starting material. It should be noted that during the course of the degradation experiment, several samples of material in the degradaion vessel were withdrawn and subjected to infrared spectral analysis. No evidence of the isocyanato band at $4.4\mu$ was observed in any of the infrared spectra.

EXAMPLE 25

Thermal degradation of bis[2-(phenoxyformamido)ethyl]fumarate

Thermal degradation studies of bis[2-(phenoxyformamido)ethyl] fumarate were conducted to ascertain whether free FDI could be isolated therefrom. The degradation experiments were carried out under a nitrogen atmosphere at a pressure of about 0.2 mm. of Hg. The temperature was gradually raised until degradation commenced, the temeprature then being held steady.

(A) In run 1, the degradation was carried out at 169°–175° C. over a 2 hour period, the degradation being fairly rapid, and a considerable amount of phenol distillate being obtained. The residue was a brittle, brown polymeric material which slowly softened above 200° C. and did not melt below 300° C.

(B) In a second degradation experiment, the temperature was held at 159°–162° C. where the degradation was slow and little carbon dioxide was evolved. The residue from the degradation was a hard, glassy, reddish-brown solid whish was sticky under the surface. This also showed an isocyanate peak at $4.4\mu$, but a good spectrum could not be obtained. This residue slowly softened above 200° C. and did not melt below 300° C.

(C) A third degradation of bis[2-(phenoxyformamido)ethyl] fumarate was carried out at 155°–160° C. At this temperature range degradation was extremely slow with only 0.7 gram of phenol being obtained after 5 hours. Practically no $CO_2$ (0.001 gram) was evolved during this period. The residue was a white sticky solid which partially softened and melted above 200° C. but which then solidified again to a brown polymeric mass.

Attempts were made to extract FDI from the degradation residues by heating said residues in solvents such as ether, carbon tetrachloride, and acetone. However, the only thing that could be extracted from any of the residues was some unreacted bis[2-(phenoxyformamido)ethyl] fumarate.

EXAMPLE 26

Preparation of bis[2-(phenoxyformamido)ethyl] succinate (A) Phenol (9.4 grams, 0.1 mol) was dissolved in benzene (50 ml.) and a catalyst mixture of 2 drops dibutyltin dilaurate of 0.01 gram of DABCO added. Bis(2-isocyanatoethyl) succinate, 12.81 grams, 0.05 mol (which can be prepared by the reaction of 2 mols of ethanolamine hydrochloride and one mol of succinoyl chloride, followed by phosgenation of the resulting bis(2-aminoethyl) succinate dihydrochloride, was added dropwise over 0.5 hour and the resulting mixture heated to reflux). After refluxing for an additional 2 hours, no diisocyanate remained. On cooling the yellow solution, no precipitate formed. After stripping the benzene from the resulting reaction product mixture (and then washing with ethyl ether), there was obtained 22 grams of a white solid which had a melting point of 119°–121° C. After recrystallization from ethanol, there was obtained 20 grams of bis[2-(phenoxyformamido)ethyl] succinate, a finely crystalline white solid, M.P. 120°–121° C. The infrared spectrum was in agreement with the assigned structure.

Thermal degradation of bis[2-(phenoxyformamido) ethyl] succinate (B) The thermal degradation of 5 grams of bis[2-(phenoxyformamido)ethyl] succinate was carried out at a temperature of about 160° C. at a pressure below 5 mm. of Hg. At 160° C. small amounts of phenol appeared in the distillate. A total of 0.95 gram of phenol was collected. A very small amount (0.005 gram) of carbon dioxide was also collected overhead in the distillation. After about 2 hours, no further phenol appeared in the distillate and the heating was discontinued. The residue was a clear, slightly yellowish polymeric solid which softened and melted at about 50° C. Its infrared spectrum showed the presence of an isocyanate band at $4.4\mu$, but it showed several other peaks not present in bis(2-isocyanatoethyl) succinate. Attempts to isolate this diisocyanate from this residue by extraction with ethyl ether were unsuccessful.

The thermal degradation studies in the preceding examples were carried out in a 50 milliliter pyrolysis flask immersed in a temperature controlled bath. The flask was connected to a small condenser which led to a Dry Ice-acetone cold finger which retained any volatile distillate, the distillate dropping down into a calibrated receiver. Carbon dioxide evolved passed on up through the cold finger and was absorbed in Nesbit tubes filled with Ascarite. Two Nesbit tubes were used it being possible to switch from one to the other so that the carbon dioxide evolved could be weighed at intervals. The pyrolysis train was completed with a Dry Ice-acetone trap and a flow-meter to measure the rate of flow of dry nitrogen (shown pure by its mass spectra) which was passed continuously through the system during degradation. Once degradation commenced the carbon dioxide evolved was weighed and the distillate measured at frequent intervals. Degradations were continued until carbon dioxide evolution ceased.

The distillates were identified as far as possible from their gas chromatograms and infrared spectra. Attempted identification of the residues was made from their infrared spectra, melting points, and solubilities in various solvents. All samples were weighed, their percentages determined and the total recovery calculated. Recoveries were generally more than 95%. In some cases more than 100% material was recovered but this was due to the residue bringing away small pieces of glass from the inside of the flask when the residues were recovered.

EXAMPLE 27

Polymerization of bis(2-isocyanatoethyl) fumarate (A) Bis(2-isocyanatoethyl) fumarate (127 grams, 0.5 mol) was added dropwise to a refluxing solution of benzoyl peroxide (12.9 grams) in carbon tetrachloride (308 grams, 2 mol). The mixture was refluxed with stirring under nitrogen for a total of 6 hours. After about 0.5 hour the solution gradually began to turn yellow and this color deepened during the course of the reaction. After about 1 hour the solution also became cloudy and gradually a second phase appeared. Carbon dioxide was evolved and was collected in Nesbit tubes containing Ascarite. Upon cooling at the end of the reaction period, an orange-colored, very viscous upper layer separated from the bulk of the carbon tetrachloride solution. This upper layer was recovered (crude yield 163 grams) and passed through a turbafilm evaporator at 142° C.. to remove carbon tetrachloride and unreacted bis(2-isocyanatoethyl) fumarate therefrom. There were obtained 101.5 grams of poly[bis(2-isocyanatoethyl) fumarate] as an orange-colored viscous material. This material represented 80 percent of the theoretical yield and had a molecular weight of 2411 and isocyanate equivalent of 128.6. The theoretical isocyanate equivalent was 127.1. The infrared spectrum was consistent with the assigned structure.

(B) In an analogous manner as above, when bis[(2-isocyanato-1-methyl)ethyl] fumarate is employed in lieu of bis(2-isocyanatoethyl) fumarate, there can be obtained poly[bis(2-isocyanato-1-methylethyl) fumarate], a polymeric product ranging from a very viscous liquid to a waxy solid.

EXAMPLE 28

Polymerization of bis(2-isocyanatoethyl) fumarate (A) Bis(2-isocyanatoethyl) fumarate (127 grams, 0.5 mol) was added dropwise with stirring under nitrogen to a refluxing solution of benzoyl peroxide (25.8 grams, 20 percent by weight of the diisocyanate) in carbon tetrachloride (308 grams, 2 mols). The mixture was refluxed at 79° C. for a total of 7 hours. Carbon dioxide was evolved and was collected in Nesbit tubes containing Ascarite. After about 1 hour the solution began to turn yellow and this color deepened during the course of the reaction. Also at the end of this time the solution became cloudy and gradually a second phase appeared. On cooling and standing an upper phase separated from the bulk of the carbon tetrachloride solution. This was separated to give 170 grams of crude product. Carbon tetrachloride was removed from this material on a roto-evaporator until the liquid became clear. There were obtained 127 grams of poly[bis(2-isocyanatoethyl) fumarate], clear orange-colored viscous liquid having a molecular weight of 1654±3% and an isocyanate equivalent 136.8. The infrared spectrum was consistent with the assigned structure.

(B) In an analogous manner as above, when bis(4-isocyanato-n-butyl) fumarate is employed in lieu of bis(2-isocyanatoethyl) fumarate, there is obtained solid poly[bis(4-isocyanato-n-butyl) fumarate].

EXAMPLE 29

Polymerization of bis(2-isocyanatoethyl) fumarate

Bis(2-isocyanatoethyl) fumarate (70 grams, 0.275 mol) benzoyl peroxide (7 grams, 10 percent by weight of the diisocyanate) and carbon tetrachloride (700 grams, 4.55 mols) were charged to a glass-lined Adkins stainless steel rocker bomb under nitrogen. The mixture was heated at 100° C. for 5 hours, a pressure of 50 pounds per square inch being developed. On opening the bomb two layers were found to have been formed. The orange-colored viscous upper layer was separated, and carbon tetrachloride removed from it on a roto-evaporator at 60° C. for 6 hours. At the end of this period 114 grams of poly[bis(2-isocyanatoethyl) fumarate] was obtained as a clear orange-colored viscous liquid. This material represented 90 percent of the theoretical value and had a molecular weight of 2080, and an isocyanate equivalent of 142.2. The infrared spectrum was consistent with the assigned structure.

EXAMPLE 30

Copolymer of ethylene and bis(2-isocyanatoethyl) fumarate

A mixture of 98 grams of ethylene, 2 grams of bis(2-isocyanatoethyl) fumarate, 850 grams of benzene and 0.5 gram of di-tertiary-butyl perphthalate was heated in a dried tube for 0.416 minute at 160° C. and at a pressure of 15,000 pounds per square inch. A total of 50 grams of the copolymer were recovered which represented a conversion of 21.3 percent. The copolymer was insoluble in methylcyclohexane (0.4 gram of copolymer in 100 milliliters at 80° C.); had a flow rate as measured at 190° C. and 205 pounds per square inch of 0.34 decigrams per minute; a density of 0.9245 gram per milliliter; a stiffness modulus at room temperature of 15,452 pounds per square inch; a tensile strength of 652 pounds per square inch; an elongation of 528 percent; a characteristic isocyanate absorption of $4.4\mu$ by infrared analysis; a nitrogen content of 0.355 percent; and a comonomer content of 3.2 percent.

EXAMPLE 31

Copolymer of ethylene and bis(2-isocyanatoethyl) fumarate (A) A mixture of 95 grams of ethylene, 5 grams of bis-(2-isocyanatoethyl) fumarate, 850 grams of benzene and 0.5 gram of di-tertiary-butyl perphthalate was heated in a dried tube for 0.517 minute at 160° C. and at a pressure of 15,000 pounds per square inch. A total of 60 grams of the copolymer were recovered which represented a conversion of 21.1 percent. The copolymer was insoluble in methylcyclohexane (0.4 gram of copolymer in 100 milliliters at 80° C.); had no flow rate as measured at 190° C. and 205 pounds per square inch; and a density of 0.9279 gram per milliliter; a stiffness modulus at room temperature of 35,278 pounds per square inch; a tensile strength of 1739 pounds per square inch; an elongation of 201 percent; a characteristic isocyanate absorption at $4.4\mu$ by infrared analysis; a nitrogen content of 1.13 percent; and a comonomer content of 10.25 percent.

(B) In a manner analogous as above, when bis(2-isocyanato-1-methylethyl) fumarate is employed in lieu of bis(2-isocyanatoethyl) fumarate, there is obtained a solid copolymer of ethylene and bis(2-isocyanato-1-methylethyl) fumarate.

EXAMPLE 32

Copolymer of butadiene and bis(2-isocyanatoethyl) fumarate

A mixture of 7 grams butadiene, 3 grams bis(2-isocyanatoethyl) fumarate, and 0.1 gram azo-bis-isobutyronitrile was heated in a dried tube for a period of 72 hours at 50° C. The resultant copolymer which was isolated from the final mixture was found to possess the characteristic isocyanate absorption band at $4.4\mu$.

EXAMPLE 33

Copolymer of acrylonitrile and bis(2-isocyanatoethyl) fumarate

A cappable test tube of approximately 35 millilters capacity was flushed with nitrogen and charged with 7.0 grams of anhydrous acrylonitrile, 3.0 grams of bis(2-isocyanatoethyl) fumarate, 10 milliliters of anhydrous toluene, and 0.01 gram of azo-bis-isobutyronitrile. Precaution was taken to eliminate all trace of moisture contamination by filling and subsequenty capping the tubes inside a so-called dry box. With continuous rocking the tubes were maintained at 50° C. for a period of 2.4 hours. The resulting polymer was isolated from solution by precipitation in heptane and subsequently dried at 70° C. for 16 hours. There was obtained six grams of polymer. The reduced viscosity value was 0.17 as measured at a concentration of 0.2 gram of polymer in 100 milliliters of dimethylformamide at 30° C. The infrared spectrum had a maximum at 4.4µ which is characteristic isocyanate absorption wave length. A solution containing 0.2 gram of bis(2-isocyanatoethyl) fumarate in 100 ml. of dimethyl formamide had a reduced viscosity of .02 at 30° C.

EXAMPLE 34

Copolymer of ethyl acrylate and bis(2-isocyanatoethyl) fumarate (A) The same general procedure was used as described in the Example 33. A viscous toluene solution of bis(2-isocyanatoethyl) fumarate-ethyl acrylate copolymer was prepared from an initial charge of 8.0 grams of ethyl acrylate, 2.0 grams of bis(2-isocyanatoethyl) fumarate, and 5.0 milliliters of toluene. 6.1 grams of dried polymer was obtained which had the characteristic isocyanate absorption at 4.4µ.

(B) In an analogous manner as above, when bis(2-isocyanato-1-methylethyl) fumarate is used in lieu of bis(2-isocyanatoethyl) fumarate, there is obtained a solid copolymer.

EXAMPLE 35

Copolymer of vinyl chloride and bis(2-isocyanatoethyl) fumarate (A) A mixture of 28 grams of vinyl chloride, 7.0 grams of bis(2-isocyanatoethyl) fumarate, 15 grams of benzene, and 0.35 gram of isopropyl percarbonate was heated in a capped tube for a period of 6 hours at 40° C. The resulting white polymer which was isolated in 41 percent conversion as described in Example 33 was found by analysis to contain 58 percent vinyl chloride.

(B) In an analogous manner as above, when bis(2-isocyanatoethyl) itaconate is employed in lieu of bis(2-isocyanatoethyl) fumarate, there is obtained a solid copolymer.

EXAMPLE 36

Copolymer of styrene and bis(2-isocyanatoethyl) fumarate (A) A copolymer was obtained in 95 percent conversion on heating a mixture of 95 grams styrene, 5 grams bis(2-isocyanatoethyl) fumarate, 0.5 gram di-t-butyl peroxide, and 50 grams toluene at about 120° C. for a period of 12 hours at atmospheric pressure. The resulting toluene solution had a viscosity of 1340 centipoises at 25° C. at 6 r.p.m. using a Brookfield Viscometer and a reduced viscosity of 0.34 as determined at a concentration of 0.2 gram of polymer in 100 milliliters of toluene at 26° C. The polymer was found by infrared analysis to contain the typical isocyanate absorption band at 4.4µ.

(B) In a manner analogous as above, when bis(3-isocyanato-n-propyl) glutaconate is employed in lieu of bis(2-isocyanatoethyl) fumarate, there is obtained a solid copolymer.

EXAMPLE 37

Terpolymer of ethyl acrylate, acrylonitrile, and bis(2-isocyanatoethyl) fumarate A mixture of 70 grams of ethyl acrylate, 20 grams of acrylonitrile, 10 grams of bis(2-isocyanatoethyl) fumarate, 1.4 grams of cumene hydroperoxide, and 25 grams each of xylene and Solv 150, were heated for 6 hours at 115–123° C. The weight percent polymer in the resulting reaction product medium was 48.7. The conversion was 95 percent. The solid polymer obtained was of light yellow color.

EXAMPLE 38

Terpolymer of styrene, 2-ethylhexyl acrylate, and bis(2-isocyanatoethyl) fumarate A mixture of 70 grams of styrene, 25 grams of 2-ethylhexyl acrylate, 5 grams of bis(2-isocyanatoethyl) fumarate, 0.5 gram of di-tertiary-butyl diperphthalate, and 50 grams of toluene, were heated for 10 hours at 100°–121° C. The weight percent polymer in the resulting reaction product medium was 49.3. The conversion was 95 percent. The solid polymer obtained was colorless, had a viscosity in centipoises of 2920, as determined on a Brookfield Viscometer at 25°–30° C. at 6 revolutions per minute and a reduced viscosity of 0.366 as determined at a concentration of 0.2 gram of polymer in 100 milliliters of toluene at 26° C.

EXAMPLE 39

Terpolymer of styrene, ethylhexyl acrylate, and bis(2-isocyanatoethyl) fumarate

A mixture of 45 grams of styrene, 50 grams of ethylhexyl acrylate, 5 grams of bis(2-isocyanatoethyl) fumarate, 0.7 gram of di-tertiary-butyl diperphthalate, and 50 grams of toluene, were heated for 17 hours at 115–120° C. The weight percent polymer in the resulting reaction product medium was 48.0. The conversion was 95 percent. The solid polymer obtained was colorless, and had a reduced viscosity of 0.283 as determined at a concentration of 0.2 gram of polymer in 100 milliliters of toluene at 26° C.

EXAMPLE 40

Terpolymer of styrene, ethyl acrylate, and bis(2-isocyanatoethyl) fumarate

A mixture of 40 grams of styrene, 45 grams of ethyl acrylate, 15 grams of bis(2-isocyanatoethyl) fumarate, 1.4 grams of cumene hydroperoxide, and 50 grams of toluene, were heated for 6 hours at 112–117° C. The weight percent polymer in the resulting reaction product medium was 47.5. The conversion was 95 percent. The solid polymer was of a very light yellow color.

EXAMPLE 41

Terpolymer of vinyl chloride, vinyl acetate, and bis(2-isocyanatoethyl) fumarate A mixture of 75 grams of vinyl chloride, 20 grams of vinyl acetate, 5 grams of bis(2-isocyanatoethyl) fumarate, 0.5 gram of acetyl peroxide, and 65 grams of acetone, were heated for 25 hours at 50° C. The weight percent polymer in the resulting reaction product medium was 60. The conversion was 60 percent. The solid polymer obtained was a very light yellow color, and had a reduced viscosity value of 0.29 as determined at a concentration of 0.2 gram of polymer in 100 milliliters of toluene at 26° C.

EXAMPLE 42

Terpolymer of butadiene, styrene, and bis(2-isocyanatoethyl) fumarate

A mixture of 70 grams of butadiene, 25 grams of styrene, 5 grams of bis(2-isocyanatoethyl) fumarate, 0.5 gram of isopropyl percarbonate, and 50 grams of toluene, were heated for 91 hours at 40° C. The weight percent polymer in the resulting reaction product medium was 6.6. The conversion was 13.2 percent. The solid polymer was colorless and had a reduced viscosity value of 0.13 as determined at a concentration of 0.2 gram of polymer in 100 milliliters of toluene at 26° C.

EXAMPLE 43

Terpolymer of butadiene, styrene, and bis(2-isocyanatoethyl) fumarate

A mixture of 70 grams of butadiene, 25 grams of styrene, 5 grams of bis(2-isocyanatoethyl) fumarate, 3.0 grams of lauroyl peroxide, and 33 grams of benzene, were heated for 60 hours at 70° C. The weight percent polymer in the resulting reaction product medium was 19.2. The conversion was 25.6 percent. The solid polymer obtained was colorless and had a reduced viscosity value of 0.16 as determined at a concentration of 0.2 gram in 100 milliliters of toluene at 26° C.

EXAMPLE 44

Quadrapolymer of styrene, ethyl acrylate, acrylonitrile, and bis(2-isocyanatoethyl) fumarate A mixture of 45 grams of styrene, 35 grams of ethyl acrylate, 10 grams of acrylonitrile, 10 grams of bis(2-isocyanatoethyl) fumarate, 1.4 grams of cumene hydroperoxide, and 25 grams each of xylene and Solv 150 were heated for 6 hours at 112–120° C. The weight percent polymer in the resulting reaction product medium was 50. The conversion to solid polymer was 95 percent.

EXAMPLE 45

A 20 weight percent solution of bis(2-isocyanatoethyl) fumarate in toluene which contained 0.5 weight percent azo-bis-isobutyronitrile was heated for 72 hours at about 50° C. At the end of this period of time solid poly[bis(2-isocyanatoethyl) fumarate] was isolated therefrom via filtration. The infrared spectrum of the polymer exhibited a maximum at 4.4$\mu$.

EXAMPLE 46

Bis(2-isocyanatoethyl) fumarate (6.35 grams; 0.05 equivalent) and Polyol A (11.55 grams; 0.05 equivalent) were mixed well and entrapped gases were removed by reducing the pressure. To this solution there was added a solution of styrene (8.95 grams; 33.3% of total weight) and benzoyl peroxide (0.054 gram; 0.2% total weight). This water white, very fluid solution was quite stable at room temperature in the absence of water. One drop of di-n-butyltin diacetate catalyst was added and the solution was immediately poured into previously prepared aluminum dishes, covered loosely and placed in a forced-circulation oven which was maintained at 100° C. The material was removed from the oven after 2 minutes, and was a transparent, slightly yellow-tinted, hard, casting. After standing 24 hours at room temperature, the casting had a Shore D hardness of 64 and an impact of 60 inch pounds, as tested on the Gardner Bump Tester.

EXAMPLE 47

Conditions were the same as in Example 46 supra, except styrene (6.54 grams; 26.8% total weight) was used. The resultant crosslinked, copolyvinyl polyurethane was transparent, slightly tinted, and hard. After 24 hours, the Shore D hardness was 70 and the impact resistance was 33 inch pounds as tsted on the Gardner Bump Tester.

EXAMPLE 48

Conditions were the same as in Example 46 supra, except styrene (13.4 grams; 42.9% total weight) and benzoyl peroxide (0.125 gram; 0.4% total weight) was used and the reaction time was 4 minutes. The resultant polymer was hard (Shore D 62), transparent and very slightly flexible. The material cracked at an impact of 40 inch pounds, but did not shatter or fly apart.

EXAMPLE 49

Conditions were the same as in Example 46 supra, except Polyol B (11.45 grams; .05 equivalent) was the hydroxyl compound used. The resultant polymer was transparent, yellow, and had a Shore D hardness of 80 and impact of 5 inch pounds.

EXAMPLE 50

Conditions were the same as in Example 46 supra, except Polyol C (7.31 grams; .05 equivalent) was used as the polyol. The polymer was transparent, slightly colored, and hard (Shore D 82). The impact resistance was 10 inch pounds when tested on the Gardner Bump Tester.

EXAMPLE 51

Conditions were the same as in Example 46 supra, except Polyol D (7.36 grams; 0.05 equivalent) was the polyol used. The resultant polymeric material was hard (Shore D=86) and opaque. The impact resistance was 12 inch pounds.

EXAMPLE 52

Polyol E (7.32 grams; 0.1 equivalent) was the polyol used under the same conditions as in Example 46. The polymer was hard (Shore D=83), slightly yellow and transparent. The impact resistance was 3 inch pounds.

EXAMPLE 53

A mixture of Polyol A (11.55 grams; .05 equivalent and FDI (6.35 grams; .05 equivalent) was freed of entrapped gases and a solution of benzoyl peroxide (0.27 gram; 1.0% total weight) in methyl methacrylate (8.95 grams; 33.3% total weight) was added and mixed well. The resultant solution was very fluid. Two drops of di-n-butyltin diacetate were added and the solution immediately poured into previously prepared aluminum dishes, covered loosely and placed in a forced-circulation oven for 2 minutes at 100° C. The material was transparent, flexible, and had a Shore A-2 hardness of 75. There was no odor of methyl methacrylate present.

EXAMPLE 54

Using the procedure set forth in Example 53 supra, various monomers were reacted with Polyol A and FDI to give poly(vinylurethanes). The data are set out in Table I below.

TABLE I

| Experiment: | Monomer | Grams | Percent total weight | Shore A-2 hardness | Description [1] |
|---|---|---|---|---|---|
| 1 | Divinyl pimelate | 8.95 | 33.3 | 82 | Hard, crumbly, yellow. |
| 2 | Ethyl acrylate | 8.95 | 33.3 | 81 | Flexible, yellow. |
| 3 | Ethyl acrylate<br>Plus styrene | 4.5<br>4.5 | 33.3 | 85 | Flexible, tough, faint tint. |
| 4 | Acrylonitrile | 8.95 | 33.3 | | Flexible, tough, dark. |
| 5 | Ethyl acrylate<br>Plus acrylonitrile<br>Plus styrene | 2.50<br>2.00<br>4.50 | 33.3 | 85 | Yellow, flexible, tough. |
| 6 | Styrene<br>Plus methyl methacrylate.<br>Plus acrylonitrile | 4.50<br>2.50<br>2.00 | 33.3 | 91 | Hard, slightly colored. |
| 7 | Triallyl cyanurate | 8.95 | 33.3 | 63 | Flexible, no odor. Impact= 8 inch pounds. |

[1] Examination conducted at about 23° C.

EXAMPLE 55

FDI (6.35 grams; 0.05 equivalent) and Polyol A (11.55 grams; 0.05 equivalent) were mixed well and trapped gases removed by evacuation. A solution of lauroyl peroxide (0.27 gram; 1.0%) in styrene (8.95 grams; 33.3%) was added and mixed well. 4 drops of dibutyltin dilaurate was added and the material immediately poured into a previously prepared aluminum dish, covered loosely and placed in a forced-circulation oven for 2 minutes at 100° C. The resultant polymer was clear, transparent, hard (Shore D=64), and had an impact resistance of 22 inch pounds. There was no odor of the monomer.

EXAMPLE 56

FDI (6.35 grams; .05 equivalent), and Polyol A (11.55 grams; .05 equivalent) were mixed and trapped vapors were removed by evacuation. A solution of benzoyl peroxide (0.196 gram; 0.07% total weight) in styrene (8.9 grams; 33.3% of total weight) was added and stirred well. Triethylamine (5 drops) was added and the material poured into an aluminum dish, covered loosely and placed in a 100° C. oven for 14 minutes. The resultant polymer was transparent and flexible. Shore D hardness=55.

EXAMPLE 57

The conditions were the same as for Example 56 supra, except that trimethylolpropane (1.1 grams; 0.025 equivalent) and 4,4' - methylene - bis - (2 - chloroaniline) (3.3 grams; 0.025 equivalent) was substituted for Polyol A. No condensation catalyst was used, however, the MOCA was effective as a catalyst, since the reaction time at 100° C. was only 2 minutes. The dark polymer was hard (Shore D=82) and had an impact of 8 inch pounds on the Gardner Bump Tester.

EXAMPLE 58

The conditions were the same as for Example 56 supra, except that no condensation catalyst was used and cobalt octoate (4 drops) was added to initiate the peroxide-catalyzed polymerization. The reaction took place smoothly in 2 minutes at 100° C. and a polymer was formed which had no odor, and was hard (Shore D=70). The impact resistance was 18 inch pounds.

EXAMPLE 59

FDI (6.35 grams; .05 equivalent), Polyol A (17.32 grams; .075 equivalent), styrene (6.55 grams; 21.7% total weight) and benzoyl peroxide (0.196 gram; 0.65% total weight) were mixed as in Example 56. Dibutyltin dilaurate (4 drops) was added, the material poured into an aluminum dish and placed in a 100° C. oven for 2 minutes. The resultant polymer was transparent, flexible, and slightly crumbly. Shore A-2 hardness=80.

EXAMPLE 60

FDI (12.7 grams; .1 equivalent), Polyol F (21.4 grams; .1 equivalent), styrene (17.0 grams; 33.3% total weight) and benzoyl peroxide (0.5 gram; 1.0% total weight) were mixed as described in Example 56. The solution was poured into an aluminum mold and placed in an oven which was maintained at 100° C. After 3 hours, the mold was removed and allowed to cool. The resultant polymer is colorless, transparent and flexible.

EXAMPLE 61

Polyol A (11.55 grams; .05 equivalent), FDI (6.35 grams; .05 equivalent), styrene (8.95 grams; 33.3% total weight) and benzoyl peroxide (0.54 gram; 0.2% total weight) were mixed as in Example 56. This solution was water white and very fluid. It was sealed in a glass bottle and allowed to stand for 24 hours. At this time the solution was still fluid, and on the addition of stannous octanoate catalyst would react to form a polymer as described in the preceding examples.

EXAMPLE 62

A prepolymer of FDI and Polyol G was prepared which had an equivalent weight of 1277. 30 grams (.024 equivalent) of this prepolymer and 3.43 grams (0.24 equivalent) of Polyol H were mixed and trapped air and gasses were removed by evacuation. t-Butyl perbenzoate (0.5 gram; 1.3% total weight) was dissolved in divinyl pimelate (3.34 grams; 0.9% total weight) and the reagents were mixed well. The resulting solution was poured into an aluminum mold and placed in an oven held at 85° C. for 3 hours. The material remained slightly tacky, but had elastic properties.

EXAMPLE 63

Bis[2-(n-butoxyformamido)ethyl] fumarate

To a 500 milliliter glass kettle equipped with a dropping funnel, stirrer, and reflux condenser there were charged 111 grams of n-butanol and 3 drops of dibutyltin dilaurate. 127 grams of bis(2-isocyanatoethyl) fumarate was added dropwise over a period of about 30 minutes, during which time the kettle temperature rose to 70° C. and the contents solidified. The crude white solid (M.P. 104–107.5° C.) was collected by filtration, dried in vacuo and recrystallized from 60–40 isopropanol-water to afford 177 grams (88.0 percent) of fine white needles melting at 106°–107.5° C.

$C_{18}H_{32}N_4O_6$ requires (percent): C, 54.00; H, 8.00; N, 6.97. Found (percent): C, 54.26; H, 7.66; N, 7.13.

EXAMPLE 64

Bis[2-(n-butylureylene)ethyl] fumarate

To a solution of 80 grams of n-butylamine in 350 milliliters of diethyl ether there was added over a period of 50 minutes 127 grams of bis(2-isocyanatoethyl) fumarate. The temperature rose rapidly to the boiling point of ether and a white solid formed almost immediately. Following completion of the addition, the charge was stirred for an additional hour. The crude product was collected by filtration and dried in vacuo to give 196 grams (98.0 percent) of a powdery white solid, M.P. 149–152° C. Two recrystallizations from 66 percent aqueous isopropanol raised the melting point to a constant value of 157–158° C.

$C_{18}H_{32}N_4O_6$ reqires (percent): C, 54.00; H, 8.00; N, 14.00. Found (percent): C, 53.63; H, 8.10; N, 14.01

EXAMPLE 65

Bis[2-(ethylthioformamido)ethyl] fumarate

To a solution of 15.5 grams of ethyl mercaptan and 3 drops of triethylamine in 150 milliliters of diethyl ether there was added dropwise over a period of 20 minutes 25.4 grams of bis(2-isocyanatoethyl) fumarate. The heat of reaction caused the solvent to reflux and a white solid deposited itself from the solution. The yield of crude material, M.P. 111°–113.5° C. was 27 grams. Two recrystallizations from 50 percent aqueous isopropanol raised the melting point to a constant value of 114–115.5° C.

$C_{14}H_{22}N_2O_6S_2$ requires (percent): C, 44.43; H, 5.82; N, 7.41; S, 16.93. Found (percent): C, 44.84; H, 5.65; N, 7.35; S, 16.63.

EXAMPLE 66

Bis[2-(allyloxyformamido)ethyl] fumarate

To a mixture of 13 grams of allyl alcohol and 2 drops of dibutyltin dilaurate in 150 milliliters of benzene there was added dropwise at wet ice temperatures a solution of 25.4 grams of bis(2-isocyanatoethyl) fumarate in 100 milliliters of benzene. After the addition was complete, the mixture was held at 35°–40° C. for two hours. On standing overnight, a white crystalline solid separated (27 grams, 72.9 percent, M.P. 73°–76° C.). Recrystallization from 60–40 isopropanol-water mixture afforded glistening white plates, M.P. 75.5–76° C.

$C_{16}H_{22}N_2O_8$ requires (percent): C, 51.89; H, 5.95; N, 7.57. Found (percent): C, 51.76; H, 6.04; N, 7.5.

EXAMPLE 67

Bis[2-(propargyloxyformamido)ethyl] fumarate

To a mixture of 13 grams of propargyl alcohol and 2 drops of dibutyltin dilaurate in 150 milliliters of n-heptane there was added dropwise at ambient temperatures a solution of 5.4 grams of bis(2-isocyanatoethyl) fumarate in 100 milliliters of benzene. The charge was stirred for an additional 30 minutes and the solid collected by filtration. The yield of crude material, M.P. 128–131° C., was 35 grams, or 95.6 percent. Recrystallization from aqueous isopropanol raised the melting point to 131–132° C.

$C_{16}H_{18}N_2O_8$ requires (percent): C, 52.46; H, 4.94; N, 7.65. Found (percent): C, 52.53; H, 5.09; N, 7.65.

EXAMPLE 68

Bis[2-(phenoxyformamido)ethyl] fumarate

To a mixture of 17 grams of phenol and two drops of dibutyltin dilaurate in 100 milliliters of n-heptane there was added dropwise at ambient temperatures a solution of 25.4 grams of bis(2-isocyanatoethyl) fumarate in 100 milliliters of benzene. The reaction was exothermic from the start, a white solid beginning to separate almost immediately. After completion of the feed period the suspension was stirred for an additional 30 minutes, filtered, and dried. The yield of crude product was 90.5 percent, melting from 100°–107° C. One recrystallization from ethyl acetate and one from chloroform-isopropyl ether mixture raised the melting point to a constant figure of 113°–114° C.

$C_{22}H_{22}H_2O_8$ requires (percent): C, 59.72; H, 4.98; N, 6.33. Found (percent): C, 59.82; H, 5.00; N, 6.31.

EXAMPLE 69

Bis[2-(phenylureylene)ethyl] fumarate

To a solution of 20 grams of aniline in 200 milliliters of ether there was added dropwise at ambient temperatures 25.4 grams of bis(2-isocyanatoethyl) fumarate. The temperature rose rapidly to the reflux temperature of ether and a buff-colored solid separated from the solution. After completion of the feed period and an additional 15 minutes of stirring, the charge was filtered and the solid product dried to afford 41 grams (97.6 percent) of crude product melting at 183°–185° C. Recrystallization from aqueous dimethylformamide raised the melting point to 184°–184.5° C.

$C_{22}H_{24}N_4O_6$ requires (percent): C, 60.00; H, 5.45; N, 12.73. Found (percent): C, 60.01; H, 5.47; N, 12.79.

EXAMPLE 70

Preparation of bis{2-[3-(6-aminohexyl)-ureido]ethyl} fumarate

Bis(2-isocyanatoethyl) fumarate (25.4 grams; 0.1 mol) was dissolved in benzene (40 grams) and fed to a solution of 1,6-hexanediamine (23.2 grams; 0.2 mol) and benzene (160 grams) with the temperature maintained at 35°–40° C. The mixture was allowed to stir for one hour after the addition. The white solid was filtered, washed with anhydrous ether, and dried. M.P. ° C.=239. The infra-red spectrum is in agreement with that expected for the desired compound with maxima at 2.98µ, NH plus $NH_2$; 5.8µ, ester C=O; 6.12µ, urea C=O; 6.4µ, urea NH; 8.0 and 8.6µ, ester C—O; 12.9µ, fumarate.

*Analysis.*—Calculated for $C_{22}H_{42}N_4O_6$ (percent): N, 17.25. Found (percent): N, 16.59.

EXAMPLE 71

Preparation of bis[2-(2-hydroxyethyl-thiolcarbamido)ethyl] fumarate

Bis(2-isocyanatoethyl) fumarate (25.4 grams; 0.1 mol) and 2-mercaptoethanol (15.6 grams; 0.2 mol) were mixed and two drops of di-n-butyltin diacetate were added. The reaction began immediately and the temperature rose to about 75° C. The resulting product was very gummy and viscous and formed a white, har dsolid on standing. M.P. ° C.=90–92. Infra-red analysis is consistent with the proposed structure with maxima at: 3.05µ, NH and OH, 5.8µ, ester C=O; 6.03µ, C=C;

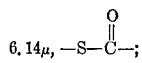

9.6 and 9.88µ, C—OH; 12.85µ, fumarate.
*Analysis.*—Calc'd for $C_{14}H_{22}N_2O_8S_2$ (percent): N, 6.83. Found (percent): N, 6.93.

EXAMPLE 72

Preparation of bis[2-(4-hydroxy-2-butenoxy-formamido)ethyl] fumarate

Bis(2-isocyanatoethyl) fumarate (25.4 grams; 0.1 mol) and 2-butene-1, 4-diol (17.6 grams; 0.2 mol) were mixed and two drops of di-n-butyltin diacetate were added. The temperature rose immediately to 130° C. and stirring was continued until the reaction had subsided. The resultant product was a viscous liquid. Infra-red analysis was in agreement with the proposed structure with maxima at: 2.98µ, NH plus OH; 3.27µ =CH; 5.85µ, C=O of fumarate and carbamate; 6.09µ, C=C; 9.7µ, C—OH; 12.87µ, fumarate.

*Analysis.*—Calc'd for $C_{18}H_{26}N_2O_{10}$ (percent): N, 6.56. Found (percent): N, 6.46.

EXAMPLE 73

Preparation of bis{2-[poly(oxypropylene)-oxyformamido]ethyl} fumarate

Bis(2-isocyanatoethyl) fumarate (3.3 grams; 0.013 mol) and Polyol J (25.6 grams; 0.025 mol) were mixed and two drops of di-n-butyltin diacetate were added. The reaction was slightly exothermic and stirring was continued until the reaction subsided. The material was a water-white, viscous, liquid. The infra-red spectrum was in agreement with that expected for the desired compound with maxima at: 2.9µ, OH; 2.96µ, NH; 5.8µ, C=O of fumarate and carbamate; 6.08µ; C=C; 8.0µ, C—O; and 9.1µ, ether C—O—C.

EXAMPLE 74

Bis{<2,2,3,4,5,6-pentakis[poly(oxypropylene)oxy]hexyl-poly(oxypropylene)oxyformamido}ethyl> fumarate Bis(2-isocyanatoethyl) fumarate (12.7 grams; 0.1 equivalent and Polyol D (22.0 grams; 0.2 equivalent) were mixed and warmed to effect solution. Two drops of di-n-butyltin diacetate were added. Stirring was continued until the reaction had subsided. The material was a tough, rubbery product. The infra-red spectrum was in agreement with that expected for the desired compound with maxima at: 2.93µ, OH and NH; 5.8µ, carbamate C=O; 6.08µ, C=C; 6.55µ, carbamate NH; 8.0µ, carbamate C—O; 9.6µ, alcohol C—OH; 12.9µ, fumarate.

EXAMPLE 75

Preparation of bis[2-(1-piperazinoformamido)ethyl] fumarate

Bis(2-isocyanatoethyl) fumarate (25.4 grams; 0.1 mol) was dissolved in benzene (40 grams) and fed to a solution of piperazine (17.2 grams; 0.2 mol) in benzene (160 grams) over a one hour period at a temperature of 35–40° C. White solid began to form immediately and the reaction was exothermic. The solid was removed by filtration and washed with anhydrous ethyl ether and dried. M.P. ° C.=220. Infrared spectrum is in agreement with that expected for the proposed structure with maxima at: 3.01µ, NH; 5.83µ, ester C=O; 6.13µ, secondary amide C=O; 6.5µ, secondary amide NH; 8.0 and 8.65µ, ester C—O; 13.0µ, fumarate.

EXAMPLE 76

Polyol K (13.0 grams; 0.15 equivalent) and bis(2-isocyanatoethyl) fumarate (19.0 grams; 0.15 equivalent) were mixed and heated to effect solubility. The solution was degassed under reduced pressure and about 20 grams of the mixture was poured into a previously cleaned and dried aluminum dish. The dish was covered and placed in a 75° C. oven for 3 hours. The resultant plaque was hard, slightly hazy, and colorless. After standing for 24 hours at room temperature, the material had a hardness of 80-Shore D and impact strength of 100 inch-pounds as measured by the Gardner Bump Tester.

EXAMPLE 77

A mixture of polypropylene glycol, mol wt. 425 (22 grams; 0.1 equivalent), and $BF_3$-MEA catalyst (0.2 gram) were warmed until the catalyst was dissolved. 3,4-epoxy-6-methylcyclohexylmethyl 3,4-epoxy-6-methylcyclohexanecarboxylate (15.6 grams; 0.1 equivalent) was added and mixed in well. FDI (12.7 grams; 0.1 equivalent) was added and stirred into solution with warming. The mixture was degassed under reduced pressure and 20 grams of the mixture was poured into a previously cleaned and dried aluminum dish. The dish was covered loosely and placed in a 75° oven for 3 hours. The resultant polymer was clear, transparent, soft and flexible, with a Shore "A–2" hardness of 55.

EXAMPLE 78

2,2′ - [poly(oxypropylene)oxydiformamido]diethyl bis (2-isocyanatoethyl fumarate) [a] (40 grams; 0.08 equivalent) and MOCA (8.29 grams; 0.062 equivalent) [$NCO:NH_2$ ratio=1.3:1.0] were mixed by adding molten MOCA to the isocyanate. The mixture was subsequently degassed and poured into aluminum molds, covered loosely, and heated for 3 hours in a 95° oven. The resultant polymer is clear, hard, and has a glossy surface. The following properties were determined:

| | |
|---|---|
| Shore hardness (A–2) | 93 |
| Stiffness modulus, p.s.i. | 12,562 |
| Tensile strength, p.s.i. | 3,246 |
| Elongation, percent | 283 |

EXAMPLE 79

2,2′ - [Poly(oxypropylene)oxydiformamido]diethyl bis (2-isocyanatoethyl fumarate) [b] (40 grams; 0.08 equivalent) and Polyol H (11.84 grams; 0.08 equivalent) [NCO:OH=1:1] were mixed well with warming and the mixture degassed under reduced pressure. The degassed material was poured into aluminum molds and cured in a 95° oven for 3 hours. The resulting polymer was tough, flexible, and elastic. The following properties were determined:

| | |
|---|---|
| Shore hardness (A–2) | 67 |
| Stiffness modulus, p.s.i. | 667 |
| Tensile strength, p.s.i. | 1,521 |
| Elongation, percent | 338 |

EXAMPLE 80

In a manner similar to Example 79 supra, several polyurethanes were prepared. The data are set forth in Table II below.

[a] Prepared via the reaction of FDI (0.25 mol) and Polyol G (0.125 mol) in the absence of a solvent at 95° C. for a period of 4 hours. Equivalent weight=1260; theoretical equivalent weight=1266.5.
[b] Prepared via the reaction of FDI (0.25 mol) and Polyol G (0.125 mol) in the absence of a solvent at 95° C. for a period of 4 hours. Equivalent weight=1260; theoretical equivalent weight=1266.5.

EXAMPLE 81

Bis {2-[2-poly(oxypropylene)oxyformamido]ethyl} fumarate [c] (28.3 grams; 0.05 equivalent) and bis(2-isocyanatoethyl) fumarate (6.35 grams; 0.05 equivalent) were mixed well with warming and dissolved gases removed under reduced pressure. The material was poured into a previously cleansed and dried aluminum dish, covered loosely, and heated for 4 hours in an oven at 95° C. The resultant polyurethane product was a clear, colorless, very viscous liquid.

EXAMPLE 82

In a manner similar to Example 81, several polyurethanes were prepared. The data are set forth in Table III below.

TABLE III

| Experiment No. | Active H compound | Isocyanate | NCO/OH | Description |
|---|---|---|---|---|
| 1 | ([1]) | FDI; [2] TDI [2] | 1.0/1.0 | Sticky, pourable liquid. |
| 2 | ([3]) | FDI; [2] TDI [2] | 1.0/1.0 | Hard, colored. |
| 3 | ([3]) | FDI | 1.0/1.0 | Hard, transparent, clear. |

[1] Same as footnote ([c]) supra.
[2] 50 mole percent.
[3] Prepared by the reaction of FDI (1.0 equivalent) and Polyol K (2.0 equivalents) in the absence of a solvent at 85°–90° C. until free of NCO by infrared spectral analysis (3 hours).

EXAMPLE 83

Preparation of 2,2′-[poly(oxypropylene)oxydiformamido]-diethyl bis(2-isocyanatoethyl) fumarate A mixture of bis(2-isocyanatoethyl) fumarate (63.5 grams; 0.25 mol) and Polyol M (253 grams; 0.125 mol) were charged to a stirred reaction flask and heated to 95° C. while stirring rapidly. The material was held at this temperature for 4 hours at which time it was a thick, viscous liquid. Analysis for equivalent weight gave 1260. The theoretical equivalent weight is 1266.5. The infrared spectrum was in agreement with that expected for the subject compound with maxima at: $2.98\mu$, NH; $3.25\mu$=CH; $4.37\mu$, N=C=O; $5.8\mu$ C=O carbamate and fumarate; $6.08$ C=C, $6.55\mu$ NH carbamate; $7.3\mu$ $CH_3$; 7.76 and $8.67\mu$ C—O fumarate; $9.1\mu$ ether C—O—C.

EXAMPLE 84

Preparation of 2,2′-[poly(oxytetramethylene)oxydiformamido]ethyl bis(2-isocyanatoethyl fumarate)

A mixture of bis(2-isocyanatoethyl) fumarate (63.5 grams; 0.25 mol) and Polyol N (360 grams; 0.125 mol) were charged to a stirred reaction flask and heated at 95° C. for three hours. The material was very thick and viscous and on cooling to room temperature was a solid.

[c] Prepared by the reaction of FDI (0.013 mol) and Poylol G (0.025 mol) in the presence of di-n-butyltin diacetate. No NCO present in infrared spectrum.

TABLE II

| Experiment | Isocyanate | Active H compound | NCO/ active H | Hardness, Shore A–2 | Stiffness modulus, p.s.i. | Tensile, p.s.i. | Elongation, percent | Description of polymer |
|---|---|---|---|---|---|---|---|---|
| 1 | ([1]) | MOCA | 1.5/1.0 | 90 | 3,149 | 2,993 | 245 | High gloss, clear, flexible, elastic. |
| 2 | ([1]) | MOCA | 1.1/1.0 | 63 | 1,896 | 1,060 | 881 | Clear, straw color, very flexible. |
| 3 | ([1]) | Polyol H | 1.0/1.0 | 23 | | | | Tacky, clear, elastic. |
| 4 | ([2]) | MOCA | 1.1/1.0 | | 736 | 322 | 124 | Light brown, soft elastic. |
| 5 | ([1]) | Polyol K | 1.0/1.0 | | | | | Transparent, clear, flexible rubbery. |
| 6 | ([1]) | Polyol L | 1.0/1.0 | | | | | Clear, slghtly tinted, flexible. |
| 7 | ([3]) | Polyol H | 1.0/1.0 | | | | | Yellow, hard. |
| 8 | ([3]) | Polyol K | 1.0/1.0 | | | | | Clear, hard, transparent. |
| 9 | ([3]) | Polyol L | 1.0/1.0 | | | | | Clear, hard, slightly tinted. |

[1] Same as footnote ([a]) supra.
[2] Prepared via the reasion of FDI (0.32 mol) and Polyol N (0.16 mol) in the absence of a solvent at 75° C. for a period of 3 hours. Equivalent weight=1,575.
[3] Prepared via the reaction of FDI (2.0 mols) and Polyol K (1.0 mol). Equivalent weight=345.5; theoretical equivalent weight=344.1.

EXAMPLE 85

Preparation of 2,2'-(hexamethylenediureylene)diethyl bis(2-isocyanatoethyl fumarate)

A solution of 1,6-hexanediamine (5.8 grams; .05 mol) in 60 grams of benzene was fed slowly to a solution of bis(2-isocyanatoethyl) fumarate (25.4 grams; 0.1 mol) in 40 grams of benzene. A white solid precipitated from the solution immediately upon addition. The temperature was maintained at about 35° C. during the addition and the mixture was allowed to stir for an hour after the addition. The white solid was filtered and washed two times with anhydrous ether and dried. Infra-red spectrum is in agreement with the proposed structure, with maxima at: 2.98$\mu$, NH; 4.36$\mu$, NCO; 5.8$\mu$, C=O of fumarate; 7.75, 8.0, 8.65$\mu$, C—O; 12.9$\mu$, fumarate.

EXAMPLE 86

A mixture of bis(2-isocyanatoethyl) fumarate (25.4 grams; 0.2 equivalent) and Polyol P (11.65 grams; 0.1 equivalent) were heated in an Erlenmeyer flask until solution was effected. Two drops of di-n-butyltin diacetate were added and after about one minute the temperature rose sharply to about 75° C. The reaction mixture became very viscous and on cooling the material was a solid. The infrared spectrum is in agreement with the proposed structure with maxima at: 2.9$\mu$, NH; 4.36$\mu$, NCO; 5.8$\mu$, C=O; 6.08$\mu$, C=C; 8.0 and 8.65$\mu$, C—O; 19.9$\mu$, fumarate.

EXAMPLE 87

Preparation of 2,2'-(ethyleneoxythiodiformamido)diethyl bis(2-isocyanatoethyl fumarate)

A mixture of bis(2-isocyanatoethyl) fumarate (25.4 grams; 0.2 equivalent) and 2-mercaptoethanol (3.9 grams; 0.1 equivalent) was heated to effect solution and two drops of di-n-butyltin diacetate were added. The temperature immediately rose to 126° C. and stirring was continued until the reaction mixture was cooled. The material was a very thick, viscous liquid and possessed some adhesive properties. After standing for two days at room temperature the material became a solid. M.P. ° C.=85. Infrared spectrum is in agreement with the proposed structure with maxima at: 3.02$\mu$, NH; 3.25$\mu$, =CH; 4.37$\mu$, NCO; 5.83$\mu$, carbamate C=O; 6.04$\mu$, C=C; 6.5$\mu$, carbamate NH; 8.0 and 8.63$\mu$, C—O; 12.9$\mu$, fumarate.

*Analysis.*—Calculated for $C_{22}H_{26}N_4S$ (percent): N, 9.57. Found (percent): N, 9.56.

EXAMPLE 88

Preparation of 2,2'-(piperazin-1,4-ylenediformamido) diethyl bis(2-isocyanatoethyl fumarate)

A solution of piperazine (4.3 grams; 0.05 mol) in benzene (60 grams) was fed to a solution of bis(2-isocyanatoethyl) fumarate (25.4 grams; 0.1 mol) in benzene (40 grams) while the temperature was maintained at 35° C. Fine, white solid formed immediately upon addition of the piperazine. After an additional two hours stirring the material was filtered, washed with anhydrous ether and dried. Infra-red spectrum is in agreement with the proposed structure with maxima at: 2.96$\mu$, NH; 4.38$\mu$, NCO; 5.82$\mu$, C=O; 6.16$\mu$, secondary amide C=O; 7.75 and 8.0$\mu$, C—O; 12.9$\mu$, fumarate.

EXAMPLE 89

Preparation of 2,2'-[oxybuten-2-ylene)oxydiformamido] diethyl bis(2-isocyanatoethyl fumarate)

A mixture of bis(2-isocyanatoethyl) fumarate (25.4 grams; 0.1 mol) and 2-butene-1,4-diol (4.4 grams; 0.05 mol) was mixed and heated to effect solution. At a temperature of about 60° C., two drops of di-n-butyltin diacetate were added and the temperature rose rapidly to about 100° C. Stirring was continued until the reaction subsided. The resulting material was a clear, very viscous liquid which exhibited some adhesive properties. After five days at room temperature the material became a low melting solid. Infra-red spectrum is in agreement with that expected for the desired compound with maxima at: 2.95$\mu$, NH; 3.25$\mu$, =CH; 4.38$\mu$, NCO; 5.83$\mu$, carbamate C=O; 6.08$\mu$, C=C; 8.0 and 8.65$\mu$, C—O; 12.9$\mu$, fumarate.

*Analysis.*—Calculated for $C_{24}H_{28}N_4O_{14}$ (percent): N, 9.42. Found (percent): N, 9.31.

EXAMPLE 90

Preparation of 2,2-(ureylene)diethyl bis(2-isocyanatoethyl fumarate)

Bis(2-isocyanatoethyl) fumarate (22 grams; 0.086 mol) and water (0.78 gram; 0.043 mol) were dissolved in dry acetone (100 mls.) and stirred at room temperature for 2½ hours. A fine, white powder was formed, which on filtration, washing with ether and drying had a melting point of 105° C. The infra-red analysis was in agreement with the proposed structure with maxima at: 3.02$\mu$, NH; 4.42$\mu$, NCO; 6.1$\mu$, C=C; 6.19$\mu$, urea C=O; 6.35$\mu$, urea NH; 7.7, 7.95, 8.62$\mu$, fumarate C—O; 12.86$\mu$, fumarate.

*Analysis.*—Calculated for $C_9H_{22}N_4O_{11}$ (percent): N, 11.62. Found (percent): N, 11.69.

EXAMPLE 91

FDI and various polyether glycols were charged to a dry flask, heated to the desired temperature while stirring, and maintained at that temperature for 3 hours. The resultant products were analyzed for equivalent weight by the standard amine equivalent method. If the 3 hour heating period was insufficient, analyses were conducted at periodic intervals until the equivalent weight reached the theoretical value. The resulting products then were stored under nitrogen in either unlined metal cans or in sealed glass containers. The pertinent date are set forth in Table IV infra.

TABLE IV.—FDI-POLYETHER PREPOLYMERS

| Experiment No. | Glycol | NCO/OH | Temp., ° C. | Time (hrs.) | Equivalent weight [1] Theory | Found | Description |
|---|---|---|---|---|---|---|---|
| 1 | Polyol F | 2.0/1.0 | 86 | 2.5 | 473.5 | 472.5 | Clear, colorless viscous liquid. |
| 2 | Polyol Q | 2.0/1.0 | 95 | 3.0 | 749.0 | 752.5 | Clear, slightly colored, free-flowing liquid. |
| 3 | Polyol G | 2.0/1.0 | 95 | 4.0 | 1,266.3 | 1,260 | Clear, colorless, free-flowing liquid. |
| 4 | Polyol N | 2.0/1.0 | 78 | 3.0 | 1,729 | 1,668 | Medium straw colored, low melting solid. Very viscous when melted. Has a tendency to form higher molecular weight material on heating. |

[1] Equivalent weight determined by standard amine analysis.

EXAMPLE 92

The prepolymers of Example 91 supra were weighed into a vacuum flask and degassed under reduced pressure. The curing agent then was added (MOCA as a melt; polyols warmed as necessary to effect solution in the prepolymer), and the resulting liquid, pourable mixtures cast in dry aluminum dishes which were coated with Teflon. After covering the dishes with aluminum foil, they were placed in an oven maintained at 95° C. for 3 hours. The elastomeric products were removed from the molds and allowed to post cure at least one week at room temperature before testing. The data are set forth in Table V below.

EXAMPLE 94

Preparation of FDI-copolycaprolactone diol (80/20) prepolymer (A) The preparation involved the reaction of FDI with copolycaprolactone (80/20) diol (hydroxyl terminated polymer having an average molecular weight of about 2000 obtained by reacting a mixture of 80 parts (by weight) of epsilon-caprolactone and 20 parts of methyl-epsilon-caprolactone with a diethylene glycol initiator) in the absence of a solvent. The FDI and copolycaprolactone 80/20 diol were charged to a stirred reaction flask in the equivalent ratios desired and heated to 85°. The reaction was maintained at 85° until the desired equivalent weight was obtained, as determined by titration for isocyanate by the standard amine method.

TABLE V.—FDI PREPOLYMER LIQUID CAST ELASTOMERS

| Experiment No. | Prepolymer from— | Curing agent | NCO/active H | Curing Temp., °C. | Time (hrs.) | Hardness, Shore A-2 | Stiffness modulus, p.s.i. | Tensile, p.s.i. | Elongation, percent | 300% modulus, p.s.i. | Description |
|---|---|---|---|---|---|---|---|---|---|---|---|
| 1 | Polyol F | MOCA | 1.3/1.0 | 95 | 3.0 | 93 | 12,562 | 3,246 | 283 | 2,475 | Clear, hard, glossy. Pot-life of the diamine cure very short. |
| 2 | do | do | 1.5/1.0 | 95 | 3.0 | 90 | 3,149 | 2,993 | 245 | | High gloss, clear, flexible, elastic. Amber color. |
| 3 | do | Poly H | 1.0/1.0 | 95 | 3.0 | 67 | 667 | 1,521 | 338 | 1,163 | Tough, flexible, elastic. |
| 4 | Poly Q | MOCA | 1.1/1.0 | 95 | 3.0 | 63 | 1,896 | 1,060 | 881 | 515 | Clear, straw-colored. Very flexible. |
| 5 | do | do | 1.3/1.0 | 95 | 3.0 | 67 | 2,055 | 1,220 | 796 | 631 | Straw colored, flexible, fairly soft. |
| 6 | do | do | 1.5/1.0 | 95 | 3.0 | 63 | 1,450 | 1,114 | 832 | 555 | Slightly tacky, quite soft. |
| 7 | do | do | 1.1/1.0 | 125 | 3.0 | 42 | 197 | 548 | 1,032 | 205 | Soft, flexible, elastic. |
| 8 | do | do | 1.3/1.0 | 125 | 3.0 | 50 | 302 | 581 | 564 | 329 | Do. |
| 9 | do | do | 1.5/1.0 | 125 | 3.0 | 52 | 418 | 539 | 352 | 470 | Do. |
| 10 | do | Poly H | 1.0/1.0 | 125 | 3.0 | 20 | | | | | Very soft. |
| 11 | Polyol G | MOCA | 1.3/1.0 | 95 | 3.0 | 33 | 223 | 446 | 976 | 201 | Very soft, opaque, elastic. |
| 12 | do | do | 1.5/1.0 | 95 | 3.0 | 36 | 252 | 285 | 537 | 195 | Very soft, opaque, elastic. Slightly tacky. |
| 13 | do | Poly H | 1.0/1.0 | 95 | 3.0 | 23 | | | | | Tacky, clear, elastic. Very little strength. |
| 14 | Polyol N | MOCA | 1.1/1.0 | 75 | 3.0 | | 736 | 322 | 124 | | Light brown, soft, elastic with good memory. |

EXAMPLE 93

Bis(2-isocyanatoethyl) fumarate (.05 equivalent) and Polyol N (.02 equivalent) were charged to a vacuum flask and heated to effect solution. The solution was degassed under reduced pressure. Molten MOCA (.02 equivalent) was added, stirred into the solution, and the resultant mixture degassed. The liquid, pourable mixture was cast in dry aluminum dishes coated with Teflon, degassed in a vacuum desiccator, covered loosely and placed in a 75° oven for 6 hours. The cast-elastomers were removed from the molds and allowed to post cure at room temperature for 1 week before testing. The data are set forth in Table VI below.

Preparation and curing of elastomeric film (B) Carefully weighed portions of the prepolymer of Section A above were dissolved in the desired amount of N,N-dimethylformamide (or acetone) and the theoretical amounts of ethylenediamine (weighed on an analytical balance and dissolved in a portion of the same solvent as the prepolymer) were added rapidly. The mixtures were stirred for an additional 10 minutes, then poured into Teflon molds and when DMF solvent was used, immediately placed in a forced-air oven maintained at 80°. When acetone was used as the solvent, the films were allowed to air dry for 3 hours prior to placing in the oven. The films were kept at 80° C. for 16 hours, then

TABLE VI.—FDI-POLYOL N-MOCA SYSTEMS ONE-STEP PROCESS

| Experiment No. | FDI[1] | Polyol N[1] | MOCA[1] | NCO/active H | Curing Temp., °C. | Time, hrs. | Hardness, Shore A-2 | Stiffness, modulus, p.s.i. | Tensile p.s.i. | Elongation, percent | 300% modulus, p.s.i. | Description |
|---|---|---|---|---|---|---|---|---|---|---|---|---|
| 1 | .05 | .02 | .02 | 1.5/1.0 | 75 | 6.0 | 67 | 2,550 | 945 | 495 | 643 | Opaque, glossy. Soft and elastic. |
| 2 | .047 | .02 | .02 | 1.3/1.0 | 75 | 6.0 | 55 | 1,488 | 450 | 185 | | Soft and elastic. |
| 3 | .042 | .02 | .02 | 1.1/1.0 | 75 | 6.0 | 50 | 302 | 934 | 920 | 254 | Do. |

[1] Equivalent.

at room temperature for at least 2 weeks prior to testing. The resulting data are set forth in Table VII below.

EXAMPLE 95

Polyol R (50 grams), water (1.75 grams), Surfactant A (0.6 gram), and dibutyltin dilaurate (0.6 gram) were charged to a beaker and blended briefly. FDI (32.6 grams) was added as a melt and the resulting mixture stirred until evidence of a foam occurred. The mixture then was poured into the mold and allowed to rise. The resultant foam was cured at 70° C. for 15 minutes. This foam was white in color and composed of fine cells.

EXAMPLE 96

Polyol R (42.6 grams) and 1,2,6-hexanetriol (7.5 grams) were blended to give a hydroxyl number of about 235. To the mixture there were added water (0.875 gram), trichloromonofluoromethane (7.0 grams), dibutyltin dilaurate (1.0 gram), and Surfactant B (2.0 grams). The resulting mixture was blended and molten FDI grams) was added thereto. The mixture was stirred until foaming began, then poured into a mold and allowed to rise. The foam was cured at 70° C. for 15 minutes. There was obtained a very fine celled foam.

EXAMPLE 97

Polyol R (90 grams) and 1,2,6-hexanetriol (10 grams) were blended to give a hydroxyl number of 175.7 To this mixture there were added water (3.5 grams) dibutyltin dilaurate (1.0 gram) and Surfactant B (3 grams). The resulting mixture was blended and molten FFDI (91.9 grams) was added thereto. The mixture was stirred until foaming began, then poured into a mold and allowed to rise. The foam was cured at 70° C. for 15 minutes. The resultant foam was composed of fine cells and had a density of 1.95 (pounds/cubic foot).

EXAMPLE 98

A foam was prepared according to the following formulation:

(A): Weight, grams
Polyol B _____ 100
Surfactant A _____ 1.5
Dibutyltin dilaurate _____ 1
Benzoyl peroxide _____ 1.5
Trichloromonofluoromethane _____ 36

(B):
FDI _____ 59.1
Styrene _____ 48.5
Diethylaniline _____ 0.5
N,N,N',N'-tetramethyl-1,3-butanediamine ___ 0.5

The ingredients under column A and B were mixed separately and then poured together and mixed thoroughly until foaming was noticed. The mixture then was poured into molds and allowed to rise. Then density of the resultant foam was about 4.8 pounds per cubic foot.

EXAMPLE 99

FDI (127 grams; 1.0 equivalent), Polyol K (89 grams; 1.0 equivalent) and styrene (52 grams; 0.5 equivalent) were mixed to form a liquid solution. Using this solution, a 3-ply lay-up of glass mat was made making certain the glass mats were well soaked in the solution. The mats were covered with Mylar film and any trapped air pressed out. The film was then sealed and cure was effected in the following manner:

30 minutes at 75° C.
15 minutes at 150° C.

The resulting laminate was hard, tough and slightly flexible. The pertinent data, as well as comparative data, are set forth in Table VIII below:

TABLE VIII

| Sample | Room temp. properties | | | Properties at 160° F. | |
|---|---|---|---|---|---|
| | Tensile (p.s.i.) | Flex strength | Flex modulus | Flex strength | Flex modulus |
| FDI, Polyol K, and styrene product | 16,982 | 34,283 | $1.6 \times 10^6$ | 26,183 | $7.8 \times 10^5$ |
| Laminac-4123 | 9,900 | 31,800 | $1.12 \times 10^6$ | 16,000 | $4.85 \times 10^5$ |

EXAMPLE 100

Bis(2 - aminoethyl) fumarate dihydrochloride (FDH) (18.1 pounds) was slurried with ortho-dichlorobenzene (221.9 pounds) and charged to a 100 gallon "Hastelloy B" reactor equipped with an agitator, a gas inlet, and a caustic scrubber. A motor valve was set to maintain the reaction pressure at 130 p.s.i.g. Phosgene was fed to the reactor and the temperature was elevated to 135° C. At this temperature the pressure was 120 p.s.i.g. The phosgene feed rate was maintained at 33.2 pounds per hour (3.87 mols of phosgene per mole of FDH per hour) for 5.75 hours. The solution was cooled to about 50° C. and the pressure released. The solvent was removed by vacuum distillation to a K.T. ° C. of 110 at about 3.0 mm. Hg. The FDI was recovered by evaporative distillation on a Turba-Film Evaporator in 84.2 percent yield. It is pointed out that a comparative run at atmospheric pressure required 16 hours to complete.

EXAMPLE 101

FDI (127.5 grams; 1.0 equivalent) and Polyol H (73.7 grams; 0.5 equivalent) are dissolved in Cellosolve acetate (602 grams) to give a 25 weight percent solids solution. The reaction mixture is heated to 95° C. and maintained at this temperature for three hours. A 25 mil coating is placed on a glass plate by means of a doctor knife and allowed to air-cure for 24 hours. At the end of this period of time, the resultant coating is hard, tough, and clear.

EXAMPLE 102

A prepolymer prepared by the reaction of 2.0 mols of FDI with 1.0 mol of poly(ε-caprolactone) diol (a hydroxyl terminated polymer having an average molecular weight of about 2,000 obtained by reacting epsilon-caprolactone with diethylene glycol as the initiator therefor) is dissolved in Cellosolve acetate to give a solution which contains 50 weight percent solids. Styrene (40 weight percent based on the weight of the prepolymer) and benzoyl peroxide (1.0 weight precent based on the weight of the reactants) are added thereto, and the resulting mixture heated, with stirring, to about 100° C. and maintained thereat for a period of 6 hours. Thereafter, a coating of the resulting solution is applied on clear Grade A oak wood and allowed to air-cure for 24 hours. The resulting coating is hard, clear, and exhibits very good resistance to surface scratching.

EXAMPLE 103

FDI (127.5 grams; 1.0 equivalent) and Polyol A (233 grams; 1.0 equivalent) are mixed in a vacuum flask and entrapped cases are removed under vacuum. The shelf stability of the resulting mixture is greater than 8 hours at 26° C. A clean, dry, glass plate is coated with the viscous solution to a thickness of 15 mils using a doctor knife. The coated plate then is placed into a forced air oven which is maintained at 75° C. for 3 hours thereby effecting the cure. The resultant coating is clear, hard, slightly flexible, and adheres tenaciously to the surface of the glass.

EXAMPLE 104

A first package consists of FDI (127.5 grams, 1.0 equivalent) dissolved in Cellosolve acetate (525 grams) to give a solution containing 50 weight percent solids. Polyol A (233 grams; 1.0 equivalent), styrene (175 grams), and benzoyl peroxide (3.08 percent based on the total weight of FDI plus styrene) are admixed together to give a second package. The two packages then are mixed and applied to a glass plate as described in Example 103 supra. The plate is then placed in a forced air oven maintained at 100° C. for 6 hours. The resultant coating is clear, hard, and free of styrene odor.

EXAMPLE 105

A prepolymer was prepared by reacting at 80° C. FDI (2.0 mols) and 1 mol of copolycaprolactone (80/20) diol (a hydroxyl terminated diol having an average molecular weight of about 2,000 and obtained by reacting 80 parts by weight of epsilon-caprolactone and 20 parts by weight of methyl-epsilon-caprolactone). The equivalent weight of the prepolymer was 2035. To 170 grams of N,N-dimethylformamide (DMF), there were added 30 grams of the above prepolymer and 0.5 gram of ethylenediamine (in sufficient DMF to make a 10 weight percent solids solution. The $NH_2/NCO$ ratio was 0.9. The cotton fabric to be coated was immersed manually in the resulting solution, allowed to drip, and subsequently maintained at 100° C. in a forced air furnace for 16 hours. The created fabric exhibited tremendously improved flex-abrasion resistance using a 2 pound head weight and a 0.5 pound tail weight. The warp cycles of the treated fabric were 55,000 while that for the same untreated fabric was 690. After five home launderings, the treated cotton fabric withstood 35,000 warp cycles.

EXAMPLE 106

Nylon, cotton, and wool yarn were manually dipped in the polyurethane composition of Example 105 supra. The treated yarns were cured for 16 hours at 100° C. in the forced air oven. The yarns then were tested on an Instron using a cross head speed of 2.0 inches per minute for a 3.33 inch gage specimen and taking the average of 5 breaks. The pertinent data are listed below in Table IX.

TABLE IX

| Sample | Denier (average) | Tenacity (maximum g.p.d.) | Elongation (percent) | Stiffness (g.p.d.) |
|---|---|---|---|---|
| Nylon: | | | | |
| Control | 207 | 5.49 | 17.9 | 41.2 |
| Treated | 223 | 5.36 | 22.7 | 39.4 |
| Cotton: | | | | |
| Control | 112 | 2.26 | 3.1 | 74.6 |
| Treated | 142 | 2.56 | 3.4 | 109.0 |
| Wool: | | | | |
| Control | 4,212 | 0.53 | 10.8 | 11.2 |
| Treated | 6,422 | 0.59 | 28.6 | 9.3 |

EXAMPLE 107

FDI (50.8 grams; 0.4 equivalent) and the copolycaprolactone (80/20) diol of Example 105 supra (238.4 grams; 0.2 equivalent) were charged to a flask under a nitrogen atmosphere and maintained at 80° C. for 96 minutes. The NCO/OH ratio was 2.0. The resulting viscous, fluid prepolymer was placed in a dry bottle under a nitrogen atmosphere and stored at about 26° C. for seven days. After this period of time, the equivalent weight was 2035.7, which represented a gain in viscosity; however, the prepolymer was still pourable.

EXAMPLE 108

To 50 grams of N,N-dimethylformamide there were added 30 grams of the prepolymer prepared in Example 107 supra. To this solution there was added a solution of ethylenediamine (0.443 gram; NCO/NH₂=1.0) in N,N-dimethylformamide (19.6 grams). The resulting solution became viscous, but did not "jell." A wooden stick was dipped into the solution and another stick touched the wet end. Slowly pulling the sticks apart over a water bath caused a fiber to be formed. The fiber was lowered into the water and the stretching process continued. After a length of fiber was obtained, it was dried in an oven for 16 hours at 80° C. Through the fiber varied in thickness, it was strong, elastic, and had good memory.

EXAMPLE 109

A prepolymer was prepared by the reaction of FDI with poly(epsilon-caprolactone) diol at an NCO/OH ratio of 2.3. The reaction was conducted in N,N-dimethylformamide for one hour at about 26° C. in the presence of stannous octanoate (0.024 p.p.m.) as the catalyst therefor. The poly(epsilon-caprolactone) diol had an average molecular weight of about 2,000 and was prepared via the reaction of epsilon-caprolactone with a diethylene glycol as the initiator therefor in the presence of stannous octanoate catalyst. The resulting prepolymer was diluted with N,N-dimethylformamide to give a 15 weight percent solids solution, and piperazine was added to give an NH₂/NCO ratio of 0.8. The resulting "dope" then was employed in an experimental spinning unit to prepare fibers. The pertinent data are given below for two spinning conditions. The characteristics of a commercial spandex "Spandelle" are also noted in Table X below:

steel, 0.026 inch thick; (2) type 304 stainless, 0.017 inch thick; (3) aluminum, 0.042 inch thick; and (4) soft copper, 0.029 inch thick. The metals were cut into 1.0 inch x 4.0 inch strips and cleaned on one end to provide a good surface for bonding two strips into a lap-joint specimen with a 1.0 inch overlap. The lap-joint specimen was prepared by placing enough resin in the overlap to form a bond approximately 5.0 mils thick, shimming to prevent slippage, and then heating for 15 minutes at 175° C. and 1200 p.s.i. to cure. The specimen was allowed to age at least 24 hours at room temperature (about 23° C.). The specimen was tested for bond strength at room temperature using an Instron tensile tested at a constant 0.1 inch per minute jaw separation. The tensile shear in p.s.i. were as follows:

Steel _____ 587
Stainless _____ 628
Aluminum _____ 625
Copper _____ 558

(C) A comparison was made with an ethylene/maleic anhydride copolymer (50 mol percent maleic) commercial system which was pressed at 1200 p.s.i. for 1 minute at 175° C. The resin in the bond in all cases was extremely brittle and broken when handled.

EXAMPLE 111

In a manner similar to that set forth in Example 110 supra, various ethylene/FDI copolymers were prepared and tested as adhesives. The pertinent data are set forth in Table XI below:

TABLE XI

| | FDI,[1] wt. percent | M/D,[2] wt. ratio | DTBP,[3] wt. percent | T., °C. | Pressure, p.s.i. | Time, hrs. | FDI, percent | Yield, percent | Conversion,[4] rate | Tensile shear, 1.0 inch overlap, p.s.i. | | | |
|---|---|---|---|---|---|---|---|---|---|---|---|---|---|
| | | | | | | | | | | Steel | Stainless | Aluminum | Copper |
| Experiment No.: | | | | | | | | | | | | | |
| 1 | 5.0 | 20.6 | 0.011 | 160 | 15,000 | 0.5 | 10.25 | 21.1 | 40.8 | 612 | 443 | 505 | 400 |
| 2 | 5.0 | 20.8 | 0.011 | 140 | 15,000 | 5.0 | 19.95 | 10.0 | 2.0 | 902 | 710 | 635 | 485 |

[1] Based on total weight of FDI plus ethylene.
[2] Total monomers (FDI+C₂H₄)/diluent ratio. Diluent was benzene.
[3] Ditertiary butyl peroxide.
[4] Conversion rate is in percent per hour.
NOTE: Maleic anhydride/ethylene copolymer (50 mol percent) gave an extremely brittle resin in the bond which broke when handling.

TABLE X

| | | "Spandelle" |
|---|---|---|
| Viscosity (cps.) | 10,500 | 10,500 |
| Total solids (wt. percent) | 8 | 8 |
| Coagulating bath (H₂O): | | |
| Additive (wt. percent) | (¹) | (¹) |
| Temp., °C | 80 | 80 |
| Speed (ft./min.) | 96 | 96 |
| Wash bath: | | |
| Temp., °C | 70 | 70 |
| Speed (ft./min.) | 97 | 97 |
| Dry roll: | | |
| Temp., °C | 140 | 115 |
| Speed (ft./min.) | 100 | 100 |
| Fiber properties: | | |
| Stress (gms./denier): | | |
| 100% cycle 1 | .051 | .057 | .036 |
| 100% cycle 2 | .014 | .018 | .029 |
| 300% cycle 1 | .125 | .131 | .191 |
| 300% cycle 2 | .114 | .131 | .122 |
| 300% plus 1 minute | .069 | .074 | .108 |
| Tensile strength (g.p.d.) | .950 | .937 | .791 |
| Elongation (wt. percent) | 690 | 660 | 573 |
| Work recovery (wt. percent) | 15.2 | 15.0 | 29.5 |
| Tensile set (wt. percent) | 71.0 | 63.0 | 13.0 |
| Denier | 273 | 271 | 60 |

¹ Sodium heptadecyl sulfate.

EXAMPLE 110

(A) Bis(2-isocyanatoethyl) fumarate (FDI) and ethylene were charged to a 1.5 liter batch-stirred autoclave with FDI comprising two weight percent of the monomer charge. Benzene diluent (monomers/diluent weight ratio=19) and ditertiary butyl peroxide (0.013% by weight based on monomers) were added. The temperature was maintained at 160° C. for 25 minutes at a pressure of 15,000 p.s.i. Ethylene/FDI copolymer, containing 3.2 weight percent FDI, was obtained as a white powder. The monomers were converted to copolymer in 21.3 percent yield giving a conversion rate of 51.2 percent per hour.

(B) The above copolymer was tested as an adhesive for the following metals: (1) SAE-1008R cold rolled

What is claimed is:

1. A polymer having the recurring unit $$\left[ \begin{matrix} O & O & \diagup^{R''}\diagdown & O & O \\ \| & \| & & \| & \| \\ ZCNHROC\!\!-\!\!(\!R'\!)_m & & (\!R'\!)_m\!\!-\!\!CORNHCZ \end{matrix} \right]$$

wherein R″ is a tetravalent saturated aliphatic group of two carbon atoms in the polymeric chain, wherein each R′ is a divalent saturated aliphatic radical attached to separate carbon atoms, wherein each m is an integer having a value of zero or one, wherein each R represents a member selected from the group consisting of divalent, substituted and unsubstituted aliphatic, alicyclic, and aromatic groups, and wherein each Z represents a monofunctional active hydrogen organic compound sans the active hydrogen atom; with the provisos that (1) each $$\begin{matrix} O \\ \| \\ ZCNH\!- \end{matrix}$$

moiety of the above unit is at least two carbon atoms removed from the oxycarbonyl moiety $$\begin{matrix} O \\ \| \\ (\!-\!OC\!-\!) \end{matrix}$$

and (2) each $$\begin{matrix} O & O \\ \| & \| \\ ZCNHROC\!- \end{matrix}$$

moiety of the above unit is monovalently bonded to separate carbon atoms.

2. The polymer of claim 1 wherein each R variable is —CH₂CH₂—.

3. The polymer of claim 1 wherein each R variable is —(CH₃)CHCH₂—.

4. A polymer having the recurring unit

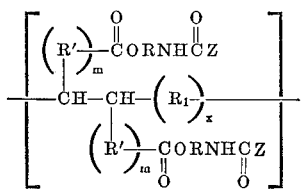

wherein each R' is a divalent saturated aliphatic radical, wherein each $m$ and $x$ are integers having a value of zero or one, wherein each R represents a member selected from the group consisting of divalent, substituted and unsubstituted aliphatic, alicyclic, and aromatic groups, wherein $R_1$ is a divalent radical which contains two carbon atoms in the polymeric chain; and wherein each X represents a monofunctional active hydrogen organic compound sans the active hydrogen atom; with the proviso that (1) each

moiety is at least two carbon atoms removed from the oxycarbonyl moiety

in the above unit.

5. The polymer of claim 3 wherein each R variable is —CH$_2$CH$_2$—.

6. A polymer having the recurring unit

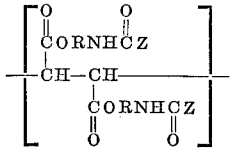

wherein each R represents alkylene radicals, and wherein each Z represents a monofunctional active hydrogen organic compound sans the active hydrogen atom.

7. A telomer which possesses from 2 to about 20 of the following units

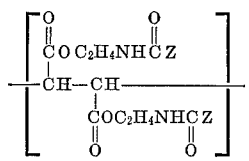

wherein each Z represents a monofunctional active hydrogen organic compound sans the active hydrogen atom.

8. A telomer which possesses from 2 to about 20 of the following units

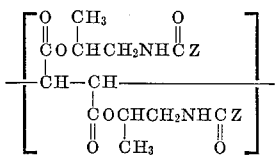

wherein each Z represents a monofunctional active hydrogen organic compound sans the active hydrogen atom.

References Cited

UNITED STATES PATENTS 2,797,232   7/1957   Bunge _____ 260—471

DONALD E. CZAJA, Examiner

U.S. Cl. X.R.

117—136, 138.5, 161; 156—331; 161—190, 247; 260—2.5, 31.8, 37, 78.4, 78.5, 80.73, 453, 478, 482, 485, 859